(12) United States Patent
Kozuma et al.

(10) Patent No.: US 8,502,772 B2
(45) Date of Patent: Aug. 6, 2013

(54) DRIVING METHOD OF INPUT/OUTPUT DEVICE

(75) Inventors: Munehiro Kozuma, Kanagawa (JP);
Yoshiyuki Kurokawa, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 222 days.

(21) Appl. No.: 13/173,631

(22) Filed: Jun. 30, 2011

(65) Prior Publication Data
US 2012/0001847 A1    Jan. 5, 2012

(30) Foreign Application Priority Data

Jul. 2, 2010    (JP) .................................. 2010-151911

(51) Int. Cl.
*G09G 5/00*    (2006.01)
(52) U.S. Cl.
USPC .......................................... 345/156; 345/179
(58) Field of Classification Search
USPC .............. 345/156, 173, 175, 179; 178/18.01, 178/18.09
See application file for complete search history.

(56) References Cited

U.S. PATENT DOCUMENTS

| | | | |
|---|---|---|---|
| 5,731,856 A | 3/1998 | Kim et al. | |
| 5,744,864 A | 4/1998 | Cillessen et al. | |
| 6,243,069 B1 | 6/2001 | Ogawa et al. | |
| 6,294,274 B1 | 9/2001 | Kawazoe et al. | |
| 6,563,174 B2 | 5/2003 | Kawasaki et al. | |
| 6,727,522 B1 | 4/2004 | Kawasaki et al. | |
| 6,747,638 B2 | 6/2004 | Yamazaki et al. | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |
| 7,211,825 B2 | 5/2007 | Shih et al | |
| 7,271,835 B2 | 9/2007 | Iizuka et al. | |
| 7,282,782 B2 | 10/2007 | Hoffman et al. | |
| 7,297,977 B2 | 11/2007 | Hoffman et al. | |

(Continued)

FOREIGN PATENT DOCUMENTS

| | | |
|---|---|---|
| EP | 1737044 A | 12/2006 |
| EP | 2226847 A | 9/2010 |

(Continued)

OTHER PUBLICATIONS

Tanaka, K. et al, "45.5: A System LCD with Optical Input Function Using Infra-Red Backlight Subtraction Scheme," SID Digest '10: SID International Symposium Digest of Technical Papers, 2010, pp. 680-683.

(Continued)

*Primary Examiner* — Joe H Cheng
(74) *Attorney, Agent, or Firm* — Husch Blackwell LLP

(57) ABSTRACT

A method for driving an input/output device, including: generating first data by putting a first region of a light unit in a lighted condition and a second region of the light unit in the lighted condition; generating second data by putting the first region in the lighted condition and the second region in an unlighted condition; generating third data by putting the first region in the unlighted condition and the second region in the lighted condition; generating fourth data by putting the first region in the unlighted condition and the second region in the unlighted condition; and generating difference data of either the first data or the third data and either the second data or the fourth data by using a data processor.

20 Claims, 22 Drawing Sheets

(56) References Cited

U.S. PATENT DOCUMENTS

| | | |
|---|---|---|
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,525,523 B2 | 4/2009 | Yamazaki et al. |
| 7,663,165 B2 | 2/2010 | Mouli |
| 7,674,650 B2 | 3/2010 | Akimoto et al. |
| 7,732,819 B2 | 6/2010 | Akimoto et al. |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0157760 A1 | 7/2006 | Hayashi et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0018075 A1 | 1/2007 | Cazaux et al. |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0054319 A1 | 3/2008 | Mouli |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0101948 A1 | 4/2009 | Park et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2009/0295769 A1 | 12/2009 | Yamazaki et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2010/0117991 A1 | 5/2010 | Koyama et al. |
| 2010/0182282 A1 | 7/2010 | Kurokawa et al. |
| 2011/0291013 A1* | 12/2011 | Kurokawa et al. ......... 250/338.1 |
| 2011/0310063 A1 | 12/2011 | Kurokawa et al. |
| 2012/0001874 A1 | 1/2012 | Kurokawa et al. |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 5-251705 A | 9/1993 |
| JP | 8-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2009-187342 | 8/2009 |
| JP | 2010-109467 | 5/2010 |
| WO | WO 2004/114391 | 12/2004 |

OTHER PUBLICATIONS

Jeon, S. et al, "180nm Gate Length Amorphous InGaZnO Thin Film Transistor for High Density Image Sensor Applications," IEDM 10: Technical Digest of International Electron Devices Meeting, Dec. 6, 2010, pp. 504-507.

Fortunato.E et al., "Wide-Bandgap High-Mobility ZnO Thin-Film Transistors Produced at Room Temperature," Appl. Phys. Lett. (Applied Physics Letters, Sep. 27, 2004, vol. 85, No. 13, pp. 2541-2543.

Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.

Ikeda.T et al., "Full-Functional System Liquid Crystal Display Using CG-Silicon Technology,", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors,", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment,", Appl. Phys. Lett. (Applied Physics Letters) , Jun. 26, 2007, vol. 90, No. 26, pp. 262106-1-262106-3.

Takahashi.M et al., "Theoretical Analysis of IGZO Transparent Amorphous Oxide Semiconductor,", IDW '08 : Proceedings of the 15th International Display Workshops, Dec. 3, 2008, pp. 1637-1640.

Hayashi.R et al., "42.1: Invited Paper: Improved Amorphous In-Ga-Zn-O TFTs,", SID Digest '08 : SID International Symposium Digest of Technical Papers, May 20, 2008, vol. 39, pp. 621-624.

Prins.M et al., "A Ferroelectric Transparent Thin-Film Transistor,", Appl. Phys. Lett. (Applied Physics Letters), Jun. 17, 1996, vol. 68, No. 25, pp. 3650-3652.

Nakamura.M et al., "The phase relations in the In2O3-Ga2ZnO4-ZnO system at 1350° C,", Journal of Solid State Chemistry, Aug. 1, 1991, vol. 93, No. 2, pp. 298-315.

Kimizuka.N. et al., "Syntheses and Single-Crystal Data of Homologous Compounds, In2O3(ZnO)m (m = 3, 4, and 5), InGaO3(ZnO)3, and Ga2O3(ZnO)m (m = 7, 8, 9, and 16) in the In2O3-ZnGa2O4-ZnO System,", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor,", Science, May 23, 2003, vol. 300, No. 5623, pp. 1269-1272.

Masuda.S et al., "Transparent thin film transistors using ZnO as an active channel layer and their electrical properties,", J. Appl. Phys. (Journal of Applied Physics), Feb. 1, 2003, vol. 93, No. 3, pp. 1624-1630.

Asakuma.N et al., "Crystallization and Reduction of Sol-Gel-Derived Zinc Oxide Films by Irradiation With Ultraviolet Lamp,", Journal of Sol-Gel Science and Technology, 2003, vol. 26, pp. 181-184.

Osada.T et al., "15.2: Development of Driver-Integrated Panel using Amorphous In-Ga-Zn-Oxide TFT,", SID Digest '09 : SID International Symposium Digest of Technical Papers, May 31, 2009, pp. 184-187.

Nomura.K et al., "Carrier transport in transparent oxide semiconductor with intrinsic structural randomness probed using single-crystalline InGaO3(ZnO)5 films,", Appl. Phys. Lett. (Applied Physics Letters), Sep. 13, 2004, vol. 85, No. 11, pp. 1993-1995.

Li.C et al., "Modulated Structures of Homologous Compounds InMO3(ZnO)m (M=In,Ga; m=Integer) Described by Four-Dimensional Superspace Group,", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous GIZO (Ga2O3-In2O3-ZnO) TFT,", SID Digest '08 : SID International Symposium Digest of Technical Papers, May 20, 2008, vol. 39, pp. 633-636.

Lee.J et al., "World's Largest (15-Inch) XGA AMLCD Panel Using IGZO Oxide TFT,", SID Digest '08 : SID International Symposium Digest of Technical Papers, May 20, 2008, vol. 39, pp. 625-628.

Nowatari.H et al., "60.2: Intermediate Connector With Suppressed Voltage Loss for White Tandem OLEDs,", SID Digest '09 : SID International Symposium Digest of Technical Papers, May 31, 2009, vol. 40, pp. 899-902.

Kanno.H et al., "White Stacked Electrophosphorecent Organic Light-Emitting Devices Employing MOO3 as a Charge-Generation Layer,", Adv. Mater. (Advanced Materials), 2006, vol. 18, No. 3, pp. 339-342.

Tsuda.K et al., "Ultra Low Power Consumption Technologies for Mobile TFT-LCDs ,", IDW '02 : Proceedings of the 9th International Display Workshops, Dec. 4, 2002, pp. 295-298.

Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.

Fung.T et al., "2-D Numerical Simulation of High Performance Amorphous In-Ga-Zn-O TFTs for Flat Panel Displays,", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA AMOLED Display Driven by Indium-Gallium-Zinc Oxide TFTs Array,", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure,", IEDM 09: Technical Digest of International Electron Devices Meeting, Dec. 7, 2009, pp. 191-194.

Kurokawa.Y et al., "UHF RFCPUS on Flexible and Glass Substrates for Secure RFID Systems,", Journal of Solid-State Circuits , 2008, vol. 43, No. 1, pp. 292-299.

Ohara.H et al., "Amorphous In-Ga-Zn-Oxide TFTs with Suppressed Variation for 4.0 inch QVGA AMOLED Display,", AM-FPD '09 Digest of Technical Papers, Jul. 1, 2009, pp. 227-230, The Japan Society of Applied Physics.

Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.

Cho.D et al., "21.2:AL and SN-Doped Zinc Indium Oxide Thin Film Transistors for AMOLED Back-Plane,", SID Digest '09 : SID International Symposium Digest of Technical Papers, May 31, 2009, pp. 280-283.

Lee.M et al., "15.4:Excellent Performance of Indium-Oxide-Based Thin-Film Transistors by DC Sputtering,", SID Digest '09 : SID International Symposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and Its Bending Properties,", SID Digest '09 : SID International Symposium Digest of Technical Papers, May 31, 2009, pp. 983-985.

Sakata.J et al., "Development of 4.0-In. AMOLED Display With Driver Circuit Using Amorphous In-Ga-Zn-Oxide TFTs,", IDW '09 : Proceedings of the 16th International Display Workshops, 2009, pp. 689-692.

Park.J et al., "Amorphous Indium-Gallium-Zinc Oxide TFTs and Their Application for Large Size AMOLED,", AM-FPD '08 Digest of Technical Papers, Jul. 2, 2008, pp. 275-278.

Park.S et al., "Challenge to Future Displays: Transparent AM-OLED Driven by Peald Grown ZnO TFT,", IMID '07 Digest, 2007, pp. 1249-1252.

Godo.H et al., "Temperature Dependence of Characteristics and Electronic Structure for Amorphous In-Ga-Zn-Oxide TFT,", AM-FPD '09 Digest of Technical Papers, Jul. 1, 2009, pp. 41-44.

Osada.T et al., "Development of Driver-Integrated Panel Using Amorphous In-Ga-Zn-Oxide TFT,", AM-FPD '09 Digest of Technical Papers, Jul. 1, 2009, pp. 33-36.

Hirao.T et al., "Novel Top-Gate Zinc Oxide Thin-Film Transistors (ZnO TFTs) for AMLCDS,", Journal of the SID, 2007, vol. 15, No. 1, pp. 17-22.

Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In-Ga-Zn-Oxide TFT,", SID Digest '09 : SID International Symposium Digest of Technical Papers, May 31, 2009, pp. 1110-1112.

Ohara.H et al., "21.3:4.0 In. QVGA AMOLED Display Using In-Ga-Zn-Oxide TFTs With a Novel Passivation Layer,", SID Digest '09 : SID International Symposium Digest of Technical Papers, May 31, 2009, pp. 284-287.

Miyasaka.M, "Suftla Flexible Microelectronics on Their Way to Business,", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.

Asaoka.Y et al., "29.1:Polarizer-Free Reflective LCD Combined With Ultra Low-Power Driving Technology,", SID Digest '09 : SID International Symposium Digest of Technical Papers, May 31, 2009, pp. 395-398.

Lee.H et al., "Current Status of, Challenges to, and Perspective View of AM-OLED ,", IDW '06 : Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.

Nakamura.M, "Synthesis of Homologous Compound with New Long-Period Structure,", Nirim Newsletter, Mar. 1, 1995, vol. 150, pp. 1-4.

Kikuchi.H et al., "Polymer-Stabilized Liquid Crystal Blue Phases,", Nature Materials, Sep. 2, 2002, vol. 1, pp. 64-68.

Kimizuka.N et al., "Spinel,YBFe2O4, and YB2Fe3O7 Types of Structures for Compounds in the In2O3 and SC2O3-A2O3-BO Systems [A; Fe, Ga, or Al; B: Mg, Mn, Fe, Ni, Cu,or Zn] At Temperatures Over 1000°C,", Journal of Solid State Chemistry, 1985, vol. 60, pp. 382-384.

Kitzerow.H et al., "Observation of Blue Phases in Chiral Networks,", Liquid Crystals, 1993, vol. 14, No. 3, pp. 911-916.

Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.

Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.

Orita.M et al., "Mechanism of Electrical Conductivity of Transparent InGaZnO4,", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors,", Jpn. J. Appl. Phys. (Japanese Journal of Applied Physics) , 2006, vol. 45, No. 5B, pp. 4303-4308.

Janotti.A et al., "Native Point Defects in ZnO,", Phys. Rev. B (Physical Review. B), Oct. 4, 2007, vol. 76, No. 16, pp. 165202-1-165202-22.

Park.J et al., "Electronic Transport Properties of Amorphous Indium-Gallium-Zinc Oxide Semiconductor Upon Exposure to Water,", Appl. Phys. Lett. (Applied Physics Letters) , 2008, vol. 92, pp. 072104-1-072104-3.

Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.

Janotti.A et al., "Oxygen Vacancies in ZnO,", Appl. Phys. Lett. (Applied Physics Letters) , 2005, vol. 87, pp. 122102-1-122102-3.

Oba.F et al., "Defect energetics in ZnO: A hybrid Hartree-Fock density functional study,", Phys. Rev. B (Physical Review. B), 2008, vol. 77, pp. 245202-1-245202-6.

Orita.M et al., "Amorphous transparent conductive oxide InGaO3(ZnO)m (m<4):a Zn4s conductor,", Philosophical Magazine, 2001, vol. 81, No. 5, pp. 501-515.

Hosono.H et al.,"Working hypothesis to explore novel wide band gap electrically conducting amorphous oxides and examples,", J. Non-Cryst. Solids (Journal of Non-Crystalline Solids), 1996, vol. 198-200, pp. 165-169.

Kim.S et al., "High-Performance oxide thin film transistors passivated by various gas plasmas,", 214th ECS Meeting, 2008, No. 2317, ECS.

Clark.S et al., "First Principles Methods Using CASTEP,", Zeitschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H1009-H1014.

Ueno.K et al., "Field-Effect Transistor on SrTiO3 With Sputtered Al2O3 Gate Insulator,", Appl. Phys. Lett. (Applied Physics Letters) , Sep. 1, 2003, vol. 83, No. 9, pp. 1755-1757.

Mo et al., "Amorphous Oxide TFT Backplanes for Large Size AMOLED Displays," IDW '08: Proceedings Of The 6th International Display Workshops, Dec. 3, 2008, pp. 581-584.

\* cited by examiner

DRIVING METHOD OF INPUT/OUTPUT DEVICE

BACKGROUND OF THE INVENTION

1. Field of the Invention

An embodiment of the present invention relates to an input/output device.

2. Description of the Related Art

In recent years, technological development of a device having a function of outputting data and inputting data by using incident light (such a device is also referred to as an input/output device) has been promoted.

An example of the input/output device is an input/output device that includes a plurality of display circuits and a plurality of photodetector circuits (photosensors) arranged in a matrix and provided in a pixel area and has a function of sensing the position of an object to be detected (position-sensing function) by sensing the intensity of light entering the photosensors and a function of generating image data of the object (detecting function) (see Patent Document 1, for example). With the position-sensing function, the input/output device can also serve as a touch panel, for example. Further, with the detecting function, the input/output device can also serve as a scanner and display an image based on image data generated in the pixel area with the detecting function.

REFERENCE

Patent Document

[Patent Document 1] Japanese Published Patent Application No. 2010-109467

SUMMARY OF THE INVENTION

A conventional input/output device has a problem of low accuracy of photodetection.

For example, an input/output device receives light around the input/output device, such as external light. Consequently, such light causes noise when optical data is generated, thereby reducing accuracy of photodetection. As in the case of a touch panel for example, when data is input to an input/output device as a result of the entrance of light reflected off a finger, light around the input/output device may cause light reflected off part of the hand other than the finger to be recognized as data equivalent to data based on the light reflected off the finger.

An input/output device with the position-sensing function and the detecting function requires higher photodetection accuracy than an input/output device only with the position-sensing function in order to accurately detect an object to be detected as image data. However, the photodetection accuracy of a conventional input/output device with the position-sensing function and the detecting function is inadequate to accurately detect an object to be detected as image data.

An object of an embodiment of the present invention is to improve photodetection accuracy.

According to an embodiment of the present invention, an input/output device includes a display circuit; a photodetector circuit; and a light unit including a light-emitting diode emitting light of wavelengths in the visible region and a light-emitting diode emitting light of wavelengths in the infrared region. The input/output device brings the light unit into a lighted condition by selectively making the two types of light-emitting diodes emit light every unit period and generates data based on the intensity of light entering the photodetector circuit every unit period.

According to an embodiment of the present invention, the input/output device generates difference data of two pieces of optical data generated in different periods and generates image data by using data that is picked from the generated optical data or difference data and includes information on light emitted by a visible-light-emitting diode and does not include information on light emitted by an infrared-light-emitting diode. This allows photodetection accuracy to be improved even when both difference data and image data are generated.

One embodiment of the present invention is a method for driving an input/output device including an input/output unit performing data input/output and a data processor carrying out processing according to input data, the input/output unit including: V (V is a natural number) first light-emitting diodes emitting light of wavelengths in an infrared region; W (W is a natural number) second light-emitting diodes emitting light of wavelengths in a visible region; a light unit including a first region that is put in a lighted condition when the first light-emitting diodes emit light and a second region that is put in a lighted condition when the second light-emitting diodes emit light; X (X is a natural number) display circuits overlapping with the light unit, receiving a display selection signal, receiving a display data signal in accordance with the display selection signal, and going into a display state according to data of the display data signal; and Y (Y is a natural number) photodetector circuits overlapping with the light unit and generating data according to an intensity of light entering the Y photodetector circuits. The method includes the steps of: generating Y pieces of first data according to an intensity of light entering the Y photodetector circuits by putting the first region in the lighted condition and the second region in the lighted condition; generating Y pieces of second data according to an intensity of light entering the Y photodetector circuits by putting the first region in the lighted condition and the second region in an unlighted condition; generating third data according to an intensity of light entering the Y photodetector circuits by putting the first region in the unlighted condition and the second region in the lighted condition; generating fourth data according to an intensity of light entering the Y photodetector circuits by putting the first region in the unlighted condition and the second region in the unlighted condition; generating difference data of either the first data or the third data and either the second data or the fourth data by using the data processor; and generating image data to be data of the display data signal by using the data processor from the difference data of the first data and the second data or the third data.

One embodiment of the present invention is a method for driving an input/output device including an input/output unit performing data input/output and a data processor carrying out processing according to input data, the input/output unit including: a first light unit that includes V (V is a natural number) first light-emitting diodes emitting light of wavelengths in an infrared region and is put in a lighted condition when the first light-emitting diodes emit light; a second light unit that includes W (W is a natural number) second light-emitting diodes emitting light of wavelengths in a visible region and is put in a lighted condition when the second light-emitting diodes emit light; X (X is a natural number) display circuits overlapping with the light units, receiving a display selection signal, receiving a display data signal in accordance with the display selection signal, and going into a display state according to data of the display data signal; and Y (Y is a natural number) photodetector circuits overlapping with the light units and generating data according to an intensity of light entering the Y photodetector circuits. The method includes the steps of: generating Y pieces of first data according to an intensity of light entering the Y photodetector circuits by putting the first light unit in the lighted condition and the second light unit in the lighted condition; generating Y pieces of second data according to an intensity of light entering the Y photodetector circuits by putting the first light unit in the lighted condition and the second light unit in an unlighted condition; generating third data according to an intensity of light entering the Y photodetector circuits by putting the first light unit in the unlighted condition and the second light unit in the lighted condition; generating fourth data according to an intensity of light entering the Y photodetector circuits by putting the first light unit in the unlighted condition and the second light unit in the unlighted condition; generating difference data of either the first data or the third data and either the second data or the fourth data by using the data processor; and generating image data to be data of the display data signal by using the data processor from difference data of the first data and the second data or the third data.

An embodiment of the present invention can improve photodetection accuracy.

DETAILED DESCRIPTION OF THE INVENTION

Examples of embodiments of the present invention will be described below with reference to the drawings. Note that the present invention is not limited to the following description. It will be readily appreciated by those skilled in the art that modes and details of the present invention can be modified in various ways without departing from the spirit and scope of the present invention. The present invention therefore should not be construed as being limited to the following description of the embodiments.

Note that the contents of the embodiments can be combined with each other as appropriate. In addition, the contents of the embodiments can be replaced with each other.

Note that ordinal numbers such as "first" and "second" are used to prevent confusion between components and do not limit number.

Embodiment 1

In this embodiment, an example of an input/output device that can output data and can input data by using incident light (also referred to as an input/output system) is described.

Figure 1A:
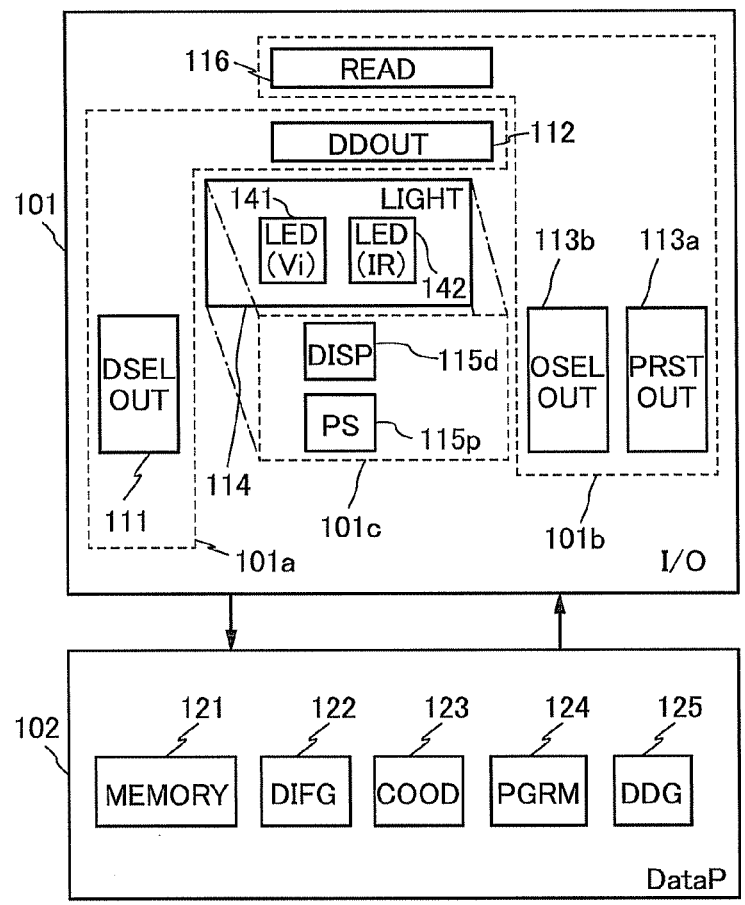
FIGS. 1A and 1B are diagrams illustrating an input/output device of Embodiment 1.
Figure 1B:
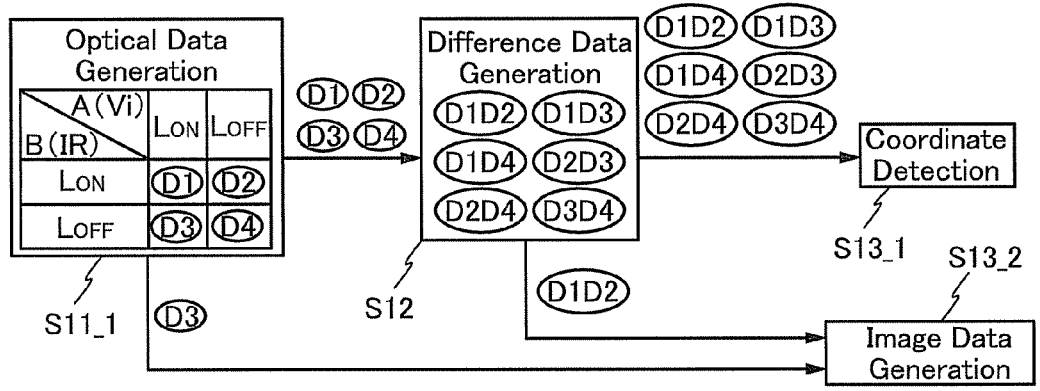

An example of the input/output device of this embodiment will be described with reference to FIGS. 1A and 1B. FIGS. 1A and 1B are diagrams for describing an example of the input-output device of this embodiment.

First, a structural example of the input/output device of this embodiment will be described with reference to FIG. 1A. FIG. 1A is a schematic diagram illustrating a structural example of the input/output device of this embodiment.

An input/output device illustrated in FIG. 1A includes an input/output (I/O) unit 101 and a data processor (DataP) 102.

In the input/output unit 101, data input/output is performed.

The data processor 102 has a function of carrying out processing according to input data. Further, the data processor 102 has a function of executing, as needed, a program selected according to input data. For example, the data processor 102 generates difference data, detects the coordinates of an object to be detected, and generates image data in accordance with data input from the input/output unit 101.

The input/output unit 101 and the data processor 102 will be further described below.

The input/output unit 101 includes a display selection signal output circuit (DSELOUT) 111, a display data signal output circuit (DDOUT) 112, a photodetection reset signal output circuit (PRSTOUT) 113a, an output selection signal output circuit (OSELOUT) 113b, a light unit (LIGHT) 114, X (X is a natural number) display circuits (DISP) 115d, Y (Y is a natural number) photodetector circuits (PS) 115p, and a reading circuit (READ) 116.

The display selection signal output circuit 111 and the display data signal output circuit 112 are provided in a display circuit driver 101a. The display circuit driver 101a generates control signals to drive the display circuits 115d.

The photodetection reset signal output circuit 113a, the output selection signal output circuit 113b, and the reading circuit 116 are provided in a photodetector circuit driver 101b. The photodetector circuit driver 101b generates control signals to drive the photodetector circuits 115p.

The display circuits 115d and the photodetector circuits 115p are provided in a pixel area 101c. The pixel area 101c displays an image. In addition, light to be data enters the pixel area 101c. Note that one or more display circuits 115d forms a pixel. Further, a pixel may include one or more photodetector circuits 115p. Moreover, when the number of display circuits 115d is more than one, the display circuits 115d may be arranged in a matrix in the pixel area 101c. Further, when the number of photodetector circuits 115p is more than one, the photodetector circuits 115p may be arranged in a matrix in the pixel area 101c.

The display selection signal output circuit 111 has a function of outputting a plurality of display selection signals that are pulse signals (signals DSEL).

The display selection signal output circuit 111 includes a shift register, for example. The display selection signal output circuit 111 can output display selection signals by outputting pulse signals from the shift register.

An image signal is input to the display data signal output circuit 112. The display data signal output circuit 112 has a function of generating a display data signal (a signal DD) that is a voltage signal on the basis of the input image signal and outputting the generated display data signal.

The display data signal output circuit 112 includes a transistor, for example.

Note that in the input/output device, the transistor includes two terminals and a current control terminal for controlling current caused to flow between the two terminals by applied voltage. Note that without limitation to the transistor, terminals between which current is controlled are also referred to as current terminals. Two current terminals are also referred to as a first current terminal and a second current terminal.

Further, in the input/output device, a field-effect transistor can be used as the transistor, for example. In a field-effect transistor, a first current terminal, a second current terminal, and a current control terminal are one of a source and a drain, the other of the source and the drain, and a gate, respectively.

The term "voltage" generally means a difference between potentials at two points (a potential difference). However, voltage and potential may be both represented by volts (V) in a circuit diagram or the like; thus, it is difficult to distinguish them. For this reason, in this specification, a potential difference between a potential at one point and a potential to be a reference (a reference potential) is used as voltage at the point in some cases unless otherwise specified.

The display data signal output circuit 112 can output data of an image signal as a display data signal when the transistor is on. The transistor can be controlled by inputting a control signal that is a pulse signal to the current control terminal. Note that in the case where the number of display circuits 115d is more than one, a plurality of transistors may be selectively turned on or off so that data of image signals is output as a plurality of display data signals.

The photodetection reset signal output circuit 113a has a function of outputting photodetection reset signals that are pulse signals (signals PRST).

The photodetection reset signal output circuit 113a includes a shift register, for example. The photodetection reset signal output circuit 113a can output photodetection reset signals by outputting pulse signals from the shift register.

The output selection signal output circuit 113b has a function of outputting output selection signals that are pulse signals (signals OSEL).

The output selection signal output circuit 113b includes a shift register, for example. The output selection signal output circuit 113b can output selection signals by outputting pulse signals from the shift register.

The light unit 114 is a light-emitting unit including a light source.

The light unit 114 includes V (V is a natural number) light-emitting diodes 141 and W (W is a natural number) light-emitting diodes 142 which serve as light sources.

The light-emitting diode 141 emits light of wavelengths in the visible region (e.g., wavelengths in the range of 360 to 830 nm). A white light-emitting diode, for example, can be used as the light-emitting diode 141. A red light-emitting diode, a green light-emitting diode, and a blue light-emitting diode can be used as the light-emitting diodes 141. Note that the number of light-emitting diodes emitting different colors of light may be more than one. When a red light-emitting diode, a green light-emitting diode, and a blue light-emitting diode are used, a full-color image can be displayed and full-color detection of an object to be detected can be performed by, for example, sequentially making the red light-emitting diode, the green light-emitting diode, and the blue light-emitting diode emit light in each period set in accordance with the display selection signal. Note that a light-emitting diode emitting light of wavelengths in the visible region is called a visible-light-emitting diode or LED (Vi).

The light-emitting diode 142 emits light of wavelengths in the infrared region (e.g., a region in which the wavelengths of light are larger than those in the visible region and lower than or equal to 1000 nm). Note that a light-emitting diode emitting light of wavelengths in the infrared region is referred to as an infrared-light-emitting diode or LED (IR).

Further, the light unit 114 includes a region A (Vi) which is brought into the lighted condition when the light-emitting diodes 141 emit light, and a region B (IR) which is in the lighted condition when the light-emitting diodes 142 emit light.

It is also acceptable that a control circuit that controls light emission of the light-emitting diodes 141 and the light-emitting diodes 142 is provided and the light-emitting diodes 141 and the light-emitting diodes 142 are controlled in accordance with a control signal that is a pulse signal input to the control circuit. When the number of light-emitting diodes 141 and the number of light-emitting diodes 142 are more than one, light emission of a plurality of light-emitting diodes 141 may be controlled at once and light emission of a plurality of light-emitting diodes 142 may be controlled at once. Note that the pulse frequency of a control signal (a control signal ViCTL) controlling the light-emitting state of the light-emitting diode 141; and the pulse frequency of a control signal (a control signal IRCTL) controlling the light-emitting state of the light-emitting diode 142 are set as appropriate. For example, the frequency of the control signal IRCTL may be higher than that of the control signal ViCTL.

The display circuit 115d overlaps with the light unit 114. To the display circuit 115d, a display selection signal that is a pulse signal is input, and a display data signal is input in accordance with the input display selection signal. The display circuit 115d changes its display state in accordance with data of the input display data signal.

The display circuit 115d includes a display selection transistor and a display element, for example.

The display selection transistor has a function of selecting whether data of a display data signal is input to the display element.

The display element changes its display state when the data of the display data signal is input to the display element in response to the behavior of the display selection transistor.

As the display element, a liquid crystal element or the like can be used, for example.

As a display mode of the input/output device including a liquid crystal element, a TN (twisted nematic) mode, an IPS (in-plane-switching) mode, an STN (super twisted nematic) mode, a VA (vertical alignment) mode, an ASM (axially symmetric aligned micro-cell) mode, an OCB (optically compensated birefringence) mode, an FLC (ferroelectric liquid crystal) mode, an AFLC (antiferroelectric liquid crystal) mode, an MVA (multi-domain vertical alignment) mode, a PVA (patterned vertical alignment) mode, an ASV (advanced super view) mode, a FFS (fringe field switching) mode, or the like may be used.

The photodetector circuit 115p overlaps with the light unit 114. A photodetection reset signal and an output selection signal are input to the photodetector circuit 115p. Further, photodetector circuits 115p for detecting red light, green light, and blue light can also be provided. For example, full-color image data can be generated by generating optical data with the photodetector circuits 115p for detecting light of these colors with the use of red, green, and blue color filters and by generating image data by combining a plurality of pieces of generated optical data.

The photodetector circuit 115p is reset in accordance with a photodetection reset signal.

In addition, the photodetector circuit 115p has a function of generating data that is a voltage based on the illuminance of incident light (such data is referred to as optical data or PDATA) in accordance with a photodetection control signal.

Further, the photodetector circuit 115p has a function of outputting the generated optical data as an optical data signal in accordance with an output selection signal.

The photodetector circuit 115p includes, for example, a photoelectric transducer (PCE), an amplifier transistor, and an output selection transistor.

The photoelectric transducer is supplied with current (also referred to as photocurrent) by incidence of light on the photoelectric transducer in accordance with the illuminance of incident light.

An output selection signal is input to a current control terminal of the output selection transistor. The output selection transistor has a function of selecting whether optical data is output as an optical data signal from the photodetector circuit 115p.

Note that the photodetector circuit 115p outputs optical data as an optical data signal from a first current terminal or a second current terminal of the amplifier transistor.

The reading circuit 116 has a function of selecting the photodetector circuit 115p used to read optical data and reading the optical data from the selected photodetector circuit 115p.

The reading circuit 116 includes a selection circuit, for example. For example, the selection circuit includes a transistor. The selection circuit can read optical data by inputting an optical data signal from the photodetector circuit 115p in response to the behavior of the transistor.

Further, the data processor 102 includes a memory portion (MEMORY) 121, a difference data generator (DIFG) 122, a coordinate detector (COOD) 123, a program execution unit (PGRM) 124, and a display data generator (DDG) 125.

The memory portion 121 has a function of sequentially storing data of an optical data signal input from the input/output unit 101.

The memory portion 121 includes a plurality of unit memory circuits and a memory control circuit that selects a unit memory circuit storing data and selects a unit memory circuit reading the data, for example.

An optical data signal is input to the difference data generator 122 from the input/output unit 101. The difference data generator 122 has a function of selectively reading data from the memory portion 121 in accordance with data of the optical data signal and generating difference data of data of the optical data signal and optical data read from the memory portion 121.

The difference data generator 122 includes a memory data output selection circuit selectively outputting data read from the memory portion 121; and a difference arithmetic circuit to which an optical data signal that is the same as the optical data signal input to the memory portion 121 and which generates difference data of data of the input optical data signal and optical data input from the memory data output selection circuit, for example.

The coordinate detector 123 has a function of detecting, when an object to be detected is over the pixel area 101c, the coordinates of the object on the basis of the input data.

The coordinate detector 123 is software, for example.

The program execution unit 124 has a function of executing a program in accordance with the input data.

The program execution unit 124 is software, for example.

The display data generator 125 has a function of generating image data to be data of a display data signal that the display circuit 115d in the input/output unit 101 uses to display an image, in accordance with the input data.

The display data generator 125 is software, for example.

Next, as an example of a method for driving the input/output device of this embodiment, an example of a method for driving the input/output device illustrated in FIG. 1A will be described with reference to FIG. 1B. FIG. 1B is a diagram for describing the example of a method for driving the input/output device illustrated in FIG. 1A. Note that data is expressed as an ellipse in FIG. 1B.

First, an optical data generation step is performed as a step S11_1.

In the optical data generation step, a region A (Vi) and a region B (IR) in the light unit 114 are selectively lit every period, so that Y pieces of optical data based on the intensity of light entering each of the Y photodetector circuits 115p are generated every period. Note that before optical data is generated, Y photodetector circuits 115p are reset in accordance with a photodetection reset-signal.

Specifically, in the light unit 114, optical data D1 is generated by putting the region A (Vi) in the lighted condition ($L_{ON}$) and the region B (IR) in the lighted condition as shown in FIG. 1B.

Further, in the light unit 114, optical data D2 is generated by putting the region A (Vi) in an unlighted condition ($L_{OFF}$) and the region B (IR) in the lighted condition.

Moreover, in the light unit 114, the region A (Vi) is put in the lighted condition and the region B (IR) is put in the unlighted condition, thereby generating optical data D3.

Further, in the light unit 114, the region A (Vi) is put in the unlighted condition and the region B (IR) is put in the unlighted condition, thereby generating optical data D4.

Note that there is no particular limitation on the order in which optical data D1 to D4 are generated.

Moreover, each of the Y photodetector circuits 115*p* sequentially outputs some pieces of optical data (optical data D1 to D4), which have been generated every period, as optical data signals in response to an output selection signal. Further, the reading circuit 116 sequentially reads and then outputs the pieces of optical data output from the photodetector circuits 115*p*, so that optical data signals are output to the data processor 102.

Moreover, the pieces of data of optical data signals (optical data) sequentially input from the input/output unit 101 are sequentially stored in any one of the unit memory circuits. Here, a unit memory circuit to store an optical data signal is selected according to the type of data of the optical data signal (optical data D1 to D4). Note that for example, a unit memory circuit can be selected by a control signal that controls the light-emitting states of the light-emitting diodes 141 and the light-emitting diodes 142 included in the light unit 114. In addition, the memory portion 121 selectively outputs data stored in the unit memory circuits to the difference data generator 122.

Next, a difference data generation step is performed as a step S12.

In the difference data generation step, difference data of optical data input from the memory portion 121 to the difference data generator 122 and data of an optical data signal (optical data) sequentially input from the memory portion 121 to the difference data generator 122 is generated.

Note that examples of difference data that can be generated include difference data of optical data D1 and optical data D2 (difference data D1D2), difference data of optical data D1 and optical data D3 (difference data D1D3), difference data of optical data D1 and optical data D4 (difference data D1D4), difference data of optical data D2 and optical data D3 (difference data D2D3), difference data of optical data D2 and optical data D4 (difference data D2D4), and difference data of optical data D3 and optical data D4 (difference data D3D4).

Note that all the six difference data above are not necessarily generated; one or more of the pieces of difference data is generated as needed. For example, the type of difference data to be generated can be selected when the memory portion 121 or the difference data generator 122 reads optical data from one or more unit memory circuits included in the memory portion 121.

Further, a coordinate detection step is performed as a step S13_1.

In the coordinate detection step, when an object to be detected is over the pixel area 101*c*, the coordinate detector 123 detects the coordinates of the object overlapping with the pixel area 101*c* by reference to image data generated from difference data.

Detected coordinates are used as coordinate data, for example, to select a program executed by the program execution unit 124.

Then, an image data generation step is performed as a step S13_2.

In the image data generation step, the display data generator 125 generates image data from at least the optical data D3 included in data obtained by the above steps. Note that as shown in FIG. 1B, when the difference data D1D2 is generated in the difference data generation step, the display data generator 125 can generate image data also from the difference data D1D2. Generating image data from the difference data D1D2 enables information on the light around the input/output device to be removed from the image data.

Image data generated by the display data generator 125 is used as a display data signal.

A display data signal with image data generated by the display data generator 125 is input to the display circuit 115*d* in accordance with a display selection signal. Here, the display circuit 115*d* is in the display condition that depends on data of a display data signal. This is the example of the method of driving the input/output device shown in FIG. 1A.

Figure 2:
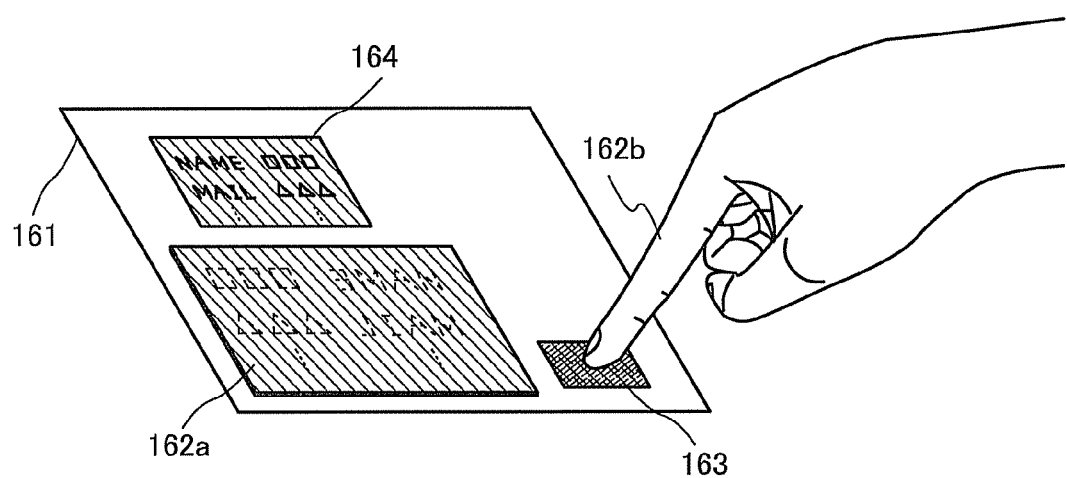
FIG. 2 is a schematic view for describing a functional example of the input/output device of Embodiment 1.

An example of a function of the input/output device of this embodiment will be described with reference to FIG. 2. FIG. 2 is a diagram for describing an example of a function of the input/output device of this embodiment.

Suppose, for example, that an object 162*a* to be detected is placed over a pixel area 161 as shown in FIG. 2. Further, a button image 163 with which the reading can be started is displayed on the pixel area 161, and an object 162*b* to be detected is placed over the button image 163. Then, the input/output device generates optical data based on the intensity of light reflected off the object 162*a*, and optical data based on the intensity of light reflected off the object 162*b*. Moreover, the input/output device generates difference data of two pieces of optical data generated every period on the basis of the intensity of light reflected off the object 162*b*, detects the coordinates of the object 162*b* by reference to the difference data, and executes a program in accordance with the coordinate data obtained. Here, the input/output device generates image data from the optical data D3 included in optical data generated every period according to the intensity of light reflected off the object 162*a*, and displays a read image 164 based on a display data signal with the generated image data of the pixel area 161.

Note that image data may be generated from the difference data D1D2 instead of from the optical data D3. Note that the above function example may be a function that switches, in the reading mode for example, only when the object 162*b* is placed over particular coordinates in the pixel area 161.

As described with reference to FIGS. 1A and 1B and FIG. 2, an example of the input/output device of this embodiment includes, in its input/output, the display circuit, the photodetector circuit, and the light unit. The light unit includes the light-emitting diodes emitting light of wavelengths in the visible region, and the light-emitting diodes emitting light of wavelengths in the infrared region.

Further, in an example of the input/output device of this embodiment, the visible-light-emitting diodes and the infrared-light-emitting diodes in the light unit are selectively made to emit light so that the lighted/unlighted condition of the light unit is made to differ from one period to another, optical data that differs from one period to another is generated by the photodetector circuit, and difference data of two different pieces of optical data is generated.

The above structure suppresses the adverse effect of light around the input/output device.

Further, in an example of the input/output device of this embodiment, image data is generated from optical data that does not include information on light emitted by the infrared-light-emitting diodes in the light unit and includes information on light emitted by the visible-light-emitting diodes in the light unit. The above structure can reduce noise caused in generated image data by infrared light even when the coordinates of an object to be detected are detected by reference to difference data.

Thus, when the coordinates of an object to be detected are detected by reference to optical data and when image data is generated from optical data, photodetection accuracy can be improved.

Embodiment 2

In this embodiment, an example of an input/output device that can output data and can input data by using incident light is described. Note that the same portions as those in Embodiment 1 will be described with reference to the description in Embodiment 1 as appropriate and the description of that part will be omitted as appropriate in this embodiment.

Figure 3A:
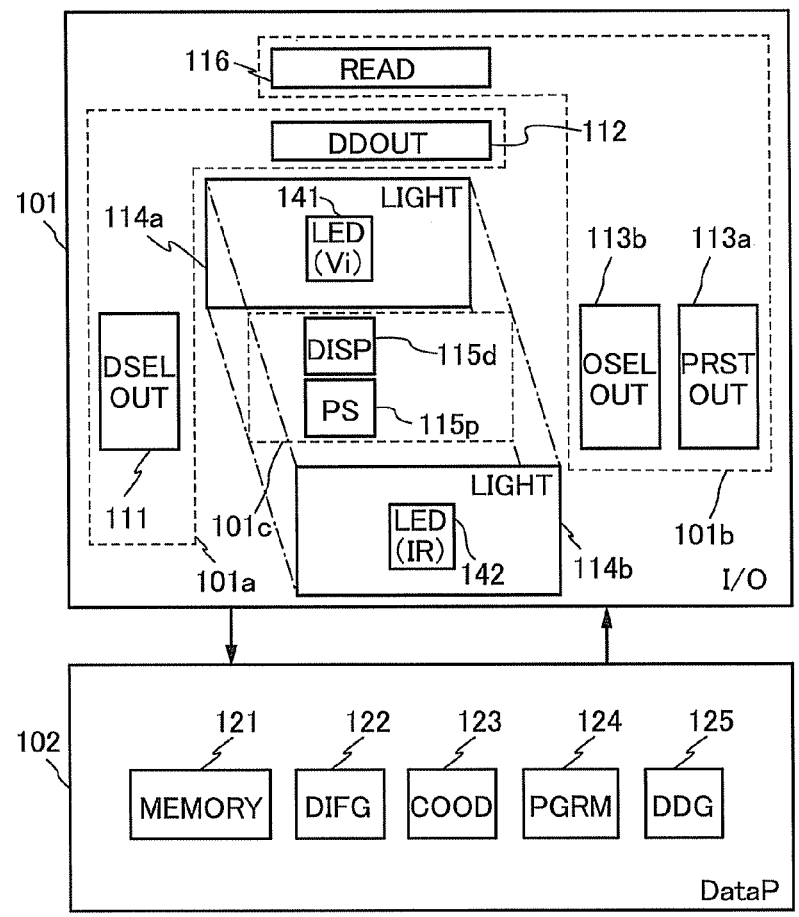
FIGS. 3A and 3B are diagrams illustrating an input/output device of Embodiment 2.
Figure 3B:
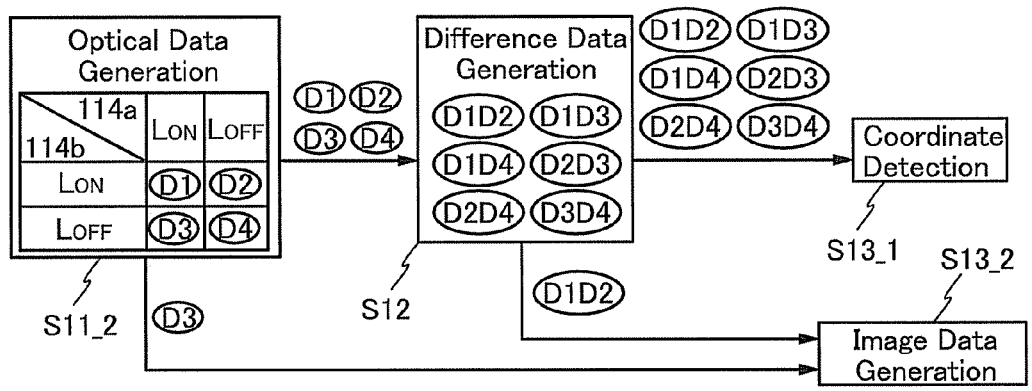

An example of the input/output device of this embodiment will be described with reference to FIGS. 3A and 3B. FIGS. 3A and 3B are diagrams for describing an example of the input-output device of this embodiment.

First, a structural example of the input/output device of this embodiment will be described with reference to FIG. 3A. FIG. 3A is a schematic diagram illustrating a structural example of the input/output device of this embodiment.

An input/output device shown in FIG. 3A includes an input/output (I/O) 101 and a data processor (DataP) 102. Note that the data processor 102 is the same as that in the input/output device shown in FIG. 1A and thus will be described with reference to the description of each component in the input/output device shown in FIG. 1A as appropriate.

The input/output unit 101 will be further described below.

The input/output unit 101 includes the display selection signal output circuit 111, the display data signal output circuit 112, the photodetection reset signal output circuit 113a, the output selection signal output circuit 113b, a light unit 114a, and a light unit 114b, X display circuits 115d, Y photodetector circuits 115p, and the reading circuit 116.

The display selection signal output circuit 111, the display data signal output circuit 112, the photodetection reset signal output circuit 113a, the output selection signal output circuit 113b, X display circuits 115d, Y photodetector circuits 115p, and the reading circuit 116 are the same as those in the input/output device shown in FIG. 1A and thus will be described with reference to the description of each component in the input/output device shown in FIG. 1A as appropriate.

A light unit 114a and a light unit 114b are light-emitting units including light sources.

The light unit 114a includes V light-emitting diodes 141 serving as light sources. Note that the light-emitting diode 141 is the same as the light-emitting diode 141 shown in FIG. 1A and thus will be described with reference to the description of the light-emitting diode 141 shown in FIG. 1A as appropriate.

The light unit 114b includes W light-emitting diodes 142 serving as light sources and a light guide plate that light emitted by the light-emitting diodes 142 enters.

The light-emitting diode 142 emits light of wavelengths in the infrared region. Note that the light-emitting diode 142 is the same as the light-emitting diode 142 shown in FIG. 1A and thus will be described with reference to the description of the light-emitting diode 142 shown in FIG. 1A as appropriate.

Note that for example, a control circuit controlling light emission of the light-emitting diode 141 is provided in the light unit 114a, allowing light emission of the light-emitting diode 141 to be controlled in accordance with a control signal input to the control circuit. Further, for example, a control circuit controlling light emission of the light-emitting diode 142 is provided in the light unit 114b, allowing light emission of the light-emitting diode 142 to be controlled in accordance with a control signal input to the control circuit. When the number of light-emitting diodes 141 and the number of light-emitting diodes 142 are more than one, light emission of a plurality of light-emitting diodes 141 may be controlled at once and light emission of a plurality of light-emitting diodes 142 may be controlled at once.

The light unit 114b makes light emitted by the light-emitting diode 142 enter the light guide plate. Further, when an object to be detected touches the light guide plate, light emitted by the light-emitting diode 142 reflects on a contact portion between the object and the light guide plate and enters the photodetector circuit 115p.

Next, as an example of a method for driving the input/output device of this embodiment, an example of a method for driving the input/output device illustrated in FIG. 3A will be described with reference to FIG. 3B. FIG. 3B is a timing chart for describing the example of a method for driving the input/output device illustrated in FIG. 3A. Note that data is expressed as an ellipse in FIG. 3B.

First, an optical data generation step is performed as a step S11_2.

In the optical data generation step, the light unit 114a and the light unit 114b are selectively lit every period, so that Y pieces of optical data based on the intensity of light entering each of the Y photodetector circuits 115p are generated every period. Note that before optical data is generated, Y photodetector circuits 115p are reset in accordance with a photodetection reset-signal.

Specifically, as shown in FIG. 3B, optical data D1 is generated by bringing the light unit 114a into the lighted condition and the light unit 114b into the lighted condition.

Further, optical data D2 is generated by bringing the light unit 114a into the unlighted condition and the light unit 114b into the lighted condition.

Further, the optical data D3 is generated by putting the light unit 114a in the lighted condition and the light unit 114b in the unlighted condition.

Further, the optical data D4 is generated by putting the light unit 114a in the unlighted condition and the light unit 114b in the unlighted condition.

Note that there is no particular limitation on the order in which optical data D1 to D4 are generated.

Moreover, the Y photodetector circuits 115p sequentially output the pieces of optical data (optical data D1 to D4), which have been generated every period, as optical data signals in accordance with an output selection signal. Further, the reading circuit 116 sequentially reads and then outputs the pieces of optical data output from the photodetector circuits 115p, so that optical data signals are output to the data processor 102.

Moreover, data of optical data signals (optical data) sequentially input from the input/output unit 101 are each stored sequentially in any one of the unit memory circuits. Here, a unit memory circuit for an optical data signal is selected according to the type of data (optical data D1 to D4). Note that for example, a unit memory circuit can be selected by a control signal that controls the light-emitting states of the light-emitting diode 141 and the light-emitting diode 142 included in the light unit 114. In addition, the memory portion 121 selectively outputs data stored in the unit memory circuits to the difference data generator 122.

Then, difference data generation is performed as a step S12, coordinate detection is performed as a step S13_1, and image data generation is performed as a step S13_2. Note that the difference data generation, the coordinate detection, and the image data generation are the same as those in the driving method of the input/output device in FIG. 1B, and thus will be explained with reference to the description of the driving method of the input/output device in FIG. 1B as appropriate.

As described with reference to FIGS. 3A and 3B, an example of the input/output device of this embodiment includes, in its input/output unit, a display circuit; a photodetector circuit; a first light unit including a light-emitting diode emitting light of wavelengths in the visible region; and a second light unit including a light-emitting diode emitting light of wavelengths in the infrared region and a light guide plate that light emitted by the light-emitting diode emitting light of wavelengths in the visible region enters. The above structure allows light reflected off an object to be detected to enter the photodetector circuit only when the object contacts the light guide plate in the second light unit. This improves photodetection accuracy and suppresses, when optical data is generated, the adverse effect of light around the input/output device or the adverse effect of light emitted by the light-emitting diode emitting light of wavelengths in the visible region.

Further, in an example of the input/output device of this embodiment, the first light unit and the second light unit are selectively made to emit light so that the lighted conditions of the first and second light units are made to differ from one period to another, some kinds of optical data that differ from one period to another are generated by the photodetector circuit, and difference data of two different pieces of optical data is generated. The above structure can suppress the adverse effect of light around the input/output device.

Further, in an example of the input/output device of this embodiment, image data is generated from optical data without information on light emitted by the infrared-light-emitting diode in the second light unit and with information on light emitted by the visible-light-emitting diode in the first light unit. The above structure can reduce noise caused in generated image data by infrared light even when the coordinates of an object are detected by reference to difference data.

Thus, when the coordinates of an object are detected by reference to optical data and when image data is generated from optical data, photodetection accuracy can be improved.

Embodiment 3

In this embodiment, a structural example of the memory portion and the difference data generator in the input/output device of the above embodiments will be described.

Figure 4A:
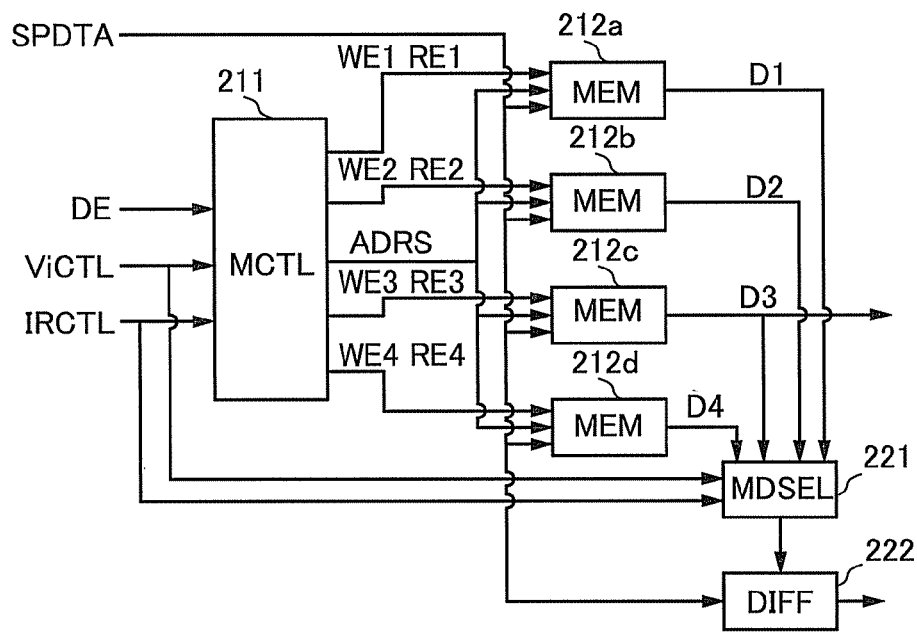
FIGS. 4A and 4B are diagrams illustrating a structural example of a memory portion and a difference data generator of Embodiment 3.
Figure 4B:
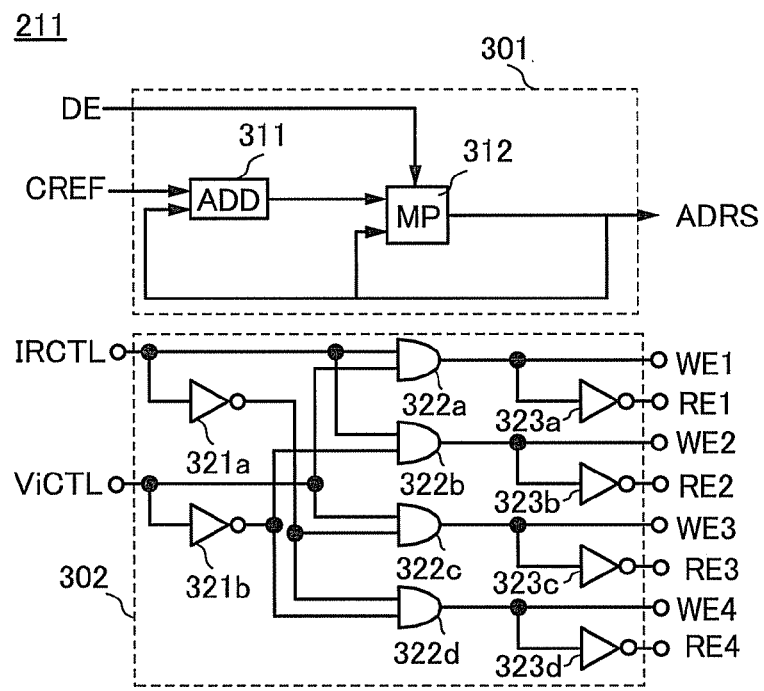

A structural example of a memory portion and a difference data generator of this embodiment will be described with reference to FIGS. 4A and 4B. FIGS. 4A and 4B are diagrams for describing a structural example of the memory portion and the difference data generator of this embodiment.

First, a structural example of the memory portion and the difference data generator of this embodiment will be described with reference to FIG. 4A. FIG. 4A is a circuit diagram showing a structural example of the memory portion and the difference data generator of this embodiment.

In FIG. 4A, the memory portion includes a memory control circuit (MCTL) 211 and unit memory circuits (MEM) 212a to 212d.

In addition, in FIG. 4A, the difference data generator includes a memory data output selection circuit (MDSEL) 221 and a difference arithmetic circuit (DIFF) 222.

First, the components of the memory portion will be described below.

To the memory control circuit 211, a data control signal (a signal DE), a control signal ViCTL, and a control signal IRCTL are input. The data control signal is a signal controlling the input of data of a display data signal to be input to the display circuit 115d shown in FIG. 1A. The memory control circuit 211 outputs an address signal (a signal ADRS), a plurality of write control signals (write control signals WE1 to WE4 (signals WE1 to WE4)), and a plurality of read control signals (read control signals RE1 to RE4 (signals RE1 to RE4)) to the unit memory circuits 212a to 212d.

To the unit memory circuit 212a, an optical data signal (a signal SPDTA), the signal WE1, the signal RE1, and the signal ADRS are input. In addition, the unit memory circuit 212a stores optical data D1 of data of the optical data signal, and reads and outputs the stored optical data D1 in accordance with the signal WE1, the signal RE1, and the signal ADRS.

To the unit memory circuit 212b, the signal SPDTA, the signal WE2, the signal RE2, and the signal ADRS are input. In addition, the unit memory circuit 212b stores optical data D2 of data of the optical data signal, and reads and outputs the stored optical data D2 in accordance with the signal WE2, the signal RE2, and the signal ADRS.

To the unit memory circuit 212c, the signal SPDTA, the signal WE3, the signal RE3, and the signal ADRS are input. In addition, the unit memory circuit 212c stores optical data D3 of data of the optical data signal in accordance with the signal WE3, the signal RE3, and the signal ADRS, and reads and outputs the stored optical data D3. Note that the read optical data D3 can be used for the image data generation when output to the display data generator of the above embodiments as it is.

To the unit memory circuit 212d, the signal SPDTA, the signal WE4, the signal RE4, and the signal ADRS are input. In addition, the unit memory circuit 212d stores optical data D4 of data of the optical data signal in accordance with the signal WE4, the signal RE4, and the signal ADRS, and reads and outputs the stored optical data D4.

Further, a structural example of the memory control circuit 211 will be described with reference to FIG. 4B. FIG. 4B is a circuit diagram showing a structural example of the memory control circuit shown in FIG. 4A.

The memory control circuit 211 shown in FIG. 4B includes an address signal generation circuit 301 and a memory signal generation circuit 302.

The address signal generation circuit 301 includes an adder circuit (ADD) 311 and a multiplexer (MP) 312.

To the adder circuit 311, a signal CREF representing a reference number and an output signal of the multiplexer 312 are input.

To the multiplexer 312, the data control signal and the output signal of the multiplexer 312 itself are input. The multiplexer 312 determines whether or not the output signal of the adder circuit 311 is output, in accordance with the data control signal.

The memory signal generation circuit 302 includes a NOT gate 321a, a NOT gate 321b, AND gates 322a to 322d, and NOT gates 323a to 323d.

The NOT gate 321a includes a signal input terminal and a signal output terminal. The control signal IRCTL is input to the NOT gate 321a.

The NOT gate 321b includes a signal input terminal and a signal output terminal. The control signal ViCTL is input to the NOT gate 321b.

The AND gate 322a includes a first signal input terminal, a second signal input terminal, and a signal output terminal. The control signal IRCTL is input to the first signal input terminal of the AND gate 322a. The control signal ViCTL is input to the second signal input terminal of the AND gate 322a. In addition, the AND gate 322a outputs a signal generated in accordance with a signal input to the AND gate 322a via the first signal input terminal and the second signal input terminal of the AND gate 322a. The output signal of the AND gate 322a is the signal WE1.

The AND gate 322b includes a first signal input terminal, a second signal input terminal, and a signal output terminal. The control signal IRCTL is input to the first signal input terminal of the AND gate 322b. The second signal input terminal of the AND gate 322b is electrically connected to the signal output terminal of the NOT gate 321b. The AND gate 322b outputs a signal generated in accordance with a signal input to the AND gate 322b via the first signal input terminal and the second signal input terminal of the AND gate 322b The output signal of the AND gate 322b is the signal WE2.

The AND gate 322c includes a first signal input terminal, a second signal input terminal, and a signal output terminal. The control signal ViCTL is input to the first signal input terminal of the AND gate 322c. The second signal input terminal of the AND gate 322c is electrically connected to the signal output terminal of the NOT gate 321a. The AND gate 322c outputs a signal generated in accordance with a signal input to the AND gate 322c via the first signal input terminal and the second signal input terminal of the AND gate 322c. The output signal of the AND gate 322c is the signal WE3.

The AND gate 322d includes a first signal input terminal, a second signal input terminal, and a signal output terminal. The first signal input terminal of the AND gate 322d is electrically connected to the signal output terminal of the NOT gate 321a. The second signal input terminal of the AND gate 322d is electrically connected to the signal output terminal of the NOT gate 321b. The AND gate 322d outputs a signal generated in accordance with a signal input to the AND gate 322d via the first signal input terminal and the second signal input terminal of the AND gate 322d. The output signal of the AND gate 322d is the signal WE4.

The NOT gate 323a includes a signal input terminal and a signal output terminal. The signal input terminal of the NOT gate 323a is electrically connected to the signal output terminal of the AND gate 322a. Further, the NOT gate 323a outputs a signal generated in accordance with a signal input to the NOT gate 323a via the signal input terminal of the NOT gate 323a. The output signal of the NOT gate 323a is the signal RE1.

The NOT gate 323b includes a signal input terminal and a signal output terminal. The signal input terminal of the NOT gate 323b is electrically connected to the signal output terminal of the AND gate 322b. Further, the NOT gate 323b outputs a signal generated in accordance with a signal input to the NOT gate 323b via the signal input terminal of the NOT gate 323b. The output signal of the NOT gate 323b is the signal RE2.

The NOT gate 323c includes a signal input terminal and a signal output terminal. The signal input terminal of the NOT gate 323c is electrically connected to the signal output terminal of the AND gate 322c. Further, the NOT gate 323c outputs a signal generated in accordance with a signal input to the NOT gate 323c via the signal input terminal of the NOT gate 323c. The output signal of the NOT gate 323c is the signal RE3.

The NOT gate 323d includes a signal input terminal and a signal output terminal. The signal input terminal of the NOT gate 323d is electrically connected to the signal output terminal of the AND gate 322d. Further, the NOT gate 323d outputs a signal generated in accordance with a signal input to the NOT gate 323d via the signal input terminal of the NOT gate 323d. The output signal of the NOT gate 323d is the signal RE4.

Next, the components of the difference data generator will be described below.

To the memory data output selection circuit 221, the control signal ViCTL and the control signal IRCTL are input. The memory data output selection circuit 221 has a function of selecting and outputting one of the optical data D1 to D4 read from the unit memory circuits 212a to 212d in accordance with the control signal ViCTL and the control signal IRCTL input to the memory data output selection circuit 221.

To the difference arithmetic circuit 222, the optical data signal SPDTA is input. The difference arithmetic circuit 222 has a function of generating and outputting difference data of data of the input optical data signal SPDTA and the optical data from the memory data output selection circuit 221 by arithmetic processing.

As described with reference to FIGS. 4A and 4B, an example of the memory portion of this embodiment includes the memory control circuit and a plurality of unit memory circuits provided to cover the variation of optical data. In addition, an example of the difference data generator of this embodiment includes the memory data output selection circuit selectively outputting any one of the pieces of optical data read by the memory circuits in the memory; and the difference arithmetic circuit generating difference data of data of the optical data signal and the optical data from the memory data output selection circuit. The above structure allows the input/output unit to select generated optical data as appropriate according to the type and perform difference data generation and image data generation.

Embodiment 4

In this embodiment, examples of the photodetector circuit in the input/output device of the above embodiment are described.

Examples of the photodetector circuit in this embodiment will be described with reference to FIGS. 5A to 5F. FIGS. 5A to 5F illustrate the examples of the photodetector circuit of this embodiment.

Figure 5A:
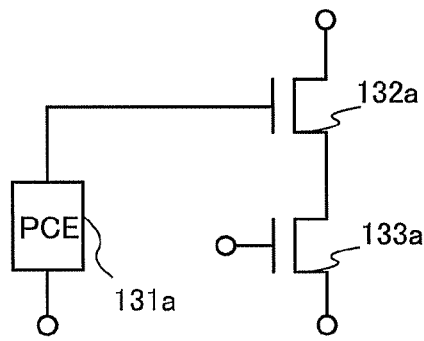
FIGS. 5A to 5F are diagrams for describing examples of a photodetector circuit of Embodiment 4.
Figure 5D:
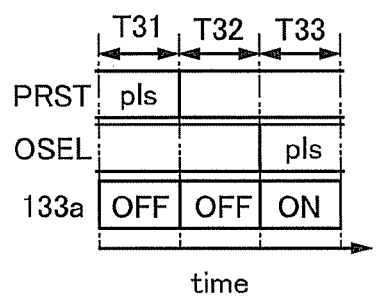
Figure 5B:
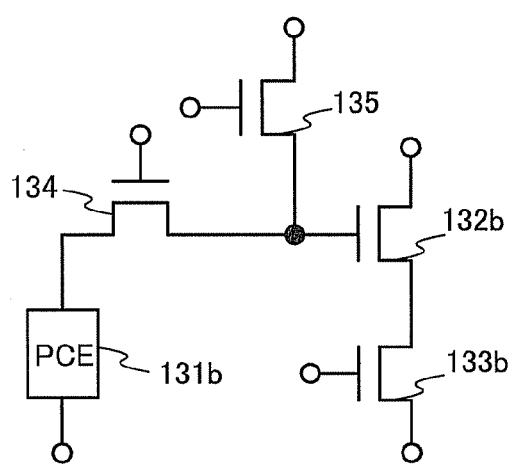
Figure 5E:
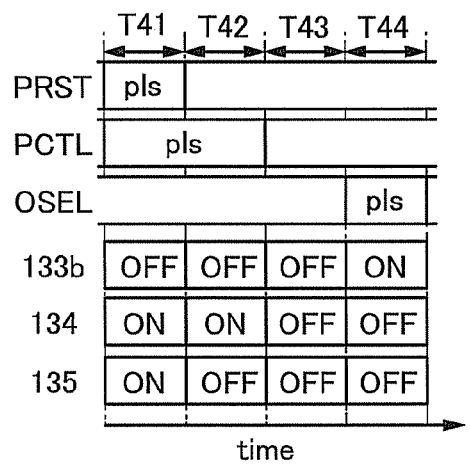
Figure 5C:
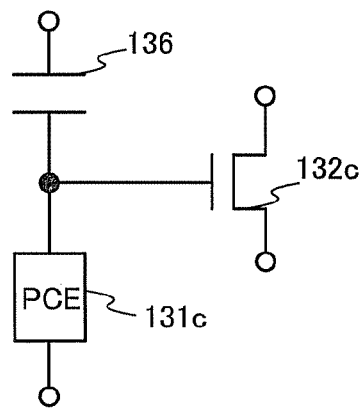

First, structural examples of the photodetector circuit of this embodiment will be described with reference to FIGS. 5A to 5C. FIGS. 5A to 5C illustrate the structural examples of the photodetector circuit of this embodiment.

The photodetector circuit illustrated in FIG. 5A includes a photoelectric transducer 131a, a transistor 132a, and a transistor 133a.

Note that in the photodetector circuit illustrated in FIG. 5A, the transistor 132a and the transistor 133a are field-effect transistors.

The photoelectric transducer 131a has a first current terminal and a second current terminal. A signal PRST is input to the first current terminal of the photoelectric transducer 131a.

A gate of the transistor 132a is electrically connected to the second current terminal of the photoelectric transducer 131a.

One of a source and a drain of the transistor 133a is electrically connected to one of a source and a drain of the transistor 132a. A signal OSEL is input to a gate of the transistor 133a.

Voltage Va is applied to either the other of the source and the drain of the transistor 132a or the other of the source and the drain of the transistor 133a.

In addition, the photodetector circuit illustrated in FIG. 5A outputs optical data from the rest of the other of the source and the drain of the transistor 132a or the other of the source and the drain of the transistor 133a as an optical data signal.

The photodetector circuit illustrated in FIG. 5B includes a photoelectric transducer 131b, a transistor 132b, a transistor 133b, a transistor 134, and a transistor 135.

Note that in the photodetector circuit illustrated in FIG. 5B, the transistor 132b, the transistor 133b, the transistor 134, and the transistor 135 are field-effect transistors.

The photoelectric transducer 131b has a first current terminal and a second current terminal. Voltage Vb is input to the first current terminal of the photoelectric transducer 131b.

Note that one of the voltage Va and the voltage Vb is high power supply voltage Vdd, and the other of the voltage Va and the voltage Vb is low power supply voltage Vss. The high supply voltage Vdd is voltage whose level is relatively higher than that of the low supply voltage Vss. The low supply voltage Vss is voltage whose level is relatively lower than that of the high supply voltage Vdd. The level of the voltage Va and the level of the voltage Vb might interchange depending, for example, on the polarity of the transistor. A difference between the voltage Va and the voltage Vb is power supply voltage.

One of a source and a drain of the transistor 134 is electrically connected to the second current terminal of the photoelectric transducer 131b. A photo detection control signal (a signal PCTL) is input to a gate of the transistor 134. The photo detection control signal is a pulse signal.

A gate of the transistor 132b is electrically connected to the other of the source and the drain of the transistor 134.

The voltage Va is applied to one of a source and a drain of the transistor 135. The other of the source and the drain of the transistor 135 is electrically connected to the other of the source and the drain of the transistor 134. A signal PRST is input to a gate of the transistor 135.

One of a source and a drain of the transistor 133b is electrically connected to one of a source and a drain of the transistor 132b. A signal OSEL is input to a gate of the transistor 133b.

The voltage Va is applied to either the other of the source and the drain of the transistor 132b or the other of the source and the drain of the transistor 133b.

In addition, the photodetector circuit illustrated in FIG. 5B outputs optical data from the rest of the other of the source and the drain of the transistor 132b or the other of the source and the drain of the transistor 133b as an optical data signal.

Note that when the input/output unit includes a plurality of the photodetector circuits shown in FIG. 5B, the same photodetection control signal can be input to all the photodetector circuits. A driving method in which the same photodetection control signal is input to all the photodetector circuits to generate optical data is also called a global shutter method.

The photodetector circuit in FIG. 5C includes a photoelectric transducer 131c, a transistor 132c, and a capacitor 136.

The photoelectric transducer 131c has a first current terminal and a second current terminal. A reset signal PRST is input to the first current terminal of the photoelectric transducer 131c.

The capacitor 136 includes a first capacity electrode and a second capacity electrode. The signal OSEL is input to the first capacity electrode of the capacitor 136. The second capacity electrode of the capacitor 136 is electrically connected to the second current terminal of the photoelectric transducer 131c.

The voltage Va is applied to one of a source and a drain of the transistor 132c. A gate of the transistor 132c is electrically connected to the second current terminal of the photoelectric transducer 131c.

Note that the photodetector circuit in FIG. 5C outputs optical data as an optical data signal from the other of the source and the drain of the transistor 132c.

Further, the components of the photodetector circuits illustrated in FIGS. 5A to 5C will be described.

As the photoelectric transducers 131a to 131c, photodiodes, phototransistors, or the like can be used. In the case where the photoelectric transducers 131a to 131c are photodiodes, one of an anode and a cathode of the photodiode corresponds to the first current terminal of the photoelectric transducer, and the other of the anode and the cathode of the photodiode corresponds to the second current terminal of the photoelectric transducer. In the case where the photoelectric transducers 131a to 131c are phototransistors, one of a source and a drain of the phototransistor corresponds to the first current terminal of the photoelectric transducer, and the other of the source and the drain of the phototransistor corresponds to the second current terminal of the photoelectric transducer.

The transistors 132a to 132c function as amplifier transistors.

The transistor 134 functions as a photodetection control transistor. A photodetection control transistor has a function of controlling whether or not the voltage of the gate of an amplifier transistor is set to a value determined in accordance with photocurrent flowing through a photoelectric converter. Although the transistor 134 is not necessarily provided in the photodetector circuit of this embodiment, providing the transistor 134 allows the voltage of the gate of the transistor 132b to be held for a certain period of time when the gate of the transistor 132b is in a floating state.

The transistor 135 functions as a photodetection reset transistor. A photodetection reset selection transistor has a function of selecting whether or not the voltage of the gate of the amplifier transistor is set to a reference value.

The transistors 133a and 133b function as output selection transistors.

Note that as each of the transistors 132a, 132b, 132c, 133a, 133b, 134, and 135, for example, it is possible to use a transistor including a semiconductor layer containing a semiconductor that belongs to Group 14 in the periodic table (e.g., silicon) or an oxide semiconductor layer. Channels are formed in the semiconductor layer and the oxide semiconductor layer of the transistors. For example, with the use of the transistor including the oxide semiconductor layer, fluctuation in gate voltage due to the leakage current of each of the transistors 132a, 132b, 132c, 133a, 133b, 134, and 135 can be suppressed.

Next, examples of methods for driving the photodetector circuits illustrated in FIGS. 5A to 5C will be described.

First, the example of the method for driving the photodetector circuit illustrated in FIG. 5A will be described with reference to FIG. 5D. FIG. 5D is a timing chart for describing the example of the method for driving the photodetector circuit illustrated in FIG. 5A and illustrates the states of the signal PRST, the signal OSEL, and the transistor 133a. Note that the case where the photoelectric transducer 131a is a photodiode is described as an example here.

In the example of the method for driving the photodetector circuit illustrated in FIG. 5A, first, in a period T31, the pulse of the signal PRST is input.

In that case, the photoelectric transducer 131a is forward-biased, so that the transistor 133a is turned off.

At that time, the voltage of the gate of the transistor 132a is reset to a certain value.

Then, in the period T32 coining after the pulse of the signal PRST is input, the photoelectric transducer 131a is reverse-biased, and the transistor 133a is kept off.

At this time, photocurrent flows between the first current terminal and the second current terminal of the photoelectric transducer 131a in accordance with the illuminance of light incident on the photoelectric transducer 131a. Further, the voltage value of the gate of the transistor 132a is changed in accordance with the photocurrent. In that case, channel resistance between the source and the drain of the transistor 132a is changed.

Then, in a period T33, the pulse of the signal OSEL is input.

At this time, the photoelectric transducer 131a is kept reverse-biased, the transistor 133a is turned on, and current flows through the source and the drain of the transistor 132a and the source and the drain of the transistor 133a. The amount of the current flowing through the source and the drain of the transistor 132a and the source and the drain of the transistor 133a depends on the voltage value of the gate of the transistor 132a. Thus, optical data has a value based on the illuminance of light incident on the photoelectric transducer 131a. In addition, the photodetector circuit illustrated in FIG. 5A outputs optical data from the rest of the other of the source and the drain of the transistor 132a or the other of the source and the drain of the transistor 133a as an optical data signal. This is the example of the method for driving the photodetector circuit illustrated in FIG. 5A.

Next, the example of the method for driving the photodetector circuit illustrated in FIG. 5B will be described with reference to FIG. 5E. FIG. 5E is a timing chart for describing the example of the method for driving the photodetector circuit illustrated in FIG. 5B.

In the example of the method for driving the photodetector circuit illustrated in FIG. 5B, first, in a period T41, the pulse of the signal PRST is input. In the period T41 and a period T42, the pulse of the signal PCTL is input. Note that in the period T41, a timing of starting the input of the pulse of the signal PRST may be earlier than timing of starting the input of the signal PCTL.

At this time, in the period T41, the photoelectric transducer 131b is forward-biased, and the transistor 134 and the transistor 135 are turned on, so that the voltage value of the gate of the transistor 132b is reset to a value equivalent to the value of the voltage Va.

Further, in the period T42 coming after the pulse of the signal PRST is input, the photoelectric transducer 131b is reverse-biased, the transistor 134 is kept on, and the transistor 135 is turned off.

At this time, photocurrent flows between the first current terminal and the second current terminal of the photoelectric transducer 131b in accordance with the illuminance of light incident on the photoelectric transducer 131b. Further, the voltage value of the gate of the transistor 132b is changed in accordance with the photocurrent. In this case, channel resistance between the source and the drain of the transistor 132b is changed.

Further, in a period T43 coming after the signal PCTL is input, the transistor 134 is turned off.

At this time, the voltage of the gate of the transistor 132b is kept being a value determined in accordance with the photocurrent of the photoelectric transducer 131b in the period T42. Although the period T43 is not necessarily provided, providing the period T43 allows a timing of outputting a data signal in the photodetector circuit to be set as appropriate. For example, a timing of outputting a data signal in each of the plurality of photodetector circuits can be set as appropriate.

In a period T44, the pulse of the signal OSEL is input.

At this time, the photoelectric transducer 131b is kept reverse-biased and the transistor 133b is turned on.

Further at this time, current flows through the source and the drain of the transistor 132b and the source and the drain of the transistor 133b, and the photodetector circuit illustrated in FIG. 5B outputs optical data as a data signal from the rest of the other of the source and the drain of the transistor 132b or the other of the source and the drain of the transistor 133b. This is the example of the method for driving the photodetector circuit illustrated in FIG. 5B.

Figure 5F:
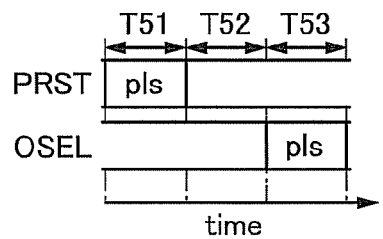

Next, the example of the driving method of the photodetector circuit in FIG. 5C will be described with reference to FIG. 5F. FIG. 5F is a timing chart for describing the example of the method for driving the photodetector circuit illustrated in FIG. 5C.

In the example of the method for driving the photodetector circuit illustrated in FIG. 5C, first, in a period T51, the pulse of the signal PRST is input.

At that time, the photoelectric transducer 131c is forward-biased and the voltage of the gate of the transistor 132c is reset to a certain value.

Then, in a period T52 coming after the pulse of the signal PRST is input, the photoelectric transducer 131c is reverse-biased.

At this time, photocurrent flows between the first current terminal and the second current terminal of the photoelectric transducer 131c in accordance with the illuminance of light incident on the photoelectric transducer 131c. Further, the voltage of the gate of the transistor 132c is changed in accordance with the photocurrent. In that case, the resistance value of a channel between the source and the drain of the transistor 132c is changed.

Then, in a period T53, the pulse of the signal OSEL is input.

At that time, the photoelectric transducer 131c is kept reverse-biased, a current flows between the source and the drain of the transistor 132c, and the photodetector circuit in FIG. 5C outputs optical data as a data signal from the other of the source and the drain of the transistor 132c. This is the example of the method for driving the photodetector circuit illustrated in FIG. 5C.

As described with reference to FIGS. 5A to 5F, the example of the photodetector of this embodiment includes the photoelectric transducer and the amplifier transistor. In the example of the photodetector of this embodiment, optical data is generated and is output as a data signal in accordance with an output selection signal. With such a structure, the photodetector can generate and output optical data.

Embodiment 5

In this embodiment, examples of the display circuit in the input/output device of the above embodiment are described.

Examples of the display circuit of this embodiment are described with reference to FIGS. 6A to 6D. FIGS. 6A to 6D illustrate the examples of the display circuit of this embodiment.

Figure 6A:
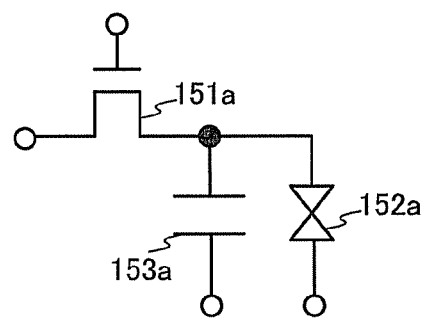
FIGS. 6A to 6D are diagrams for describing examples of a display circuit of Embodiment 5.
Figure 6C:
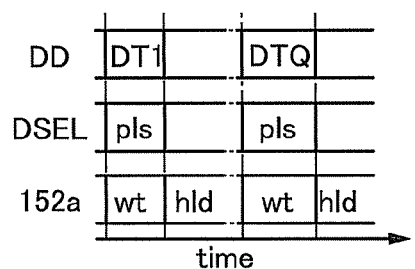
Figure 6B:
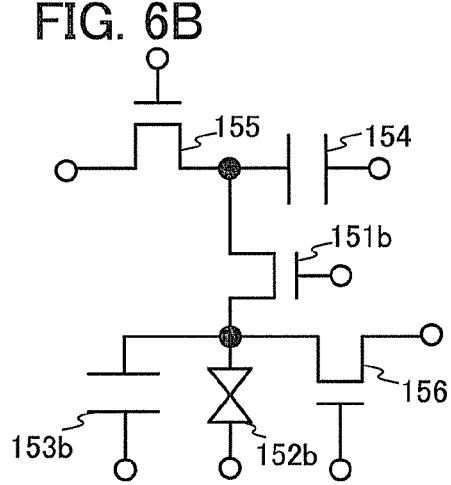

First, structural examples of the display circuit of this embodiment will be described with reference to FIGS. 6A and 6B. FIGS. 6A and 6B illustrate the structural examples of the display circuit of this embodiment.

The display circuit illustrated in FIG. 6A includes a transistor 151a, a liquid crystal element 152a, and a capacitor 153a.

Note that in the display circuit illustrated in FIG. 6A, the transistor 151a is a field-effect transistor.

In addition, in the input/output device, the liquid crystal element includes a first display electrode, a second display electrode, and a liquid crystal layer. The light transmittance of the liquid crystal layer changes depending on voltage applied between the first display electrode and the second display electrode.

Further, in the input/output device, the capacitor includes a first capacitor electrode, a second capacitor electrode, and a dielectric layer overlapping with the first capacitor electrode and the second capacitor electrode. Electrical charge is accumulated in the capacitor in accordance with voltage applied between the first capacitor electrode and the second capacitor electrode.

A signal DD is input to one of a source and a drain of the transistor 151a, and a signal DSEL is input to a gate of the transistor 151a.

The first display electrode of the liquid crystal element 152a is electrically connected to the other of the source and the drain of the transistor 151a. Voltage Vc is input to the second display electrode of the liquid crystal element 152a. The value of the voltage Vc can be set as appropriate.

The first capacitor electrode of the capacitor 153a is electrically connected to the other of the source and the drain of the transistor 151a. The voltage Vc is input to the second capacitor electrode of the capacitor 153a.

The display circuit illustrated in FIG. 6B includes a transistor 151b, a liquid crystal element 152b, a capacitor 153b, a capacitor 154, a transistor 155, and a transistor 156.

Note that in the display circuit illustrated in FIG. 6B, the transistor 151b, the transistor 155, and the transistor 156 are field-effect transistors.

A signal DD is input to one of a source and a drain of the transistor 155. A write selection signal (a signal WSEL) that is a pulse signal is input to a gate of the transistor 155.

A first capacitor electrode of the capacitor 154 is electrically connected to the other of the source and the drain of the transistor 155. The voltage Vc is input to a second capacitor electrode of the capacitor 154.

One of a source and a drain of the transistor 151b is electrically connected to the other of the source and the drain of the transistor 155. A signal DSEL is input to a gate of the transistor 151b.

A first display electrode of the liquid crystal element 152b is electrically connected to the other of the source and the drain of the transistor 151b. The voltage Vc is input to a second display electrode of the liquid crystal element 152b.

A first capacitor electrode of the capacitor 153b is electrically connected to the other of the source and the drain of the transistor 151b. The voltage Vc is input to a second capacitor electrode of the capacitor 153b. The value of the voltage Vc is set as appropriate in accordance with the specifications of the display circuit.

Reference voltage is input to one of a source and a drain of the transistor 156. The other of the source and the drain of the transistor 156 is electrically connected to the other of the source and the drain of the transistor 151b. A display reset signal (a signal DRST) that is a pulse signal is input to a gate of the transistor 156.

Further, the components of the display circuits illustrated in FIGS. 6A and 6B will be described.

The transistors 151a and 151b function as display selection transistors.

As each of the liquid crystal layers of the liquid crystal elements 152a and 152b, a liquid crystal layer for transmitting light when voltage applied to a first display electrode and a second display electrode is 0 V can be used. For example, a liquid crystal layer containing an electrically controlled birefringence liquid crystal (also referred to as ECB liquid crystal), a liquid crystal to which a dichroic pigment is added (also referred to as a GH liquid crystal), a polymer dispersed liquid crystal, or a discotic liquid crystal can be used. A liquid crystal layer exhibiting a blue phase may be used as the liquid crystal layer. The liquid crystal layer exhibiting a blue phase contains, for example, a liquid crystal composition including a liquid crystal exhibiting a blue phase and a chiral agent. The liquid crystal exhibiting a blue phase has a short response time of 1 ms or less and is optically isotropic, which makes the alignment process unneeded and the viewing angle dependence small. Thus, with the liquid crystal exhibiting a blue phase, operation speed can be improved.

The capacitor 153a functions as a storage capacitor in which voltage whose value is based on the signal DD is applied between the first capacitor electrode and the second capacitor electrode in response to the behavior of the transistor 151a. The capacitor 153b functions as a storage capacitor in which voltage whose value is based on the signal DD is applied between the first capacitor electrode and the second capacitor electrode in response to the behavior of the transistor 151b. The capacitors 153a and 153b are not necessarily provided; however, with the capacitors 153a and 153b, fluctuation in voltage applied to the liquid crystal elements due to the leakage current of the display selection transistors can be suppressed.

The capacitor 154 functions as a storage capacitor in which voltage whose value is based on the signal DD is applied between the first capacitor electrode and the second capacitor electrode in response to the behavior of the transistor 155.

The transistor 155 functions as a write selection transistor for selecting whether the signal DD is input to the capacitor 154.

The transistor 156 functions as a display reset selection transistor for selecting whether voltage applied to the liquid crystal element 152b is reset.

Note that as each of the transistors 151a, 151b, 155, and 156, for example, it is possible to use a transistor including a semiconductor layer containing a semiconductor that belongs to Group 14 in the periodic table (e.g., silicon) or a transistor including an oxide semiconductor layer. Channels are formed in the semiconductor layer and the oxide semiconductor layer of the transistors.

Next, examples of methods for driving the display circuits illustrated in FIGS. 6A and 6B will be described.

First, the example of the method for driving the display circuit illustrated in FIG. 6A will be described with reference to FIG. 6C. FIG. 6C is a timing chart for describing the example of the method for driving the display circuit illustrated in FIG. 6A, and illustrates the states of the signal DD and the signal DSEL.

In the example of the method for driving the display circuit illustrated in FIG. 6A, the transistor 151a is turned on when the pulse of a signal DSEL is input.

When the transistor 151a is turned on, the signal DD is input to the display circuit, so that the voltage value of the first display electrode of the liquid crystal element 152a and the voltage value of the first capacitor electrode of the capacitor 153a are equivalent to the voltage value of the signal DD.

At this time, the liquid crystal element 152a is set in a write state (a state wt) and the light transmittance of the liquid crystal element 152a is based on the signal DD, so that the display circuit is set in a display state based on data of the signal DD (data DT1 to data DTQ (Q is a natural number greater than or equal to 2)).

Then, the transistor 151a is turned off, and the liquid crystal element 152a is set to be in a hold state (a state hld) and holds voltage applied between the first display electrode and the second display electrode so that the amount of fluctuation in the voltage from an initial value does not exceed a reference value until when the next pulse of the signal DSEL is input. In addition, when the liquid crystal element 152a is in the hold state, the light unit in the input/output device in the above embodiment is lit.

Figure 6D:
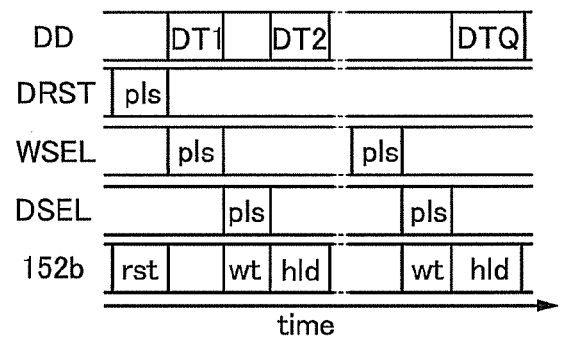

Next, the example of the method for driving the display circuit illustrated in FIG. 6B is described with reference to FIG. 6D. FIG. 6D is a timing chart for describing the example of the method for driving the display circuit illustrated in FIG. 6B.

In the example of the method for driving the display circuit illustrated in FIG. 6B, the transistor 156 is turned on by input of the pulse of a signal DRST, so that the voltage of the first display electrode of the liquid crystal element 152*b* and the voltage of the first capacitor electrode of the capacitor 153*b* are reset to reference voltage.

The transistor 155 is turned on by the input of the pulse of a signal WSEL, and the signal DD is input to the display circuit, so that the voltage value of the first capacitor electrode of the capacitor 154 is equivalent to the voltage value of the signal DD.

After that, the transistor 151*b* is turned on by the input of the pulse of the signal DSEL, so that the voltage value of the first display electrode of the liquid crystal element 152*b* and the voltage value of the first capacitor electrode of the capacitor 153*b* are equivalent to the voltage value of the first capacitor electrode of the capacitor 154.

At this time, the liquid crystal element 152*b* is set in a write state and the light transmittance of the liquid crystal element 152*b* is based on the signal DD, so that the display circuit is set in a display state based on data of the signal DD (data DT1 to data DTQ).

Then, the transistor 151*b* is turned off, and the liquid crystal element 152*b* is set in a hold state and holds voltage applied between the first display electrode and the second display electrode so that the amount of fluctuation in the voltage from an initial value does not exceed a reference value until when the next pulse of the signal DSEL is input. In addition, when the liquid crystal element 152*b* is in the hold state, the light unit in the input/output device in the above embodiment is lit.

As described with reference to FIGS. 6A and 6B, in the example of the display circuit of this embodiment, the display selection transistor and the liquid crystal element are provided. With such a structure, the display circuit can be set in a display state based on the signal DD.

Further, as described with reference to FIG. 6B, in the example of the display circuit of this embodiment, the write selection transistor and the capacitor are provided in addition to the display selection transistor and the liquid crystal element. With such a structure, while the liquid crystal element is set in a display state based on data of the signal DD, data of the next signal DD can be written to the capacitor. Thus, the operation speed of the display circuit can be improved.

Embodiment 6

In this embodiment, transistors that can be used as transistors included in the input/output device described in the above embodiment are described.

In the input/output device described in the above embodiment, as the transistor, for example, it is possible to use a transistor including a semiconductor layer containing a semiconductor that belongs to Group 14 in the periodic table (e.g., silicon) or a transistor including an oxide semiconductor layer. Channels are formed in the semiconductor layer and the oxide semiconductor layer of the transistors. Note that a layer in which the channel is formed may be called a channel formation layer.

Note that the semiconductor layer may be a single crystal semiconductor layer, a polycrystalline semiconductor layer, a microcrystalline semiconductor layer, or an amorphous semiconductor layer.

In the input/output device described in the above embodiment, as the transistor including an oxide semiconductor layer, for example, a transistor including an oxide semiconductor layer that is highly purified to be intrinsic (i-type) or substantially intrinsic can be used. Purification is a general idea including the following cases: the case where hydrogen or water in an oxide semiconductor layer is removed as much as possible and the case where oxygen is supplied to an oxide semiconductor layer and defects due to oxygen deficiency of the oxide semiconductor layer are reduced.

Structural examples of the transistor including an oxide semiconductor layer will be described with reference to FIGS. 7A to 7D. FIGS. 7A to 7D are schematic cross-sectional views each illustrating a structural example of the transistor of this embodiment.

Figure 7A:
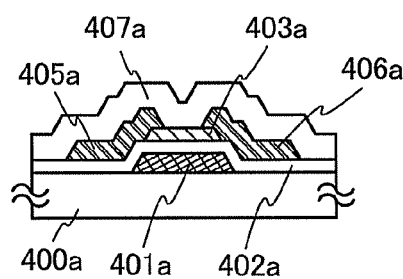
FIGS. 7A to 7E are schematic cross-sectional views for describing examples of a transistor of Embodiment 6.

The transistor illustrated in FIG. 7A is a kind of bottom-gate transistor called an inverted-staggered transistor.

The transistor illustrated in FIG. 7A includes a conductive layer 401*a*, an insulating layer 402*a*, an oxide semiconductor layer 403*a*, a conductive layer 405*a*, and a conductive layer 406*a*.

The conductive layer 401*a* is formed over a substrate 400*a*.

The insulating layer 402*a* is formed over the conductive layer 401*a*.

The oxide semiconductor layer 403*a* overlaps with the conductive layer 401*a* with the insulating layer 402*a* interposed therebetween.

The conductive layer 405*a* and the conductive layer 406*a* are each provided over part of the oxide semiconductor layer 403*a*.

Further, in the transistor illustrated in FIG. 7A, part of a top surface of the oxide semiconductor layer 403*a* (part of the oxide semiconductor layer 403*a* over which neither the conductive layer 405*a* nor the conductive layer 406*a* is provided) is in contact with an insulating layer 407*a*.

In addition, the insulating layer 407*a* covers the conductive layer 405*a*, the conductive layer 406*a*, and the oxide semiconductor layer 403*a*, and is contact with the insulating layer 402*a*.

Figure 7B:
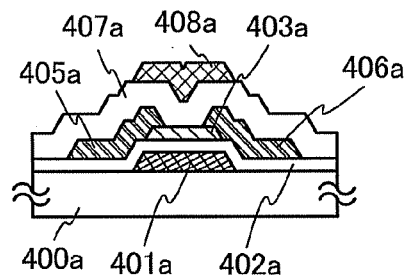

A transistor in FIG. 7B includes a conductive layer 408*a* in addition to the components in FIG. 7A.

The conductive layer 408*a* overlaps with the oxide semiconductor layer 403*a* with the insulating layer 407*a* interposed therebetween.

Figure 7C:
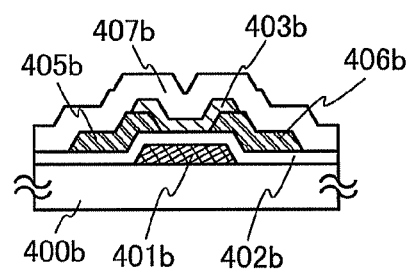

A transistor illustrated in FIG. 7C is a kind of bottom-gate transistor.

The transistor illustrated in FIG. 7C includes a conductive layer 401*b*, an insulating layer 402*b*, an oxide semiconductor layer 403*b*, a conductive layer 405*b*, and a conductive layer 406*b*.

The conductive layer 401*b* is formed over a substrate 400*b*.

The insulating layer 402*b* is formed over the conductive layer 401*b*.

The conductive layer 405*b* and the conductive layer 406*b* are formed over part of the insulating layer 402*b*.

The oxide semiconductor layer 403*b* overlaps with the conductive layer 401*b* with the insulating layer 402*b* interposed therebetween.

Further, in FIG. 7C, an upper surface and side surfaces of the oxide semiconductor layer 403*b* in the transistor are in contact with an oxide insulating layer 407*b*.

Further, the insulating layer 407*b* covers the conductive layer 405*b*, the conductive layer 406*b*, and the oxide semiconductor layer 403*b*, and is in contact with the insulating layer 402*b*.

Note that in FIGS. 7A to 7C, a protective insulating layer may be provided over the insulating layer.

Figure 7D:
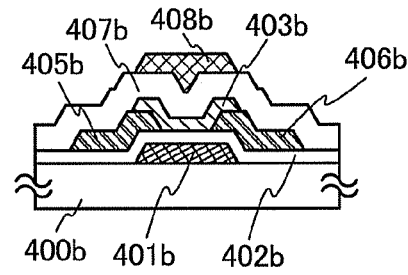

A transistor in FIG. 7D includes a conductive layer 408*b* in addition to the components in FIG. 7C.

The conductive layer 408*b* overlaps with the oxide semiconductor layer 403*b* with the insulating layer 407*b* interposed therebetween.

Figure 7E:
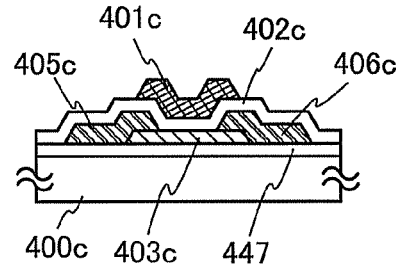

A transistor illustrated in FIG. 7E is a kind of top-gate transistor.

The transistor illustrated in FIG. 7E includes a conductive layer 401c, an insulating layer 402c, an oxide semiconductor layer 403c, a conductive layer 405c, and a conductive layer 406c.

The oxide semiconductor layer 403c is formed over a substrate 400c with an insulating layer 447 interposed therebetween.

The conductive layer 405c and the conductive layer 406c are formed over the oxide semiconductor layer 403c.

The insulating layer 402c is formed over the oxide semiconductor layer 403c, the conductive layer 405c, and the conductive layer 406c.

The conductive layer 401c overlaps with the oxide semiconductor layer 403c with the insulating layer 402c interposed therebetween.

Further, components illustrated in FIGS. 7A to 7E will be described.

As each of the substrates 400a to 400c, a light-transmitting substrate such as a glass substrate or a plastic substrate can be used, for example.

The conductive layers 401a to 401c each function as a gate of the transistor. Note that a layer functioning as a gate of a transistor is also referred to as a gate electrode or a gate wiring.

Each of the conductive layers 401a to 401c can be, for example, a layer of a metal material such as molybdenum, titanium, chromium, tantalum, tungsten, aluminum, copper, neodymium, or scandium or an alloy material containing the above metal material as a main component. The conductive layers 401a to 401c may be formed using a stack of layers of a material which can be used for the conductive layers 401a to 401c.

The insulating layers 402a to 402c each function as a gate insulating layer of the transistor. Note that a layer functioning as a gate insulating layer of a transistor is also referred to as a gate insulating layer.

As each of the insulating layers 402a to 402c, a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, or a hafnium oxide layer can be used, for example. The insulating layers 402a and 402b can be formed using a stack of layers of a material which can be used for the insulating layers 402a and 402b.

In addition, as the insulating layers 402a to 402c, an insulating layer of a material containing, for example, an element that belongs to Group 13 in the periodic table and oxygen can be used. When the oxide semiconductor layers 403a to 403c contain an element that belongs to Group 13, use of insulating layers containing an element that belongs to Group 13 as insulating layers in contact with the oxide semiconductor layers 403a to 403c makes the state of the interfaces between the insulating layers and the oxide semiconductor layers favorable.

Examples of the material including an element that belongs to Group 13 include gallium oxide, aluminum oxide, aluminum gallium oxide, and gallium aluminum oxide. Note that aluminum gallium oxide refers to a substance in which the amount of aluminum is larger than that of gallium in atomic percent, and gallium aluminum oxide refers to a substance in which the amount of gallium is larger than or equal to that of aluminum in atomic percent.

For example, use of an insulating layer containing gallium oxide as each of the insulating layers 402a to 402c can reduce the accumulation of hydrogen or hydrogen ions at the interfaces between the insulating layer 402a and the oxide semiconductor layer 403a, the insulating layer 402b and the oxide semiconductor layer 403b, and the insulating layer 402c and the oxide semiconductor layer 403c.

In addition, for example, using an insulating layer containing aluminum oxide as each of the insulating layers 402a to 402c can reduce the accumulation of hydrogen or hydrogen ions at the interfaces between the insulating layer 402a and the oxide semiconductor layer 403a, the insulating layer 402b and the oxide semiconductor layer 403b, and the insulating layer 402c and the oxide semiconductor layer 403c. An insulating layer containing aluminum oxide is less likely to transmit water; thus, use of an insulating layer containing aluminum oxide can suppress entry of water to the oxide semiconductor layer through the insulating layer.

As the insulating layers 402a to 402c, a material represented by $Al_2O_x$ (x=3+α where α is larger than 0 and smaller than 1), $Ga_2O_x$ (x=3+α where α is larger than 0 and smaller than 1), or $Ga_xAl_{2-x}O_{3+\alpha}$ (x is larger than 0 and smaller than 2 and α is larger than 0 and smaller than 1) can be used, for example. The insulating layers 402a to 402c can be formed using a stack of layers of a material which can be used for the insulating layers 402a to 402c. For example, each of the insulating layers 402a to 402c can be a stack of layers containing gallium oxide represented by $Ga_2O_x$. Alternatively, each of the insulating layers 402a to 402c can be a stack of an insulating layer containing gallium oxide represented by $Ga_2O_x$ and an insulating layer containing aluminum oxide represented by $Al_2O_x$.

The insulating layer 447 serves as a base layer preventing the diffusion of an impurity element coming from the substrate 400c.

The insulating layer 447 can be, for example, a layer of a material which can be used for the insulating layers 402a to 402c. Alternatively, the insulating layer 447 can be a stack of layers of a material which can be used for the insulating layers 402a to 402c.

The oxide semiconductor layers 403a to 403c each function as a layer in which a channel of the transistor is formed. Note that the layer in which a channel of the transistor is formed is also referred to as a channel formation layer. Examples of an oxide semiconductor that can be used for the oxide semiconductor layers 403a to 403c include a quaternary metal oxide, a ternary metal oxide, and a binary metal oxide. The oxide semiconductor includes at least one element selected from In, Ga, Sn, Zn, Al, Mg, Hf, or lanthanoid. As the quaternary metal oxide, an In—Sn—Ga—Zn—O-based metal oxide or the like can be used, for example. As the ternary metal oxide, an In—Ga—Zn—O-based metal oxide, an In—Sn—Zn—O-based metal oxide, an In—Al—Zn—O-based metal oxide, a Sn—Ga—Zn—O-based metal oxide, an Al—Ga—Zn—O-based metal oxide, a Sn—Al—Zn—O-based metal oxide, an In—Hf—Zn—O-based metal oxide, an In—La—Zn—O-based metal oxide, an In—Ce—Zn—O-based metal oxide, an In—Pr—Zn—O-based metal oxide, an In—Nd—Zn—O-based metal oxide, an In—Pm—Zn—O-based metal oxide, an In—Sm—Zn—O-based metal oxide, an In—Eu—Zn—O-based metal oxide, an In—Gd—Zn—O-based metal oxide, an In—Tb—Zn—O-based metal oxide, an In—Dy—Zn—O-based metal oxide, an In—Ho—Zn—O-based metal oxide, an In—Er—Zn—O-based metal oxide, an In—Tm—Zn—O-based metal oxide, an In—Yb—Zn—O-based metal oxide, an In—Lu—Zn—O-based metal oxide, or the like can be used, for example. As the binary metal oxide, an In—Zn—O-based metal oxide, a Sn—Zn—O-based metal oxide, an Al—Zn—O-based metal oxide, a Zn—Mg—O-based metal oxide, a Sn—Mg—O-based metal oxide, an In—Mg—O-based metal oxide, an In—Sn—O-based metal oxide, an In—Ga—O-based metal oxide, or the like can be used, for example. An In—O-based metal oxide, a Sn—O-based metal oxide, a Zn—O-based metal oxide, or the like can be used as the oxide semiconductor, for example. The metal oxide that can be used as the oxide semiconductor may contain silicon oxide.

In the case where an In—Zn—O-based metal oxide is used, for example, an oxide target having the following composition ratios can be used for deposition of an In—Zn—O-based metal oxide semiconductor layer: In:Zn=50:1 to 1:2 (In$_2$O$_3$:ZnO=25:1 to 1:4 in a molar ratio), preferably In:Zn=20:1 to 1:1 (In$_2$O$_3$:ZnO=10:1 to 1:2 in a molar ratio), more preferably In:Zn=15:1 to 1.5:1 (In$_2$O$_3$:ZnO=15:2 to 3:4 in a molar ratio). For example, when the atomic ratio of the target used for the deposition of the In—Zn—O-based oxide semiconductor is expressed by In:Zn:O=P:Z:R, R>1.5P+Z. The increase in In content makes the mobility of the transistor higher.

As the oxide semiconductor, a material represented by InMO$_3$(ZnO)$_m$ (m is larger than 0) can be used. Here, M in InMO$_3$(ZnO)$_m$ represents one or more metal elements selected from Ga, Al, Mn, or Co.

The conductive layers 405a to 405c and the conductive layers 406a to 406c each function as a source or a drain of the transistor. Note that a layer functioning as a source of a transistor is also referred to as a source electrode or a source wiring, and a layer functioning as a drain of a transistor is also referred to as a drain electrode or a drain wiring.

Each of the conductive layers 405a to 405c and the conductive layers 406a to 406c can be, for example, a layer of a metal material such as aluminum, chromium, copper, tantalum, titanium, molybdenum, or tungsten; or an alloy material containing the metal material as a main component. Alternatively, each of the conductive layers 405a to 405c and the conductive layers 406a to 406c can be formed using a stack of layers of a material which can be used for the conductive layers 405a to 405c and the conductive layers 406a to 406c.

Alternatively, each of the conductive layers 405a to 405c and the conductive layers 406a to 406c can be a layer containing a conductive metal oxide. As the conductive metal oxide, indium oxide, tin oxide, zinc oxide, an alloy of indium oxide and tin oxide, or an alloy of indium oxide and zinc oxide can be used, for example. Note that the conductive metal oxide which can be used for each of the conductive layers 405a to 405c and the conductive layers 406a to 406c may contain silicon oxide.

Like the insulating layers 402a to 402c, as the insulating layers 407a and 407b, an insulating layer of a material containing, for example, an element that belongs to Group 13 in the periodic table and oxygen can be used. Alternatively, for the insulating layers 407a and 407b, a material represented by Al$_2$O$_x$, Ga$_2$O$_x$, or Ga$_x$Al$_{2-x}$O$_{3+\alpha}$ can be used.

For example, each of the insulating layers 402a to 402c and the insulating layers 407a and 407b can be an insulating layer containing gallium oxide represented by Ga$_2$O$_x$. Alternatively, the insulating layers 402a to 402c and one of the insulating layers 407a and 407b may be insulating layers containing gallium oxide represented by Ga$_2$O$_x$, and the insulating layers 402a to 402c and the other of the insulating layers 407a and 407b may be insulating layers containing aluminum oxide represented by Al$_2$O$_x$.

The conductive layers 408a and 408b each function as a gate of the transistor. Note that when the transistor includes the conductive layer 408a or the conductive layer 408b, one of the conductive layer 401a and the conductive layer 408a, or one of the conductive layer 401b and the conductive layer 408b is called a back gate, a back gate electrode, or a back gate line. By providing a plurality of layers serving as gates with a channel formation layer interposed therebetween, the threshold voltage of the transistor can be controlled.

Each of the conductive layers 408a and 408b can be, for example, a layer of a metal material such as aluminum, chromium, copper, tantalum, titanium, molybdenum, or tungsten; or an alloy material containing the metal material as a main component. Alternatively, each of the conductive layers 408a and 408b can be a stack of layers of a material which can be used for the conductive layers 408a and 408b.

Alternatively, each of the conductive layers 408a and 408b can be a layer containing a conductive metal oxide. As the conductive metal oxide, indium oxide, tin oxide, zinc oxide, an alloy of indium oxide and tin oxide, or an alloy of indium oxide and zinc oxide can be used, for example. Note that the conductive metal oxide which can be used for the conductive layers 408a and 408b may contain silicon oxide.

Note that the transistor of this embodiment may have an insulating layer over a part of the oxide semiconductor layer serving as a channel formation layer and include a conductive layer serving as a source or a drain and overlapping with the oxide semiconductor layer with the insulating layer therebetween. Consequently, the insulating layer serves as a layer protecting the channel formation layer (also referred to as a channel protective layer) of the transistor. Examples of the insulating layer serving as a channel protective layer include a layer of a material that can be used for the insulating layers 402a to 402c and a stack of layers of a material that can be used for the insulating layers 402a to 402c.

Note that the entire oxide semiconductor layer does not necessarily overlap with the conductive layer serving as a gate electrode in the transistor of this embodiment, as illustrated in FIGS. 7A to 7E. When the entire oxide semiconductor layer does not necessarily overlap with the conductive layer serving as a gate electrode in the transistor of this embodiment, light entering the oxide semiconductor layer can be reduced.

An example of a method for forming the transistor illustrated in FIG. 7A, which is an example of a method for forming the transistor of this embodiment, will be described with reference to FIGS. 8A to 8E. FIGS. 8A to 8E are schematic cross-sectional views illustrating the example of the method for forming the transistor in FIG. 7A.

Figure 8A:
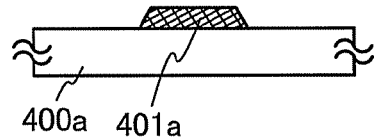
FIGS. 8A to 8E are schematic cross-sectional views for describing an example of a method for forming the transistor in FIG. 7A.

As illustrated in FIG. 8A, the substrate 400a is first prepared and a first conductive film is formed over the substrate 400a. Part of the first conductive film is etched so that the conductive layer 401a is formed.

For example, the first conductive film is a layer of a material, which can be used for the conductive layer 401a, formed by sputtering. Alternatively, the first conductive film is a stack of layers of materials that can be used for the conductive layer 401a.

Note that when a high-purity gas from which an impurity such as hydrogen, water, a hydroxyl group, or hydride is removed is used as a sputtering gas, for example, the impurity concentration in the film can be lowered.

Note that preheating treatment may be performed in a preheating chamber of a sputtering apparatus before the film is formed by sputtering. By the preheating treatment, an impurity such as hydrogen or moisture can be eliminated.

Before the film is formed by sputtering, for example, treatment by which voltage is applied to a substrate side, not to a target side, in an argon, nitrogen, helium, or oxygen atmosphere with the use of an RF power and plasma is generated so that a surface of the substrate on which the film is formed is modified (such treatment is also referred to as reverse sputtering) may be performed. By reverse sputtering, powdery substances (also referred to as particles or dust) that attach onto the surface on which the film is formed can be removed.

In the case where the film is formed by sputtering, moisture remaining in a deposition chamber for the film can be removed by an entrapment vacuum pump or the like. A cryopump, an ion pump, a titanium sublimation pump, or the like can be used as the entrapment vacuum pump. Alternatively, moisture remaining in the deposition chamber can be removed by a turbo molecular pump provided with a cold trap.

As a method for forming the conductive layer 401a, the example of a method for forming the transistor of this embodiment employs, for example, the following steps in order to form a layer by etching part of a film: a resist mask is formed over part of the film by a photolithography process and the film is etched using the resist mask, thereby forming the layer. Note that in this case, the resist mask is removed after the layer is formed.

The resist mask may be formed by an inkjet method. A photomask is not needed in an inkjet method; thus, manufacturing cost can be reduced. In addition, the resist mask may be formed using an exposure mask having a plurality of regions with different transmittances (such an exposure mask is also referred to as a multi-tone mask). With the multi-tone mask, a resist mask having a plurality of regions with different thicknesses can be formed, so that the number of resist masks used for the formation of the transistor can be reduced.

Figure 8B:
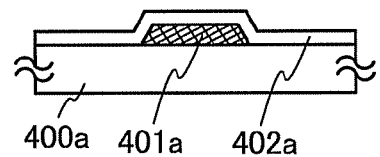

Next, as illustrated in FIG. 8B, a first insulating film serving as the insulating layer 402a is formed over the conductive layer 401a.

For example, the first insulating film is a layer of a material, which can be used for the insulating layer 402a, formed by sputtering, plasma-enhanced CVD, or the like. The first insulating film is alternatively a stack of layers of materials that can be used for the insulating layer 402a. Further, when the layer of a material that can be used for the insulating layer 402a is formed by high-density plasma-enhanced CVD (e.g., high-density plasma-enhanced CVD using microwaves (e.g., microwaves with a frequency of 2.45 GHz)), the insulating layer 402a can be dense and can have higher breakdown voltage.

Figure 8C:
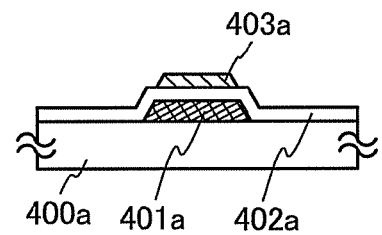

Then, as illustrated in FIG. 8C, an oxide semiconductor film is formed over the insulating layer 402a and then is partly etched to form the oxide semiconductor layer 403a.

For example, the oxide semiconductor film is a layer of an oxide semiconductor material, which can be used for the oxide semiconductor layer 403a, formed by sputtering. Note that the oxide semiconductor film may be formed in a rare gas atmosphere, an oxygen atmosphere, or a mixed atmosphere of a rare gas and oxygen.

The oxide semiconductor film can be formed using an oxide target having a composition ratio of $In_2O_3:Ga_2O_3:ZnO=1:1:1$ (in a molar ratio) as a sputtering target. Alternatively, the oxide semiconductor film may be formed using an oxide target having a composition ratio of $In_2O_3:Ga_2O_3:ZnO=1:1:2$ (in a molar ratio), for example.

When the oxide semiconductor film is formed by sputtering, the substrate 400a may be kept under reduced pressure and heated at 100 to 600° C., preferably 200 to 400° C. Heating the substrate 400a can lower the impurity concentration in the oxide semiconductor film and reduce damage to the oxide semiconductor film caused by the sputtering.

Figure 8D:
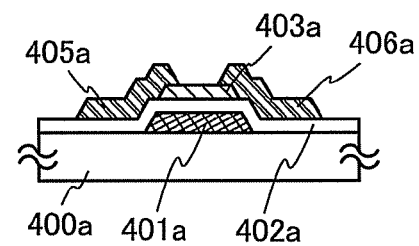

Then, as illustrated in FIG. 8D, a second conductive film is formed over the insulating layer 402a and the oxide semiconductor layer 403a and then is partly etched to form the conductive layers 405a and 406a.

For example, the second conductive film is a layer of a material, which can be used for the conductive layers 405a and 406a, formed by sputtering or the like. Alternatively, the second conductive film is a stack of films of materials that can be used for the conductive layers 405a and 406a.

Figure 8E:
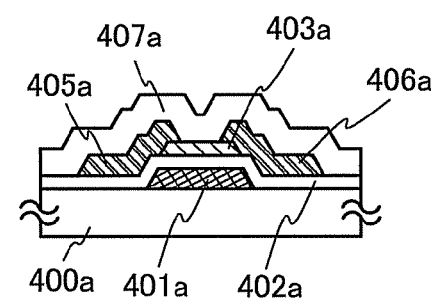

Then, as illustrated in FIG. 8E, the insulating layer 407a is formed so as to be in contact with the oxide semiconductor layer 403a.

For example, the insulating layer 407a is a film, which can be used for the insulating layer 407a, formed in a rare gas (typically, argon) atmosphere, an oxygen atmosphere, or a mixed atmosphere of a rare gas and oxygen by sputtering. Forming the insulating layer 407a by sputtering can suppress the decrease in the resistance of part of the oxide semiconductor layer 403a that functions as a back channel of the transistor. The temperature of the substrate at the time of the formation of the insulating layer 407a is preferably higher than or equal to room temperature and lower than or equal to 300° C.

Before the formation of the insulating layer 407a, plasma treatment using a gas such as $N_2O$, $N_2$, or Ar may be performed so that water or the like adsorbed onto an exposed surface of the oxide semiconductor layer 403a is removed. In the case where the plasma treatment is performed, the insulating layer 407a is preferably formed after the plasma treatment without exposure to air.

In addition, in the example of the method for forming the transistor illustrated in FIG. 7A, heat treatment is performed at higher than or equal to 400° C. and lower than or equal to 750° C., or higher than or equal to 400° C. and lower than the strain point of the substrate, for example. For example, the heat treatment is performed after the oxide semiconductor film is formed, after part of the oxide semiconductor film is etched, after the second conductive film is formed, after part of the second conductive film is etched, or after the insulating layer 407a is formed.

Note that a heat treatment apparatus for the heat treatment can be an electric furnace or an apparatus for heating an object by heat conduction or heat radiation from a heater such as a resistance heater. For example, an RTA (rapid thermal annealing) apparatus such as a GRTA (gas rapid thermal annealing) apparatus, or an LRTA (lamp rapid thermal annealing) apparatus can be used. An LRTA apparatus is an apparatus for heating an object by radiation of light (an electromagnetic wave) emitted from a lamp such as a halogen lamp, a metal halide lamp, a xenon arc lamp, a carbon arc lamp, a high pressure sodium lamp, or a high pressure mercury lamp. A GRTA apparatus is an apparatus with which heat treatment is performed using a high-temperature gas. As the high-temperature gas, for example, a rare gas or an inert gas (e.g., nitrogen) which does not react with an object by heat treatment can be used.

After the heat treatment, a high-purity oxygen gas, a high-purity $N_2O$ gas, or ultra-dry air (with a dew point of −40° C. or lower, preferably −60° C. or lower) may be introduced into the furnace that has been used in the above heat treatment while the heating temperature is maintained or decreased. In this case, it is preferable that water, hydrogen, and the like be not contained in the oxygen gas or the $N_2O$ gas. The purity of the oxygen gas or the $N_2O$ gas which is introduced into the heat treatment apparatus is preferably 6N or higher, more preferably 7N or higher. That is, the impurity concentration in the oxygen gas or the $N_2O$ gas is 1 ppm or lower, preferably 0.1 ppm or lower. By the action of the oxygen gas or the $N_2O$ gas, oxygen is supplied to the oxide semiconductor layer 403a, so that defects caused by oxygen deficiency in the oxide semiconductor layer 403a can be reduced.

Further, in addition to the heat treatment, after the insulating layer 407a is formed, heat treatment (preferably at 200 to 400° C., for example, 250 to 350° C.) may be performed in an inert gas atmosphere or an oxygen gas atmosphere.

Further, oxygen doping treatment using oxygen plasma may be performed after the formation of the insulating layer 402a, after the formation of the oxide semiconductor film, after the formation of the conductive layer serving as a source electrode or a drain electrode, after the formation of the insulating layer, or after the heat treatment. For example, oxygen doping treatment using a high-density plasma of 2.45 GHz may be performed. Alternatively, oxygen doping treatment may be performed by an ion implantation method or ion doping. By the oxygen doping treatment, variations in electrical characteristics of the transistors can be reduced. For example, the oxygen doping treatment is performed to cause the insulating layer 402a or the insulating layer 407a, or both to contain oxygen with a higher proportion than that in the stoichiometric composition. Consequently, excessive oxygen in the insulating layer is likely to be supplied to the oxide semiconductor layer 403a. This can reduce oxygen deficiency defects in the oxide semiconductor layer 403a or at the interface between one or each of the insulating layer 402a and the insulating layer 407a and the oxide semiconductor layer 403a, thereby reducing the carrier concentration of the oxide semiconductor layer 403a.

For example, when an insulating layer containing gallium oxide is formed as one or each of the insulating layer 402a and the insulating layer 407a, the composition of the gallium oxide can be set to be $Ga_2O_x$ by supplying the insulating layer with oxygen.

Alternatively, when an insulating layer containing aluminum oxide is formed as one or each of the insulating layer 402a and the insulating layer 407a, the composition of the aluminum oxide can be set to be $Al_2O_x$ by supplying the insulating layer with oxygen.

Alternatively, when an insulating layer containing gallium aluminum oxide or aluminum gallium oxide is formed as one or each of the insulating layer 402a and the insulating layer 407a, the composition of the gallium aluminum oxide or the aluminum gallium oxide can be set to be $Ga_xAl_{2-x}O_{3+\alpha}$ by supplying the insulating layer with oxygen.

Through the steps, an impurity such as hydrogen, moisture, a hydroxyl group, or hydride (also referred to as a hydrogen compound) is removed from the oxide semiconductor layer 403a and oxygen is supplied to the oxide semiconductor layer 403a. Thus, the oxide semiconductor layer can be highly purified.

Note that although the example of the method for forming the transistor illustrated in FIG. 7A is described, this embodiment is not limited to this example. For the description of the components in FIGS. 7B to 7E, for example, see as appropriate the description of the example of the method for forming the transistor illustrated in FIG. 7A if the components in FIGS. 7B to 7E have the same designations as the components in FIG. 7A and have a function at least part of which is the same as that of the components in FIG. 7A.

As described with reference to FIGS. 7A to 7E and FIGS. 8A to 8E, the example of the transistor in this embodiment includes a conductive layer functioning as a gate electrode; an insulating layer functioning as a gate insulating layer; an oxide semiconductor layer which includes a channel and overlaps with conductive layer functioning as a gate with the insulating layer functioning as a gate insulating layer interposed therebetween; a conductive layer which is electrically connected to the oxide semiconductor layer and functions as one of a source and a drain; and a conductive layer which is electrically connected to the oxide semiconductor layer and functions as the other of the source and the drain.

In an example of the transistor of this embodiment, an insulating layer in contact with an oxide semiconductor layer is in contact with an insulating layer serving as a gate insulating layer with the oxide semiconductor layer, a conductive layer serving as one of a source and a drain, and a conductive layer serving as the other of the source and the drain interposed therebetween. Consequently, the oxide semiconductor layer, the conductive layer serving as one of a source and a drain, and the conductive layer serving as the other of the source and the drain are surrounded by the insulating layer in contact with an oxide semiconductor layer and the insulating layer serving as a gate insulating layer, thereby reducing the entry of an impurity into the oxide semiconductor layer, the conductive layer serving as one of a source and a drain, and the conductive layer serving as the other of the source and the drain.

The oxide semiconductor layer in which a channel is formed is an oxide semiconductor layer which is made intrinsic (i-type) or substantially intrinsic (i-type) by the purifying operation. Purifying the oxide semiconductor layer can lower the carrier concentration in the oxide semiconductor layer to less than $1 \times 10^{14}/cm^3$, preferably less than $1 \times 10^{12}/cm^3$, more preferably less than $1 \times 10^{11}/cm^3$, thereby reducing changes in characteristics due to temperature change. Further, with the above structure, off-state current per micrometer of channel width can be 10 aA ($1 \times 10^{-17}$ A) or less, 1 aA ($1 \times 10^{-18}$ A) or less, 10 zA ($1 \times 10^{-20}$ A) or less, 1 zA ($1 \times 10^{-21}$ A) or less, or 100 yA ($1 \times 10^{-22}$ A) or less. It is preferable that the off-state current of the transistor be as low as possible. The lower limit of the off-state current of the transistor in this embodiment is estimated to be about $10^{-30}$ A/μm.

A calculation example of the off-state current of the example of the transistor including an oxide semiconductor layer in this embodiment, in which leakage current measurement with a circuit for evaluating characteristics is utilized, will be described below.

Figure 9A:
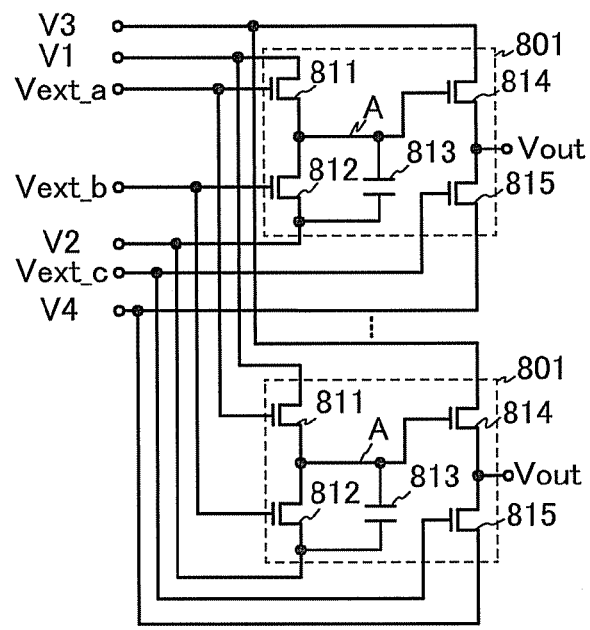
FIGS. 9A to 9C are diagrams for describing a circuit for evaluating characteristics.
Figure 9B:
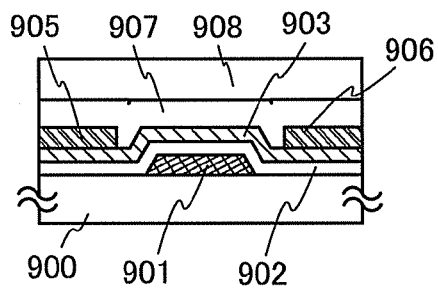
Figure 9C:
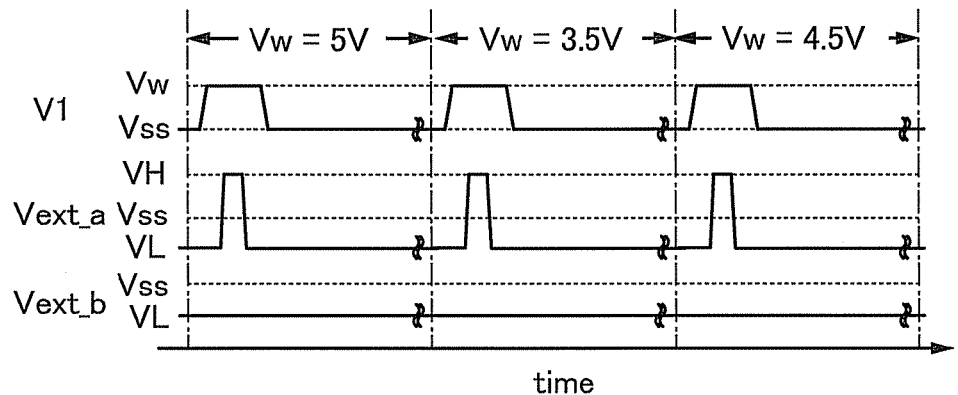

The leakage current measurement with a circuit for evaluating characteristics is described with reference to FIGS. 9A to 9C. FIGS. 9A to 9C illustrate the circuit for evaluating characteristics.

First, the structure of the circuit for evaluating characteristics is described with reference to FIG. 9A. FIG. 9A is a circuit diagram illustrating the structure of the circuit for evaluating characteristics.

The circuit for evaluating characteristics illustrated in FIG. 9A includes a plurality of measurement systems 801. The plurality of measurement systems 801 are connected in parallel. Here, as an example, eight measurement systems 801 are connected in parallel. Plural kinds of measurement can be performed using the plurality of measurement systems 801.

The measurement system 801 includes a transistor 811, a transistor 812, a capacitor 813, a transistor 814, and a transistor 815.

The transistor 811, the transistor 812, the transistor 814, and the transistor 815 are n-type field-effect transistors.

Voltage V1 is input to one of a source and a drain of the transistor 811, and voltage Vext_a is input to a gate of the transistor 811. The transistor 811 is a transistor for injecting electrical charge.

One of a source and a drain of the transistor 812 is connected to the other of the source and the drain of the transistor 811. Voltage V2 is input to the other of the source and the drain of the transistor 812. Voltage Vext_b is input to a gate of the transistor 812. The transistor 812 is a transistor for evaluating leakage current. Note that the leakage current here includes the off-state current of a transistor.

A first capacitor electrode of the capacitor 813 is connected to the other of the source and the drain of the transistor 811. The voltage V2 is input to a second capacitor electrode of the capacitor 813. Note that here, the voltage V2 is 0 V.

Voltage V3 is input to one of a source and a drain of the transistor 814. A gate of the transistor 814 is connected to the other of the source and the drain of the transistor 811. Note that a portion where the gate of the transistor 814, the other of the source and the drain of the transistor 811, the one of the source and the drain of the transistor 812, and the first capacitor electrode of the capacitor 813 are connected to each other is referred to as a node A. Note that here, the voltage V3 is 5 V.

One of a source and a drain of the transistor 815 is connected to the other of the source and the drain of the transistor 814. Voltage V4 is input to the other of the source and the drain of the transistor 815. Voltage Vext_c is input to a gate of the transistor 815. Note that here, the voltage Vext_c is 0.5 V.

The measurement system 801 outputs the voltage of a portion where the other of the source and the drain of the transistor 814 is connected to the one of the source and the drain of the transistor 815, as output voltage Vout.

Here, a transistor having a channel length L of 10 μm and a channel width W of 10 μm and including an oxide semiconductor layer is used as an example of the transistor 811.

A transistor having a channel length L of 3 μm and a channel width W of 100 μm and including an oxide semiconductor layer is used as an example of each of the transistors 814 and 815.

The structure of the transistor 812 is illustrated in FIG. 9B. FIG. 9B is a cross-sectional view illustrating the structure of the transistor.

As shown in FIG. 9B, the transistor 812 includes a conductive layer 901 over a substrate 900, an insulating layer 902, an oxide semiconductor layer 903 being over the conductive layer 901 with the insulating layer 902 interposed therebetween, a conductive layer 905 in contact with the oxide semiconductor layer 903, and a conductive layer 906 in contact with the oxide semiconductor layer 903. The transistor 812 further includes an insulating layer 907 and a planarization layer 908 stacked over the conductive layer 905, and the conductive layer 906. In the transistor 812, the conductive layer 905 and the conductive layer 906 do not overlap with the conductive layer 901, and off-set regions with a width of 1 μm is provided. Provision of the offset region can reduce parasitic capacitance. Further, as the transistor 812, samples (SMP) of six transistors having different channel lengths L and different channel widths W are used (see Table 1).

TABLE 1

|  | L [μm] | W [μm] |
|---|---|---|
| SMP1 | 1.5 | $1 \times 10^5$ |
| SMP2 | 3 | $1 \times 10^5$ |
| SMP3 | 10 | $1 \times 10^5$ |
| SMP4 | 1.5 | $1 \times 10^6$ |
| SMP5 | 3 | $1 \times 10^6$ |
| SMP6 | 10 | $1 \times 10^6$ |

By separately providing a transistor for injecting electrical charge and a transistor for evaluating leakage current as illustrated in FIG. 9A, the transistor for evaluating leakage current can be always kept off at the time of electrical charge injection.

In addition, by separately providing a transistor for injecting electrical charge and a transistor for evaluating leakage current, each of the transistors can have appropriate size.

Further, by making the channel width W of the transistor for evaluating leakage current larger than that of the transistor for injecting electrical charge, the leakage current component other than the leakage current of the transistor for evaluating leakage current can be made relatively low. Consequently, the leakage current of the transistor for evaluating leakage current can be measured with high accuracy. Further, the transistor for evaluating leakage current does not need to be turned on at the time of electrical charge injection; thus, there is no influence of fluctuation in the voltage of the node A caused by part of the electrical charge in the channel formation region of the transistor for evaluating leakage current flowing to the node A.

Next, a method for measuring the leakage current of the circuit for evaluating characteristics illustrated in FIG. 9A will be described with referent to FIG. 9C. FIG. 9C is a timing chart for describing the method for measuring the leakage current with the use of the circuit for evaluating characteristics illustrated in FIG. 9A.

In the method for measuring the leakage current with the use of the circuit for evaluating characteristics illustrated in FIG. 9A, a period is divided into a writing period and a holding period. The operation in each period will be described below.

In the writing period, voltage VL (−3 V) that turns off the transistor 812 is input as the voltage Vext_b. Further, write voltage Vw is input as the voltage V1, and then, voltage VH (5 V) that keeps the transistor 811 on for a certain period is input as the voltage Vext_a. Thus, electrical charge is accumulated in the node A, and the voltage of the node A is equivalent to the write voltage Vw. Then, the voltage VL that turns off the transistor 811 is input as the voltage Vext_a. Then, voltage VSS (0 V) is input as the voltage V1.

In the holding period, the amount of change in the voltage of the node A due to the change in the amount of electrical charge held in the node A is measured. From the amount of change in voltage, the value of current flowing between the source electrode and the drain electrode of the transistor 812 can be calculated. As described above, electrical charge can be accumulated in the node A, and the amount of change in the voltage of the node A can be measured.

At this time, accumulation of electrical charge in the node A and measurement of the amount of change in the voltage of the node A (also referred to as accumulation and measurement operation) are repeated. First, first accumulation and measurement operation is repeated 15 times. In the first accumulation and measurement operation, a voltage of 5 V is input as the write voltage Vw in a writing period and is held for 1 h in a holding period. Next, second accumulation and measurement operation is repeated twice. In the second accumulation and measurement operation, a voltage of 3.5 V is input as the write voltage Vw in a writing period and is held for 50 h in a holding period. Then, third accumulation and measurement operation is performed once. In the third accumulation and measurement operation, a voltage of 4.5 V is input as the write voltage Vw in a writing period and is held for 10 h in a holding period. By repeating the accumulation and measurement operation, the fact that measured current values are in the steady state is confirmed. In other words, it is possible to remove transient current (current decreasing over time after the start of the measurement) from $I_A$ (current flowing through the node A). Consequently, leakage current can be measured with higher accuracy.

In general, the voltage $V_A$ of the node A is expressed by Formula 1 as a function of the output voltage Vout.

$$V_A = F(Vout) \quad \text{[Formula 1]}$$

In addition, the electrical charge $Q_A$ of the node A is expressed by Formula 2 using the voltage $V_A$ of the node A, capacitance $C_A$ connected to the node A, and a constant (const). Here, the capacitance $C_A$ connected to the node A is the sum of the capacitance of the capacitor 813 and the capacitance components other than the capacitance of the capacitor 813.

$$Q_A = C_A V_A + \text{const} \quad \text{[Formula 2]}$$

The current $I_A$ of the node A is a time-derivative term of electrical charge flowing to the node A (or electrical charge flowing from the node A), and is thus expressed by Formula 3.

$$I_A \equiv \frac{\Delta Q_A}{\Delta t} = \frac{C_A \cdot \Delta F(V_{out})}{\Delta t} \quad \text{[Formula 3]}$$

Note that here, as an example, $\Delta t$ is about 54000 s. The current $I_A$ of the node A, which is leakage current, can be obtained from the capacitance $C_A$ connected to the node A and the output voltage Vout in this manner; thus, the leakage current of the circuit for evaluating characteristics can be obtained.

Next, measurement results of the output voltage obtained by the measurement method using the circuit for evaluating characteristics, and the leakage current of the circuit for evaluating characteristics that is calculated from the measurement results are described with reference to FIGS. 10A and 10B.

Figure 10A:
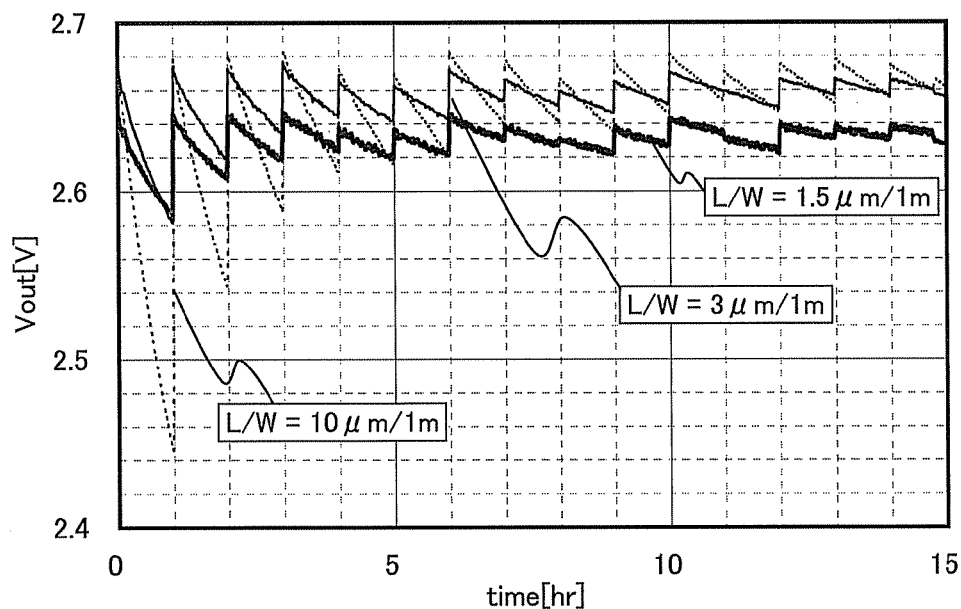
FIG. 10A is a graph showing a relationship between elapsed time (time) in measurement of Samples 4, 5, and 6 (SMP4, SMP5, and SMP6) and output voltage (Vout)
Figure 10B:
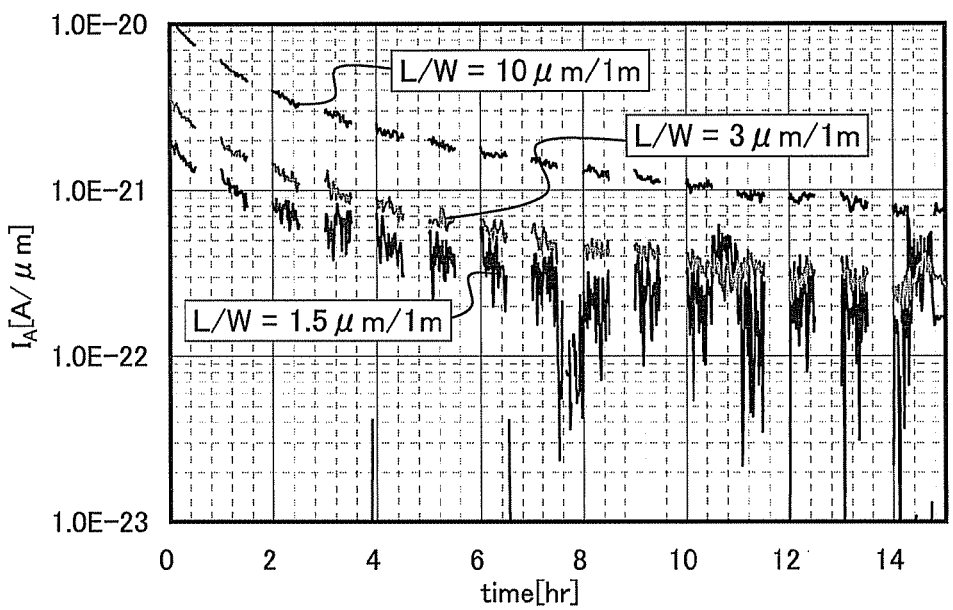
FIG. 10B is a graph showing a relationship between the elapsed time (time) in measurement of Samples 4, 5, and 6 and leakage current calculated from the measurement.

For example, FIG. 10A illustrates the relationship between the elapsed time time of the measurement (the first accumulation and measurement operation) and the output voltage Vout in the transistors of SMP4, SMP5, and SMP6. FIG. 10B illustrates the relationship between the elapsed time time of the measurement and the current $I_A$ calculated by the measurement. FIG. 10A shows that the output voltage Vout fluctuates after the start of the measurement and it takes 10 h or longer for the transistors to go into the steady state.

Figure 11:
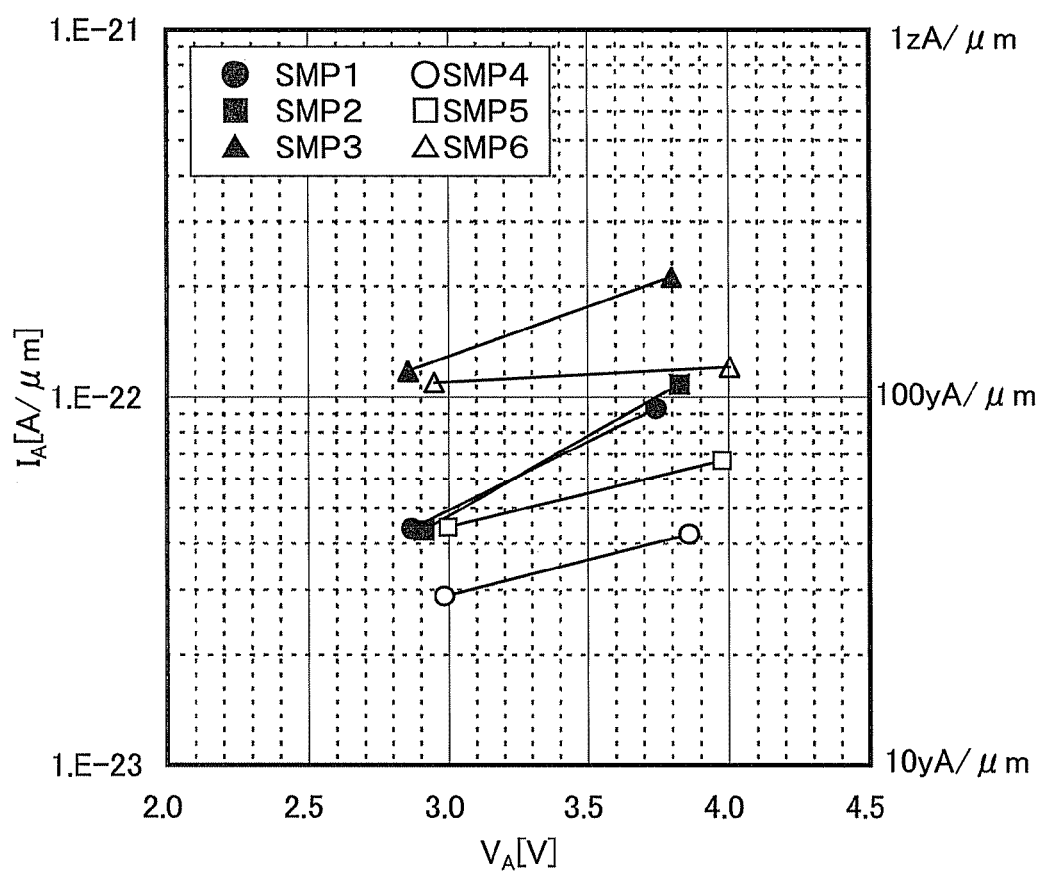
FIG. 11 is a graph showing a relationship between voltage of a node A and leakage current estimated from measurement.

FIG. 11 illustrates the relationship between the voltage of the node A and the leakage current in the SMP1 to SMP6 estimated from values obtained in the measurement. In FIG. 11, for example, in the case of SMP4, leakage current is 28 yA/μm when the voltage of the node A is 3.0 V. Since the leakage current includes the off-state current of the transistor 812, the off-state current of the transistor 812 can be estimated to be 28 yA/μm or lower.

Figure 12:
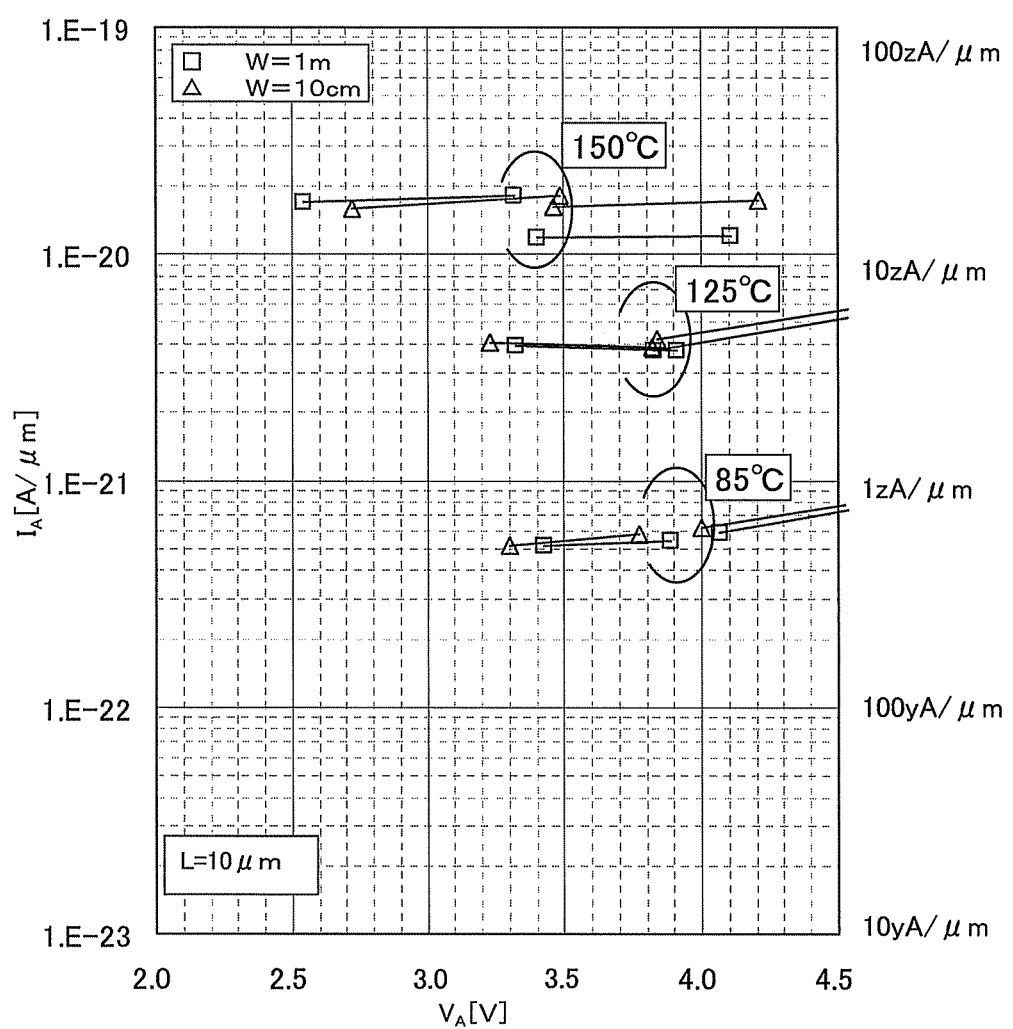
FIG. 12 is a graph showing a relationship between voltage of the node A and leakage current estimated from measurement.
Figure 13:
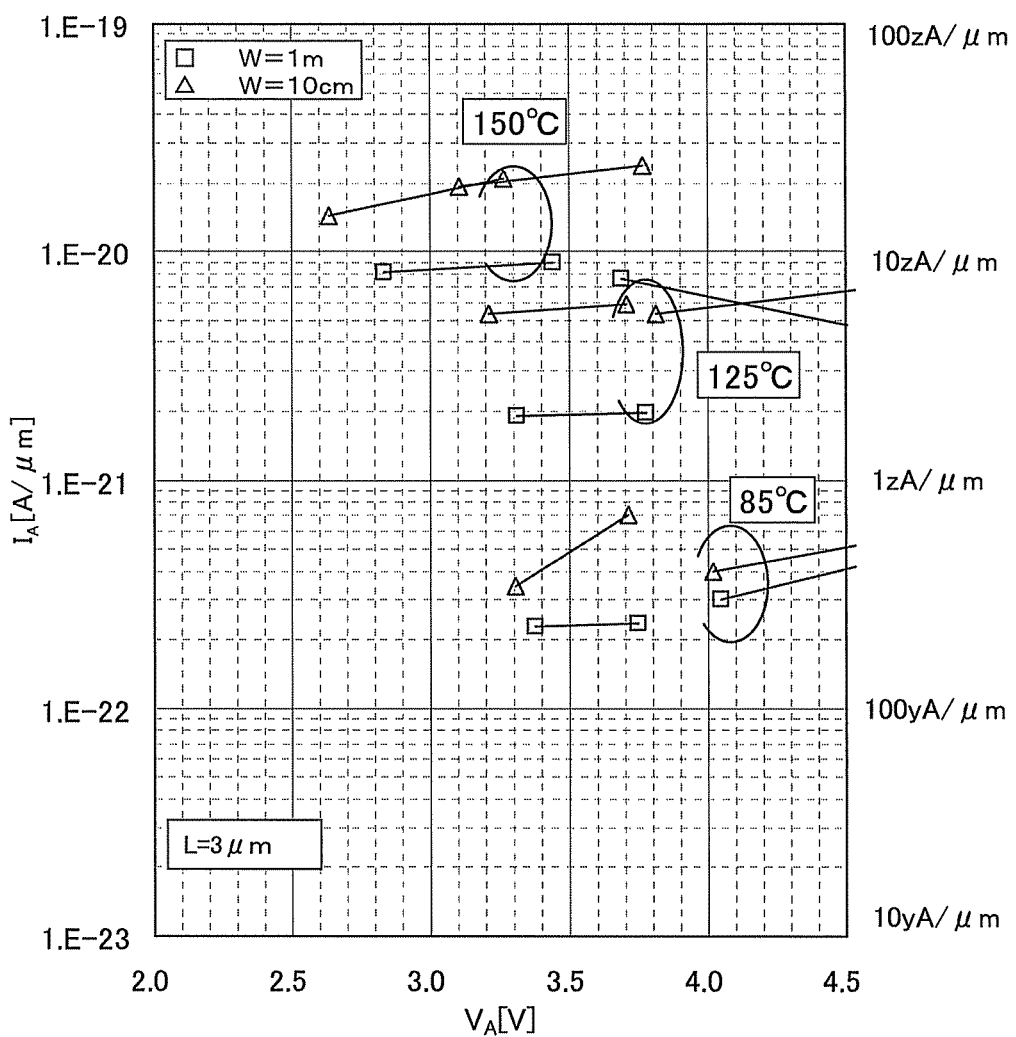
FIG. 13 is a graph showing a relationship between voltage of the node A and leakage current estimated from measurement.
Figure 14:
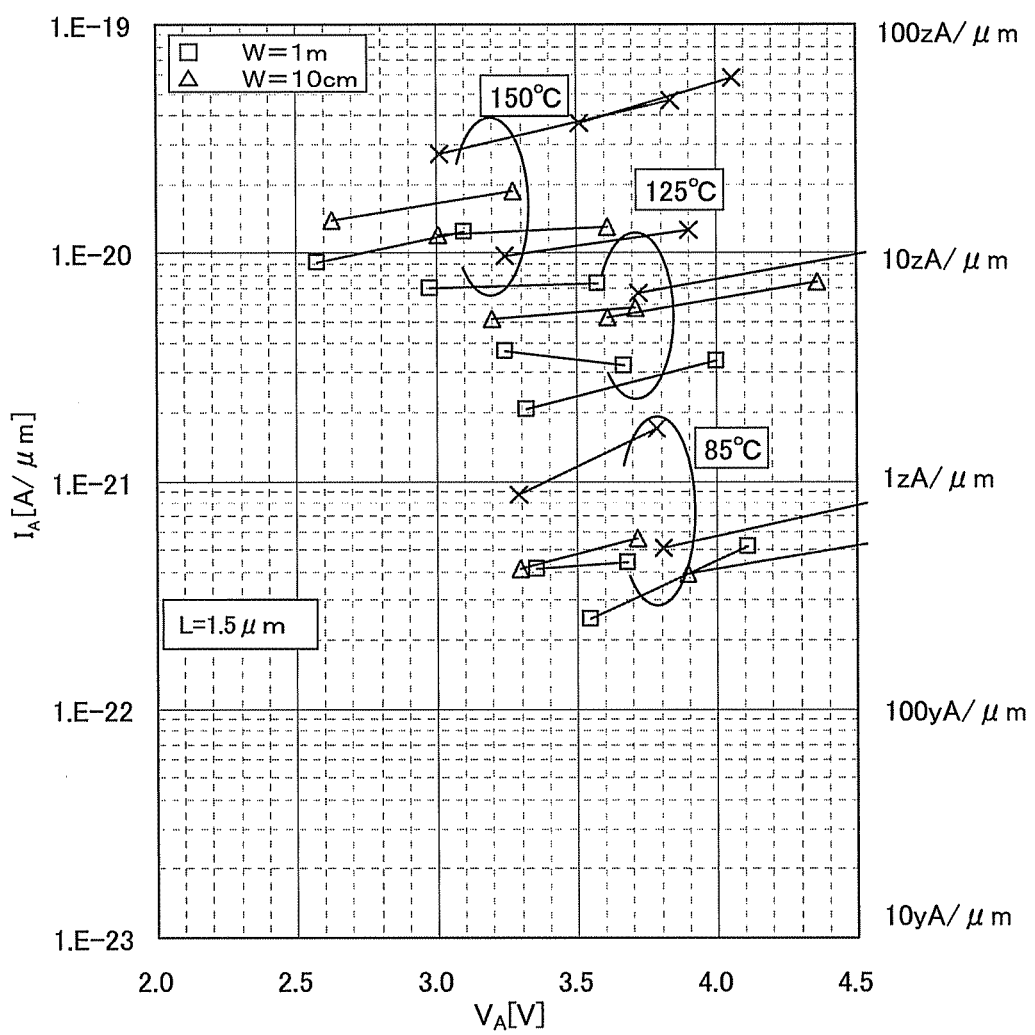
FIG. 14 is a graph showing a relationship between voltage of the node A and leakage current estimated from measurement.

FIG. 12, FIG. 13, and FIG. 14 illustrate the relationship between the voltage of the node A and the leakage current in the SMP1 to SMP6 estimated from the measurement at 85° C., 125° C., and 150° C. As illustrated in FIG. 12, FIG. 13, and FIG. 14, even at 150° C., the leakage current is 100 zA/μm or lower.

As described above, the leakage current of the circuit for evaluating characteristics using a transistor including a highly-purified oxide semiconductor layer serving as a channel formation layer is sufficiently low, which means that the off-state current of the transistor is sufficiently low. In addition, it turns out that the off-state current of the transistor is sufficiently low even when the temperature rises.

The estimation examples of the optical deterioration characteristics of an example of the transistor of this embodiment which includes an oxide semiconductor layer will be described below.

Figure 15A:
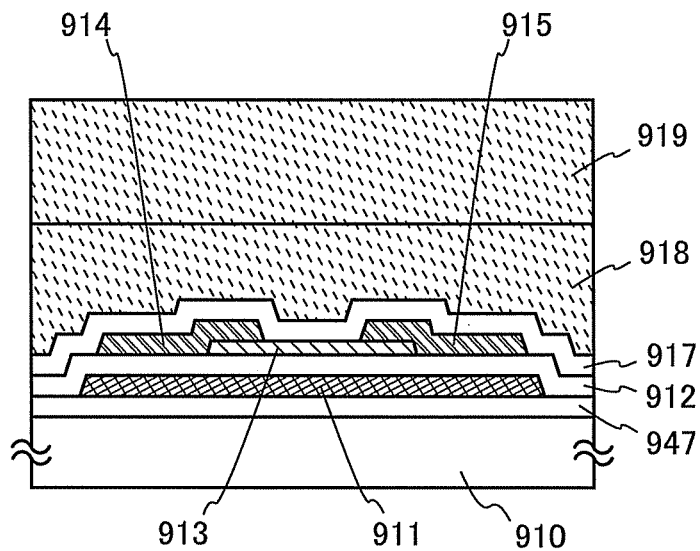
FIGS. 15A and 15B are diagrams for describing examples of a transistor for evaluation.
Figure 15B:
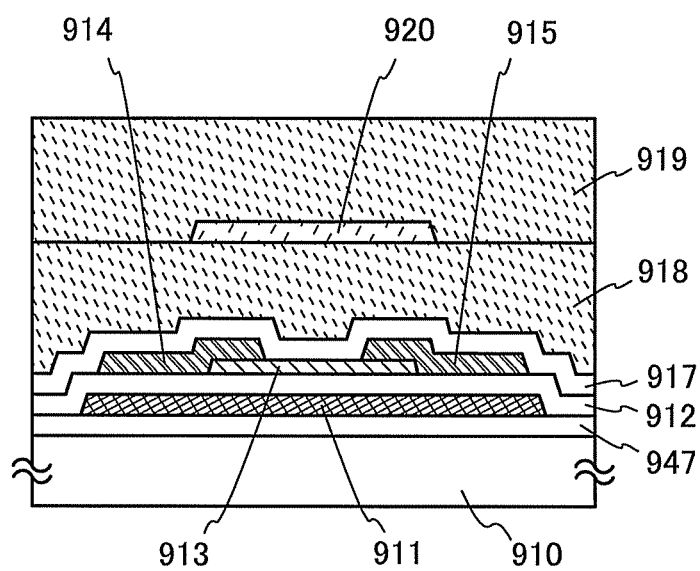

First, the structure of a transistor for the evaluation will be described with reference to FIGS. 15A and 15B. FIGS. 15A and 15B are cross-sectional views illustrating the structure of a transistor for evaluating the optical deterioration characteristics.

A transistor in FIG. 15A includes an insulating layer 947 over a substrate 910, a conductive layer 911 being over the insulating layer 947 and serving as a gate, an insulating layer 912 serving as a gate insulating layer, an oxide semiconductor layer 913 overlapping with the conductive layer 911 with the insulating layer 912 therebetween and serving as a channel formation layer, a conductive layer 914 and a conductive layer 915 serving as a source and a drain, respectively, and being in contact with the oxide semiconductor layer 913. Further, the transistor in FIG. 15A includes a stack of an insulating layer 917, an insulating layer 918, and an insulating layer 919 over the oxide semiconductor layer 913, the conductive layer 914, and the conductive layer 915.

A transistor in FIG. 15B includes, in addition to the components in FIG. 15A, a conductive layer 920 overlapping with the oxide semiconductor layer 913 with the insulating layer 917 and the insulating layer 918 therebetween and serving as a gate (a back gate electrode).

The channel lengths of the transistor in FIG. 15A and the transistor in FIG. 15B are 3 μm. The channel widths of the transistor in FIG. 15A and the transistor in FIG. 15B are 20 μm.

Next, a method for manufacturing the transistor in FIG. 15A and the transistor in FIG. 15B will be described.

First, the substrate 910 is prepared.

Next, a stack of a 200-nm-thick silicon nitride film and a 400-nm-thick silicon oxynitride film is formed over the substrate 910 by CVD, thereby forming the insulating layer 947.

Then, a stack of a 30-nm-thick tantalum nitride film and a 100-nm-thick tungsten film is formed over the insulating layer 947 by sputtering, and the stack is selectively etched to form the conductive layer 911.

After that, a 30-nm-thick silicon oxynitride film is formed over the conductive layer 911 by high-density plasma CVD, thereby forming the insulating layer 912.

Next, a 30-nm-thick oxide semiconductor film is formed over the insulating layer 912 by sputtering using an In—Ga—Zn—O based oxide semiconductor target, and the oxide semiconductor film is selectively etched to form the oxide semiconductor layer 913.

Then, heat treatment is performed in a nitrogen atmosphere at 450° C. for 60 minutes (a first heat treatment).

After that, a stack of a 100-nm-thick titanium film, a 200-nm-thick aluminum film, and a 100-nm-thick titanium film is formed over the oxide semiconductor layer 913 by sputtering, and the stack is selectively etched to form the conductive layer 914 and the conductive layer 915.

Then, heat treatment is performed in a nitrogen atmosphere at 300° C. for 60 minutes (a second heat treatment).

Next, a silicon oxide film is formed over the oxide semiconductor layer 913, the conductive layer 914, and the conductive layer 915 by sputtering to form the insulating layer 917.

Then, a 1.5-μm-thick polyimide resin film is formed over the insulating layer 917 to form the insulating layer 918.

Then, heat treatment is performed in a nitrogen atmosphere at 250° C. for 60 minutes (a third heat treatment).

After that, in order to fabricate the transistor in FIG. 15A, a 2.0-μm-thick polyimide resin film is formed over the insulating layer 918 to form the insulating layer 919.

In contrast, in order to fabricate the transistor in FIG. 15B, a stack of a 100-nm-thick titanium film, a 200-nm-thick aluminum film, and a 100-nm-thick titanium film is first formed over the insulating layer 918 by sputtering, and the stack is selectively etched to form the conductive layer 920. Further, a 2.0-μm-thick polyimide resin film is formed over the insulating layer 918 and the conductive layer 920 to form the insulating layer 919. This is the method for manufacturing the transistor in FIG. 15A and the transistor in FIG. 15B Next, the results of negative bias temperature stress test with light irradiation for the transistor in FIG. 15A and the transistor in FIG. 15B will be described.

Note that the negative bias temperature stress test with light irradiation is a kind of acceleration test. In particular, the amount of a change in the threshold voltage Vth of a transistor obtained from the negative bias temperature stress test with light irradiation is an important measure of the reliability. In the negative bias temperature stress test with light irradiation, it can be said that the smaller the amount of change in Vth, the higher the reliability of the transistor. It is preferable that the amount of change in Vth between before and after the negative bias temperature stress test with light irradiation be 1 V or less, preferably 0.5 V or less.

Specifically, the negative bias temperature stress test with light irradiation is performed in such a manner that the temperature of a substrate over which a transistor is formed (substrate temperature) is set at fixed temperature, a source electrode and a drain electrode of the transistor are set at the same potential, and a gate electrode is supplied with a potential which is lower than those of the source electrode and the drain electrode for a certain period while the transistor is irradiated with light.

The intensity of stress due to degradation of a transistor in a negative bias temperature stress test with light irradiation can be determined by the light irradiation conditions, the substrate temperature, the intensity of electric field applied to a gate insulating layer, and a time of applying the electric field. The intensity of the electric field applied to the gate insulating layer is determined by a value obtained by dividing a potential difference between the gate and each of the source electrode and the drain electrode by the thickness of the gate insulating layer.

A test in which a potential higher than that of a source electrode and a drain electrode is applied to a gate electrode under light irradiation is called a positive bias temperature stress test with light irradiation. The characteristics of a transistor are likely to change more notably through a negative bias temperature stress test with light irradiation than through the positive bias temperature stress test with light irradiation.

Before the negative bias temperature stress test with light irradiation is carried out, the initial characteristics of the transistor in FIG. 15A and the transistor in FIG. 15B were firstly measured. In this embodiment, measured were change in the characteristics of current flowing between the conductive layer 914 and the conductive layer 915 (hereinafter referred to as drain current or Id) (Vg-Id characteristics) under the following conditions: the temperature of the substrate 910 is room temperature (25° C.); voltage applied between the conductive layer 914 and the conductive layer 915 (hereinafter referred to as drain voltage or Vd) is 3 V; and voltage applied between the conductive layer 911 and the conductive layer 914 (hereinafter referred to as gate voltage or Vg) is changed between −5 V and +5 V.

Further, in the negative bias temperature stress test with light irradiation, the temperature of the substrate 910 over which the transistor is formed (substrate temperature) is maintained at 25° C.; the voltage applied to the conductive layer 914 and the voltage applied to the conductive layer 915 are set equal, the intensity of electric-field applied to the insulating layer 912 is 2 MV/cm; negative voltage is applied to the conductive layer 911; and irradiation of light from the insulating layer 919 side is kept for one hour. Note that voltage applied to the conductive layer 911 is −6 V. In addition, voltage applied to the conductive layer 914 and voltage applied to the conductive layer 915 is 0 V. The condition of the light irradiation was as follows: a xenon light source "MAX-302" manufactured by Asahi Spectra Co., Ltd is used, the peak wavelength is 400 nm (half width: 10 nm), and irradiance is 326 μW/cm². Further, the voltage application was ended but while keeping the light irradiation, the Vg-Id characteristics were measured under the conditions that are the same as those of the measurement of the initial characteristics, so that the Vg-Id characteristics that the transistor exhibits after the negative bias temperature stress test with light irradiation were evaluated.

Figure 16:
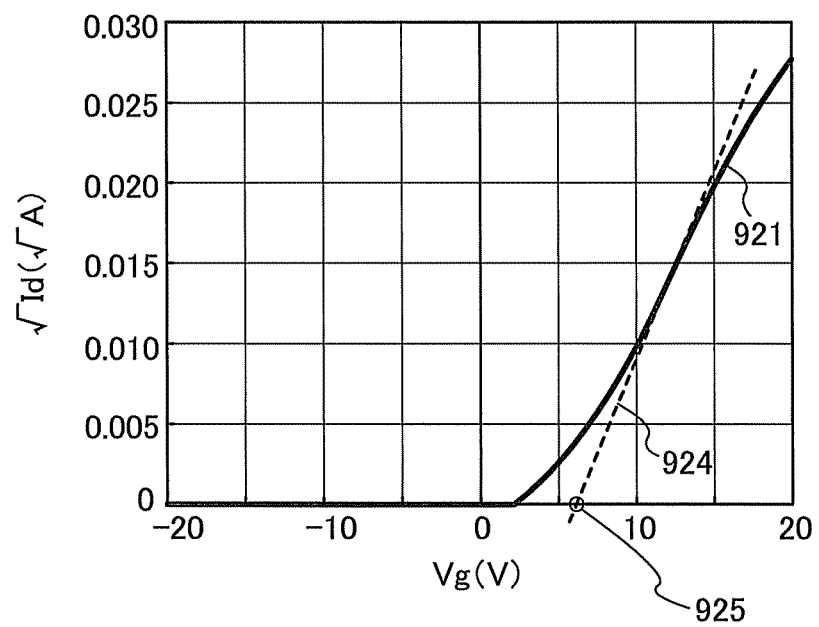
FIG. 16 is a graph for describing the definition of Vth.

Now, the threshold voltage Vth in the negative bias temperature stress test with light irradiation will be defined with reference to FIG. 16. In FIG. 16, the horizontal axis represents the gate voltage on a linear scale and the vertical axis represents the square root of the drain current (hereinafter also referred to as √Id) on a linear scale. A curve 921 indicates the square root of value of $I_d$ in the Vg-Id characteristics (the curve is hereinafter also referred to as a √Id curve).

First, the √Id curve (the curve 921) is obtained from the Vg-Id curve. Then, a tangent 924 to a point on the √Id curve at which a differential value of the √Id curve is the maximum is obtained. Next, the tangent 924 is extended, and the gate voltage Vg at a drain current Id of 0 A on the tangent 924, that is, a value at a horizontal-axis-intercept, i.e., gate-voltage-axis-intercept 925 of the tangent 924 is defined as Vth.

Figure 17A:
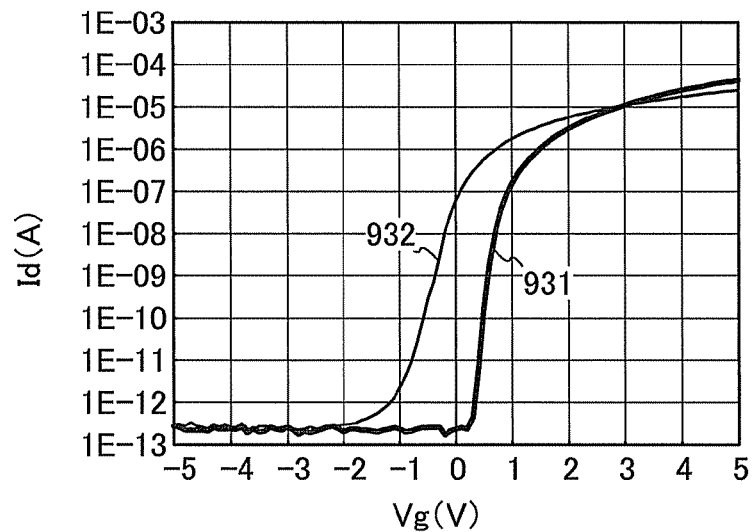
FIGS. 17A to 17C are graphs showing the results of a negative-bias temperature stress test with light irradiation.
Figure 17B:
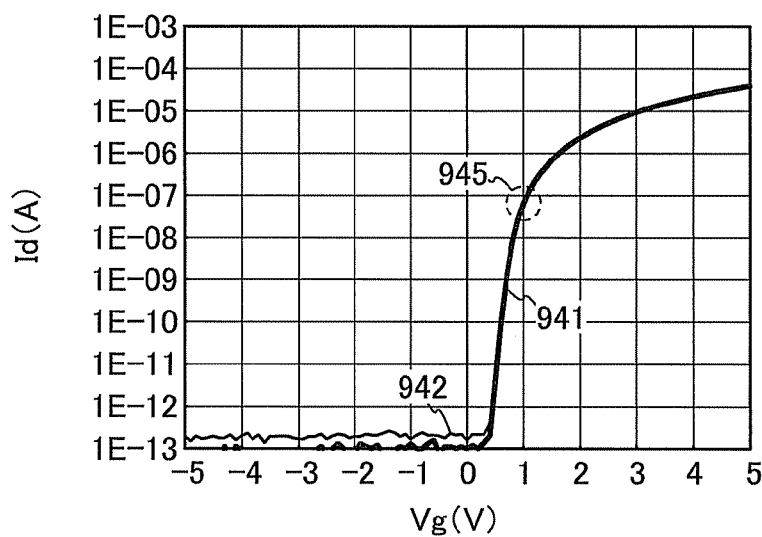
Figure 17C:
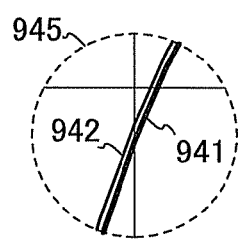

Vg-Id characteristics that the transistor in FIG. 15A and the transistor in FIG. 15B exhibit before and after the negative bias temperature stress test with light irradiation are shown in FIGS. 17A to 17C.

FIG. 17A illustrates the Vg-Id characteristics of the transistor in FIG. 15A. As a characteristic curve 931 in FIG. 17A shows, Vth of the transistor in FIG. 15A that has not been yet subjected to the negative bias temperature stress test with light irradiation is 1.01 V. In contrast, as a characteristic curve 932 in FIG. 17A shows, Vth of the transistor in FIG. 15A that has been subjected to the negative bias temperature stress test with light irradiation is 0.44 V.

FIG. 17B illustrates the Vg-Id characteristics of the transistor in FIG. 15B. FIG. 17C is an enlarged graph of a portion 945 in FIG. 17B. As a characteristic curve 941 in FIG. 17B shows, Vth of the transistor in FIG. 15B that has not been yet subjected to the negative bias temperature stress test with light irradiation is 1.16 V. In contrast, as a characteristic curve 942 in FIG. 17B shows, Vth of the transistor in FIG. 15B that has been subjected to the negative bias temperature stress test with light irradiation is 1.10 V.

In FIG. 17A, Vth of the transistor in FIG. 15A that has been subjected to the negative bias temperature stress test with light irradiation is shifted by 0.57 V in the negative direction from Vth of the transistor in FIG. 15A that has not been yet subjected to the negative bias temperature stress test with light irradiation. In FIG. 17B, Vth of the transistor in FIG. 15B that has been subjected to the negative bias temperature stress test with light irradiation is shifted by 0.06 V in the negative direction from Vth of the transistor in FIG. 15B that has not been yet subjected to the negative bias temperature stress test with light irradiation. This shows that the amount of change in the Vth of each of the transistor in FIG. 15A and the transistor in FIG. 15B is 1 V or less and the transistor in FIG. 15A and the transistor in FIG. 15B have a high reliability. In addition, the amount of change in the Vth of the transistor in FIG. 15B which includes the conductive layer 920 is 0.1 V or less, which means that the transistor in FIG. 15B has a higher reliability than the transistor in FIG. 15A.

In the input/output device of the above embodiments, data is input by the entrance of light. Therefore, use of the transistor including the oxide semiconductor layer as the transistor in the input/output device of the above embodiments can improve the reliability of the input/output device.

Embodiment 7

In this embodiment, structural examples of the input/output device of the above embodiment are described.

The input/output device of this embodiment includes a first substrate (an active matrix substrate) provided with a semiconductor element such as a transistor, a second substrate, and a liquid crystal layer provided between the first substrate and the second substrate.

Figure 18A:
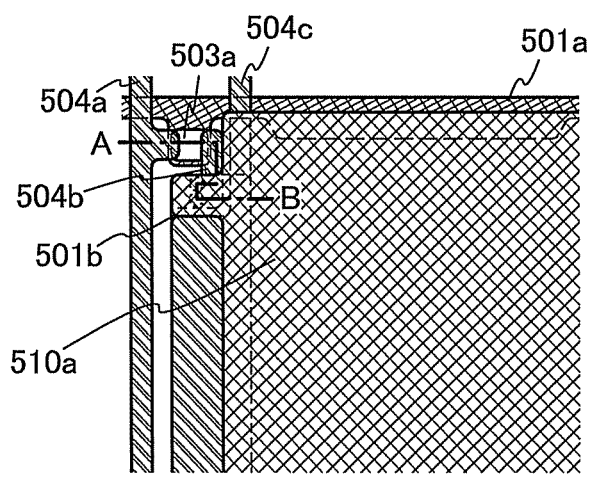
FIGS. 18A and 18B are diagrams illustrating a structural example of an active-matrix substrate in an input/output device of Embodiment 7.
Figure 18B:
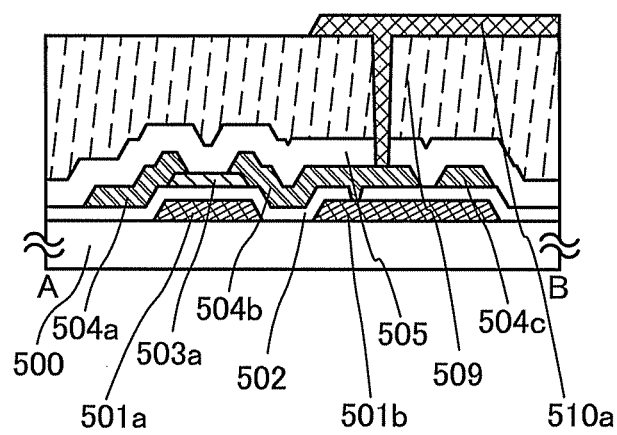
Figure 19A:
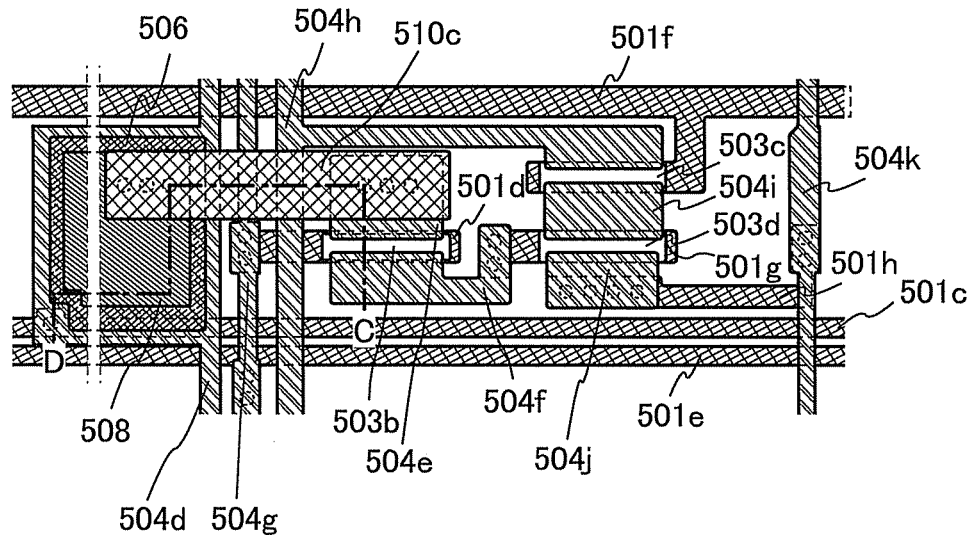
FIGS. 19A and 19B are diagrams illustrating a structural example of an active-matrix substrate in the input/output device of Embodiment 7.
Figure 19B:
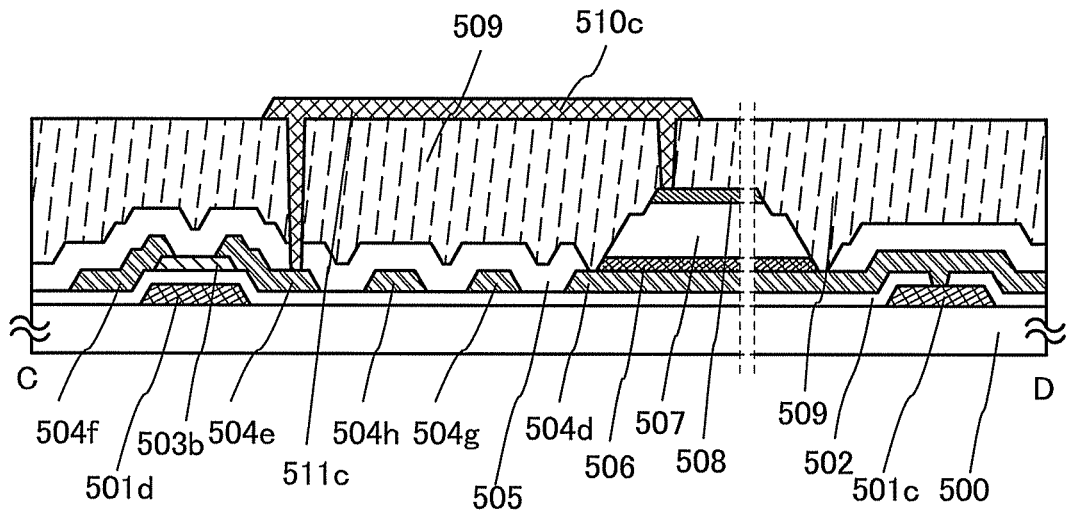

First, structural examples of the active matrix substrate in the input/output device of this embodiment will be described with reference to FIGS. 18A and 18B and FIGS. 19A and 19B. FIGS. 18A and 18B and FIGS. 19A and 19B illustrate structural examples of the active matrix substrate in the input/output device of this embodiment. FIG. 18A is a schematic plan view, and FIG. 18B is a schematic cross-sectional view taken along line A-B in FIG. 18A. FIG. 19A is a schematic plan view, and FIG. 19B is a schematic cross-sectional view taken along line C-D in FIG. 19A. Note that in FIGS. 19A and 19B, a photodetector circuit having the structure shown in FIG. 5A and the photodetection control transistor (the transistor 134 in FIG. 5B) is used as an example of a photodetector circuit. In FIGS. 18A and 18B and FIGS. 19A and 19B, the transistor with the structure described with reference to FIG. 7A is used as an example of a transistor.

The active matrix substrate illustrated in FIGS. 18A and 18B and FIGS. 19A and 19B includes a substrate 500, conductive layers 501a to 501h, an insulating layer 502, semiconductor layers 503a to 503d, conductive layers 504a to 504k, an insulating layer 505, a semiconductor layer 506, a semiconductor layer 507, a semiconductor layer 508, an insulating layer 509, and conductive layers 510a and 510b.

Each of the conductive layers 501a to 501h is formed over a surface of the substrate 500.

The conductive layer 501a functions as a gate of a display selection transistor in a display circuit.

The conductive layer 501b functions as a first capacitor electrode of a storage capacitor in the display circuit. Note that a layer that functions as a first capacitor electrode of a capacitor (a storage capacitor) is also referred to as a first capacitor electrode.

The conductive layer 501c functions as a wiring through which the voltage $V_b$ is input. Note that a layer that functions as a wiring is also referred to as a wiring.

The conductive layer 501d functions as a gate of a photodetection control transistor in the photodetector circuit.

The conductive layer 501e functions as a signal line through which a photodetection control signal is input. Note that a layer that functions as a signal line is also referred to as a signal line.

The conductive layer 501f functions as a gate of an output control transistor in the photodetector circuit.

The conductive layer 501g functions as a gate of an amplifier transistor in the photodetector circuit.

The insulating layer 502 is provided over a surface of the substrate 500 with the conductive layers 501a to 501h interposed therebetween.

The insulating layer 502 functions as a gate insulating layer of the display selection transistor in the display circuit, a dielectric layer of the storage capacitor in the display circuit, a gate insulating layer of the photodetection control transistor in the photodetector circuit, a gate insulating layer of the amplifier transistor in the photodetector circuit, and a gate insulating layer of the output selection transistor in the photodetector circuit.

The semiconductor layer 503a overlaps with the conductive layer 501a with the insulating layer 502 interposed therebetween. The semiconductor layer 503a functions as a channel formation layer of the display selection transistor in the display circuit.

The semiconductor layer 503b overlaps with the conductive layer 501d with the insulating layer 502 interposed therebetween. The semiconductor layer 503b functions as a channel formation layer of the photodetection control transistor in the photodetector circuit.

The semiconductor layer 503c overlaps with the conductive layer 501f with the insulating layer 502 interposed therebetween. The semiconductor layer 503c functions as a channel formation layer of the output selection transistor in the photodetector circuit.

The semiconductor layer 503d overlaps with the conductive layer 501g with the insulating layer 502 interposed therebetween. The semiconductor layer 503d functions as a channel formation layer of the amplifier transistor in the photodetector circuit.

The conductive layer 504a is electrically connected to the semiconductor layer 503a. The conductive layer 504a functions as one of a source and a drain of the display selection transistor in the display circuit.

The conductive layer 504b is electrically connected to the conductive layer 501b and the semiconductor layer 503a. The conductive layer 504b functions as the other of the source and the drain of the display selection transistor in the display circuit.

The conductive layer 504c overlaps with the conductive layer 501b with the insulating layer 502 interposed therebetween. The conductive layer 504c functions as a second capacitor electrode of the storage capacitor in the display circuit.

The conductive layer 504d is electrically connected to the conductive layer 501c through an opening that penetrates the insulating layer 502. The conductive layer 504d functions as one of a first current terminal and a second current terminal of a photoelectric transducer in the photodetector circuit.

The conductive layer 504e is electrically connected to the semiconductor layer 503b. The conductive layer 504e functions as one of a source and a drain of the photodetection control transistor in the photodetector circuit.

The conductive layer 504f is electrically connected to the semiconductor layer 503b and is electrically connected to the conductive layer 501g through an opening that penetrates the insulating layer 502. The conductive layer 504f functions as the other of the source and the drain of the photodetection control transistor in the photodetector circuit.

The conductive layer 504g is electrically connected to the conductive layer 501d and the conductive layer 501e through an opening that penetrates the insulating layer 502. The conductive layer 504g functions as a signal line through which a photodetection control signal is input.

The conductive layer 504h is electrically connected to the semiconductor layer 503c. The conductive layer 504h functions as one of a source and a drain of the output selection transistor in the photodetector circuit.

The conductive layer 504i is electrically connected to the semiconductor layer 503c and the semiconductor layer 503d. The conductive layer 504i functions as the other of the source and the drain of the output selection transistor in the photodetector circuit and one of a source and a drain of the amplifier transistor in the photodetector circuit.

The conductive layer 504*j* is electrically connected to the semiconductor layer 503*d* and is electrically connected to the conductive layer 501*h* through an opening that penetrates the insulating layer 502. The conductive layer 501*j* functions as the other of the source and the drain of the amplifier transistor in the photodetector circuit.

The conductive layer 504*k* is electrically connected to the conductive layer 501*h* through an opening that penetrates the insulating layer 502. The conductive layer 504*k* functions as a wiring through which the voltage $V_a$ or the voltage $V_b$ is input.

The insulating layer 505 is in contact with the semiconductor layers 503*a* to 503*d* with the conductive layers 504*a* to 504*k* interposed therebetween.

The semiconductor layer 506 is electrically connected to the conductive layer 504*d* through an opening that penetrates the insulating layer 505.

The semiconductor layer 507 is in contact with the semiconductor layer 506.

The semiconductor layer 508 is in contact with the semiconductor layer 507.

The insulating layer 509 overlaps with the insulating layer 505, the semiconductor layer 506, the semiconductor layer 507, and the semiconductor layer 508. The insulating layer 509 functions as a planarization insulating layer in the display circuit and the photodetector circuit. Note that the insulating layer 509 is not necessarily provided.

The conductive layer 510*a* is electrically connected to the conductive layer 504*b* through an opening that penetrates the insulating layers 505 and 509. Providing the conductive layer 510*a* over the conductive layer 501*a* can prevent light leakage. The conductive layer 510*a* functions as a pixel electrode of a display element in the display circuit. Note that a layer that functions as a pixel electrode is also referred to as a pixel electrode.

The conductive layer 510*b* is electrically connected to the conductive layer 504*e* through an opening that penetrates the insulating layers 505 and 509 and is electrically connected to the semiconductor layer 508 through an opening that penetrates the insulating layers 505 and 509.

Figure 20A:
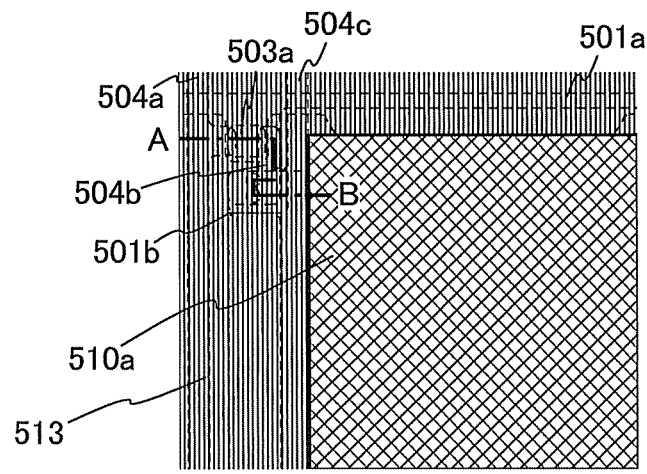
FIGS. 20A and 20B are diagrams illustrating a structural example of the input/output device of Embodiment 7.
Figure 20B:
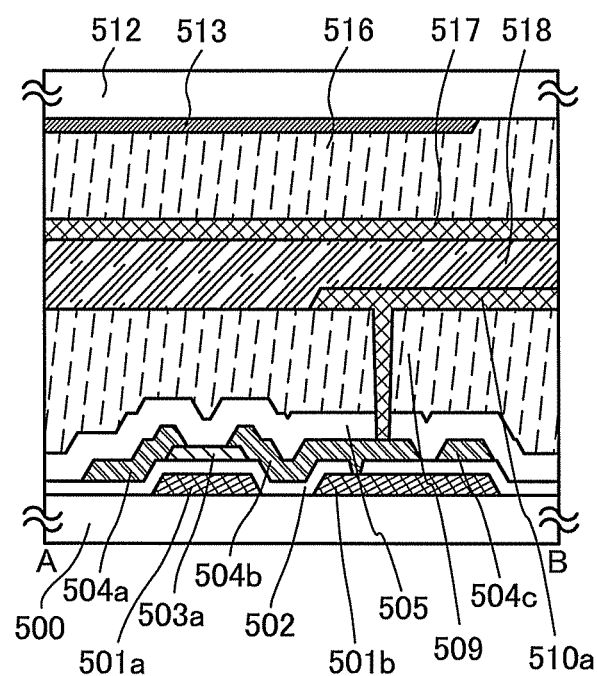
Figure 21A:
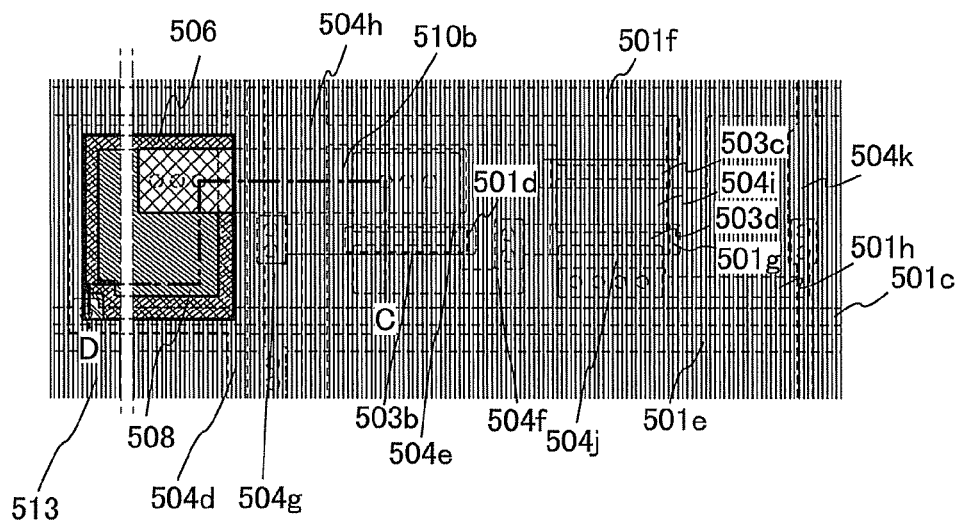
FIGS. 21A and 21B are diagrams illustrating a structural example of the input/output device of Embodiment 7.
Figure 21B:
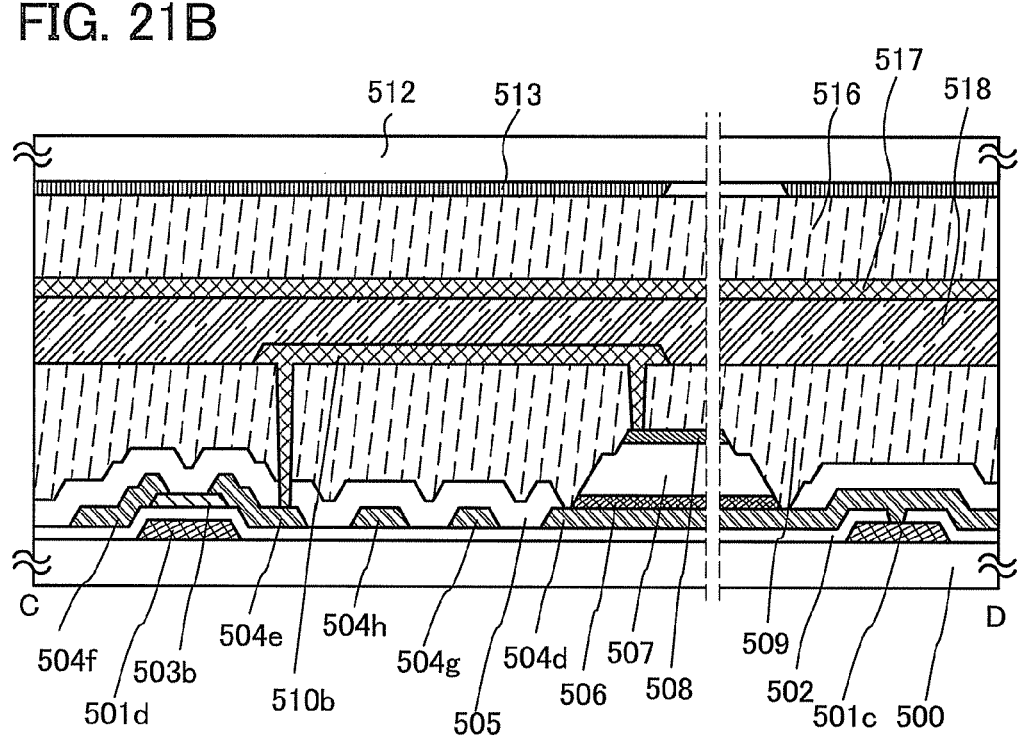

Next, a structural example of the input/output device of this embodiment will be described with reference to FIGS. 20A and 20B and FIGS. 21A and 21B. FIGS. 20A and 20B and FIGS. 21A and 21B show a structural example of an input/output device using the active matrix substrate in FIGS. 18A and 18B and FIGS. 19A and 19B. FIG. 20A is a schematic plane view, FIG. 20B is a schematic cross-sectional view taken along line A-B in FIG. 20A, FIG. 21A is a schematic plane view, and FIG. 21B is a schematic cross-sectional view taken along line C-D in FIG. 21A. Note that as an example, a photoelectric converter is a photodiode, and a display element is a liquid crystal element.

The input/output device in FIGS. 20A and 20B and FIGS. 21A and 21B includes, in addition to the active matrix substrate in FIGS. 18A and 18B and FIGS. 19A and 19B, a substrate 512, a light-blocking layer 513, an insulating layer 516, a conductive layer 517, and a liquid crystal layer 518. Note that in FIG. 20A and FIG. 21A, the conductive layer 517 is omitted for convenience sake.

The light-blocking layer 513 is provided over a part of a surface of the substrate 512. For example, the light-blocking layer 513 is provided over a surface of the substrate 512 except for a portion overlapping with the photoelectric converter.

The insulating layer 516 is provided over a surface of the substrate 512 with the light-blocking layer 513 interposed therebetween.

The conductive layer 517 is provided on a surface of the substrate 512. The conductive layer 517 functions as a common electrode in the display circuit. Note that in the photodetector circuit, the conductive layer 517 is not necessarily provided.

The liquid crystal layer 518 is provided between the conductive layer 510*a* and the conductive layer 517 and overlaps with the semiconductor layer 508 with the insulating layer 509 interposed therebetween.

Note that the conductive layer 510*a*, the liquid crystal layer 518, and the conductive layer 517 function as a display element in the display circuit.

Further, the components of the input/output device illustrated in FIGS. 20A and 20B and FIGS. 21A and 21B will be described.

Each of the substrates 500 and 512 can be a substrate that can be used as the substrate 400*a* in FIG. 7A.

Each of the conductive layers 501*a* to 501*h* can be a layer of a material that can be used for the conductive layer 401*a* in FIG. 7A. Alternatively, each of the conductive layers 501*a* to 501*h* may be a stack of layers of materials that can be used for the conductive layer 401*a*.

The insulating layer 502 can be a layer of a material that can be used for the insulating layer 402*a* in FIG. 7A. Alternatively, the insulating layer 502 may be a stack of layers of materials that can be used for the insulating layer 402*a*.

Each of the semiconductor layers 503*a* to 503*d* can be a layer of a material that can be used for the oxide semiconductor layer 403*a* in FIG. 7A. Note that as each of the semiconductor layers 503*a* to 503*d* can be a semiconductor layer using a semiconductor that belongs to Group 14 in the periodic table (e.g., silicon).

Each of the conductive layers 504*a* to 504*k* can be a layer of a material that can be used for the conductive layer 405*a* or the conductive layer 406*a* in FIG. 7A. Alternatively, each of the conductive layers 504*a* to 504*k* may be a stack of layers of materials that can be used for the conductive layer 405*a* or the conductive layer 406*a*.

The insulating layer 505 can be a layer of a material that can be used for the insulating layer 407*a* in FIG. 7A. Alternatively, the insulating layer 505 may be a stack of layers of materials that can be used for the insulating layer 407*a*.

The semiconductor layer 506 is a semiconductor layer having one conductivity (one or p-type conductivity and n-type conductivity). The semiconductor layer 506 is a semiconductor layer containing silicon, for example.

The semiconductor layer 507 has lower resistance than the semiconductor layer 506. The semiconductor layer 507 is a semiconductor layer containing silicon, for example.

The semiconductor layer 508 is a semiconductor layer whose conductivity is different from the conductivity of the semiconductor layer 506 (the other of the p-type conductivity and the n-type conductivity). The semiconductor layer 508 is a semiconductor layer containing silicon, for example.

Each of the insulating layers 509 and 516 is, for example, a layer of an organic material such as polyimide, acrylic, or benzocyclobutene. Alternatively, the insulating layer 509 may be a layer of a low-dielectric constant material (also referred to as a low-k material).

Each of the conductive layers 510*a*, 510*b*, and 517 is, for example, a layer of a light-transmitting conductive material such as indium tin oxide, a metal oxide in which zinc oxide is mixed in indium oxide (such a metal oxide is also referred to as indium zinc oxide (IZO)), a conductive material in which silicon oxide (SiO$_2$) is mixed in indium oxide, organoindium, organotin, indium oxide containing tungsten oxide, indium zinc oxide containing tungsten oxide, indium oxide containing titanium oxide, or indium tin oxide containing titanium oxide.

The conductive layers 510*a*, 510*b*, and 517 can be formed using a conductive composition containing a conductive high-molecular compound (also referred to as a conductive polymer). A conductive layer formed using the conductive composition preferably has a sheet resistance of 10000 ohm/square or less and a transmittance of 70% or more at a wavelength of 550 mm. Further, the resistivity of the conductive high-molecular compound contained in the conductive composition is preferably 0.1 Ω·cm or less.

As the conductive high-molecular compound, a so-called π electron conjugated conductive high-molecular compound can be used. For example, polyaniline and/or a derivative thereof, polypyrrole and/or a derivative thereof, polythiophene and/or a derivative thereof, and a copolymer of two or more kinds of those materials can be given as the π electron conjugated conductive high-molecular compound.

As the light-blocking layer 513, a layer of a metal material can be used, for example.

The liquid crystal layer 518 can be, for example, a layer containing a TN liquid crystal, an OCB liquid crystal, an STN liquid crystal, a VA liquid crystal, an ECB liquid crystal, a GH liquid crystal, a polymer dispersed liquid crystal, or a discotic liquid crystal can be used. Note that for the liquid crystal layer 518, a liquid crystal that transmits light when voltage applied to the conductive layer 510*c* and the conductive layer 517 is 0 V is preferably used.

As described with reference to FIGS. 18A and 18B, FIGS. 19A and 19B, FIGS. 20A and 20B, and FIGS. 21A and 21B, the structural example of the input/output device of this embodiment includes the active matrix substrate provided with the transistor, the pixel electrode, and the photoelectric transducer, a counter substrate, and the liquid crystal layer having a liquid crystal between the active matrix substrate and the counter substrate. With such a structure, the display circuit and the photodetector circuit can be manufactured over one substrate in the same steps; thus, manufacturing cost can be reduced.

In addition, as described with reference to FIGS. 18A and 18B, FIGS. 19A and 19B, FIGS. 20A and 20B, and FIGS. 21A and 21B, the structural example of the input/output device of this embodiment includes the light-blocking layer in a portion except a portion through which light needs to pass. This structure can reduce the entrance of light into the transistor disposed in the active matrix substrate, for example, thereby suppressing variations in the electrical characteristics of the transistor caused by light (e.g., threshold voltage). This can improve the reliability of the input/output device.

In addition, in the input/output device of this embodiment, a circuit such as the display selection signal output circuit and the output selection circuit can be provided over the same substrate as the display circuit and the photodetector circuit. At that time, the transistor in a circuit such as the display selection signal output circuit and the output selection circuit can have the same structure as the transistor in the display circuit and the photodetector circuit.

Embodiment 8

In this embodiment, described are examples of an electronic appliance each provided with the input/output device of the above embodiments.

Structural examples of the electronic appliances of this embodiment will be described with reference to FIGS. 22A to 22D. FIGS. 22A to 22D are schematic views each illustrating a structural example of the electronic appliance of this embodiment.

Figure 22A:
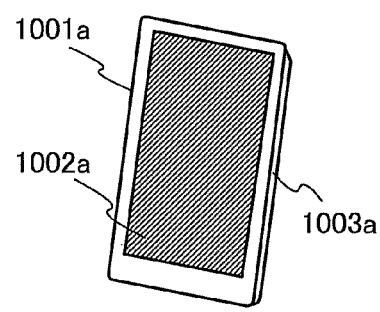
FIGS. 22A to 22D are schematic diagrams illustrating structural examples of an electronic device of Embodiment 8.

An electronic appliance in FIG. 22A is an example of a mobile information terminal. The mobile information terminal in FIG. 22A includes a housing 1001*a* and an input/output unit 1002*a* provided in the housing 1001*a*.

Note that a side surface 1003*a* of the housing 1001*a* may be provided with a connection terminal for connecting the mobile information terminal to an external device and one or more buttons used to operate the mobile information terminal in FIG. 22A.

The mobile information terminal in FIG. 22A includes a CPU, a main memory, an interface transmitting/receiving a signal traveling between the external device and each of the CPU and the main memory, and an antenna transmitting/receiving a signal to/from the external device, in the housing 1001*a*.

The mobile information terminal in FIG. 22A serves, for example, as one or more devices selected from a telephone, an electronic book, and a game machine.

Figure 22C:
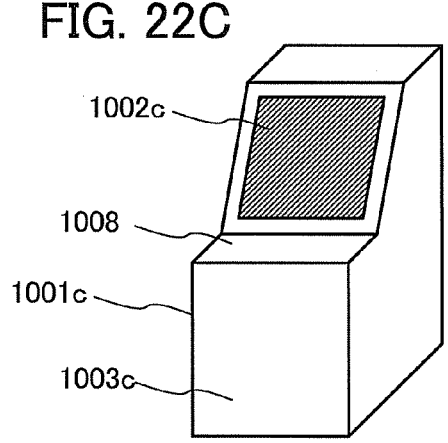
Figure 22B:
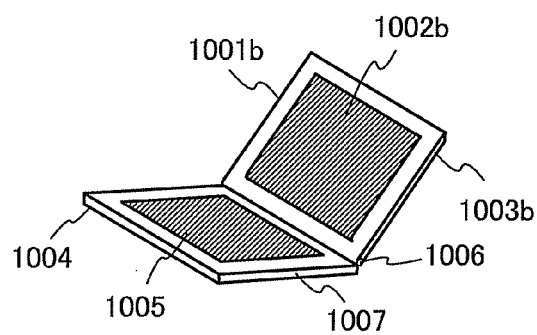

An electronic appliance in FIG. 22B is an example of a folding mobile information terminal. The mobile information terminal in FIG. 22B includes a housing 1001*b*, an input/output unit 1002*b* provided in the housing 1001*b*, a housing 1004, an input/output unit 1005 provided in the housing 1004, and a hinge 1006 for connecting the housing 1001*b* and the housing 1004.

In the mobile information terminal in FIG. 22B, the housing 1001*b* can be stacked on the housing 1004 by moving the housing 1001*b* or the housing 1004 with the hinge 1006.

Note that a side surface 1003*b* of the housing 1001*b* or a side surface 1007 of the housing 1004 may be provided with a connection terminal for connecting the mobile information terminal to an external device and one or more buttons used to operate the mobile information terminal in FIG. 22B.

The input/output unit 1002*b* and the input/output unit 1005 may display different images or continuous images. Note that the input/output unit 1005 is not necessarily provided; a keyboard which is an input device may be provided instead of the input/output unit 1005.

The mobile information terminal in FIG. 22B includes a CPU, a main memory, and an interface transmitting/receiving a signal traveling between the external device and each of the CPU and the main memory, in the housing 1001*b* or the housing 1004. In addition, the mobile information terminal in FIG. 22B may include an antenna transmitting/receiving a signal to/from the external device.

The mobile information terminal in FIG. 22B serves, for example, as one or more devices selected from a telephone, an electronic book, and a game machine.

The electronic appliance in FIG. 22C is an example of a stationary information terminal. The installed information terminal in FIG. 22C includes a housing 1001*c* and an input/output unit 1002*c* provided in the housing 1001*c*.

Note that the input/output unit 1002*c* can be provided in a top board 1008 of the housing 1001*c*.

The stationary information terminal in FIG. 22C includes a CPU, a main memory, and an interface transmitting/receiving a signal traveling between the external device and each of the CPU and the main memory, in the housing 1001*c*. In addition, the stationary information terminal in FIG. 22C may include an antenna transmitting/receiving a signal to/from the external device.

Further, a side surface 1003c of the housing 1001c in the stationary information terminal in FIG. 22C may be provided with one or more parts selected from a ticket ejection portion that ejects a ticket or the like, a coin slot, and a bill slot.

The stationary information terminal in FIG. 22C serves, for examples, as an automated teller machine, a information communication terminal for ticketing or the like (also referred to as a multi-media station), or a game machine.

Figure 22D:
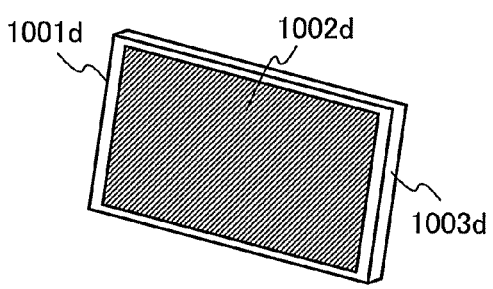

FIG. 22D shows an example of a stationary information terminal. The stationary information terminal in FIG. 22D includes a housing 1001d and an input/output unit 1002d provided in the housing 1001d. Note that a support for supporting the housing 1001d may also be provided.

Note that each of the electronic appliances in FIGS. 22A to 22C can include a button in its housing. It is possible, for example, to operate the electronic appliance with the button.

The stationary information terminal in FIG. 22D serves, for example, as a digital photo frame, a monitor, or a television device.

The input/output device of the above embodiments is used, for example, as an input/output unit of an electronic appliance. The input/output device of the above embodiments is used, for example, as each of the input/output units 1002a to 1002d in FIGS. 22A to 22D. In addition, the input/output device of the above embodiments may be used as the input/output unit 1005 in FIG. 22B.

As described with reference to FIGS. 22A to 22D, examples of an electronic appliance of this embodiment each include an input/output unit for which the input/output device of the above embodiments is used. Consequently, it is possible to operate the electronic appliance or input data to the electronic appliance with a finger or a pen.

In addition, the housings of examples of electronic appliances of this embodiment may be each provided with one or more of components selected from an input/output unit, a photoelectric transducer generating power source voltage in accordance with the intensity of incident light, and an operating unit for operating the input/output device. Providing a photoelectric transducer, for example, eliminates necessity of an external power source, allowing the above electronic appliance to be used for a long period of time even in a place without an external power source.

This application is based on Japanese Patent Application serial no. 2010-151911 filed with Japan Patent Office on Jul. 2, 2010, the entire contents of which are hereby incorporated by reference.

What is claimed is:

1. A method for driving an input/output device comprising:
   a first light source which emits first light of wavelengths in a visible region;
   a second light source which emits second light of wavelengths in an infrared region;
   a display circuit; and
   a plurality of photodetector circuits;
   the method comprising the steps of:
   lighting the first light source and the second light source in a first period;
   generating a first data in the first period by the plurality of photodetector circuits receiving the first light and the second light;
   lighting the second light source in a second period while the first light source is turned off;
   generating a second data in the second period by the plurality of photodetector circuits receiving the second light;
   generating a third data which is a difference data between the first data and the second data; and
   driving the display circuit in accordance with the third data.

2. The method for driving an input/output device according to claim 1, wherein the first light source is a light-emitting diode.

3. The method for driving an input/output device according to claim 1, wherein the second light source is a light-emitting diode.

4. The method for driving an input/output device according to claim 1, wherein the plurality of photodetector circuits comprise a plurality of photodiodes or a plurality of phototransistors.

5. The method for driving an input/output device according to claim 1,
   wherein the input/output device further comprises a plurality of memories,
   wherein the first data and the second data are stored in the plurality of memories, and
   wherein the third data is generated by deference of the first data and the second data which are stored in the plurality of memories.

6. The method for driving an input/output device according to claim 1, further comprising the step of detecting a coordinate of an object to be detected in accordance with the third data.

7. The method for driving an input/output device according to claim 6, wherein the first light and the second light are reflected from the object to be detected and enter the plurality of photodetector circuits.

8. A method for driving an input/output device comprising an input/output unit performing data input/output and a data processor carrying out processing according to input data, the input/output unit comprising:
   V first light-emitting diodes emitting light of wavelengths in an infrared region, wherein V is a natural number;
   W second light-emitting diodes emitting light of wavelengths in a visible region, wherein W is a natural number;
   a light unit including a first region which is put in a lighted condition when the first light-emitting diodes emit light and a second region which is put in a lighted condition when the second light-emitting diodes emit light;
   X display circuits overlapping with the light unit, receiving a display selection signal, receiving a display data signal in accordance with the display selection signal, and going into a display state according to data of the display data signal, wherein X is a natural number; and
   Y photodetector circuits overlapping with the light unit and generating data according to an intensity of light entering the Y photodetector circuits, wherein Y is a natural number, comprising the steps of:
   generating Y pieces of first data according to an intensity of light entering the Y photodetector circuits by putting the first region in the lighted condition and the second region in the lighted condition;
   generating Y pieces of second data according to an intensity of light entering the Y photodetector circuits by putting the first region in the lighted condition and the second region in an unlighted condition;
   generating Y pieces of third data according to an intensity of light entering the Y photodetector circuits by putting the first region in the unlighted condition and the second region in the lighted condition;
   generating Y pieces of fourth data according to an intensity of light entering the Y photodetector circuits by putting the first region in the unlighted condition and the second region in the unlighted condition;

generating difference data between the first data and the second data or between the third data and the fourth data by using the data processor; and generating image data to be data of the display data signal by using the data processor from the difference data between the first data and the second data or between the third data and the fourth data.

9. The method for driving an input/output device according to claim 8, wherein the photodetector circuits comprise a plurality of photodiodes or a plurality of phototransistors.

10. The method for driving an input/output device according to claim 8,
wherein the input/output device further comprises a plurality of memories,
wherein the first data the second data, the third data, and the fourth data are stored in the plurality of memories, and
wherein the difference data is generated by deference between the first data and the second data or between the third data and the fourth data which are stored in the plurality of memories.

11. The method for driving an input/output device according to claim 8, further comprising the step of detecting a coordinate of an object to be detected in accordance with the difference data.

12. The method for driving an input/output device according to claim 11, wherein the light of wavelengths in the infrared region and the light of wavelengths in the visible region are reflected from the object to be detected and enter the photodetector circuits.

13. The driving method of the input/output device according to claim 8, further comprising the steps of:
storing the first to fourth data sequentially by inputting a data signal generated from the first to fourth data to a memory included in the data processor;
reading any one of the first to fourth data stored in the memory in accordance with data of the data signal by inputting the data signal to a difference data generator included in the data processor; and
generating the difference data by carrying out arithmetic processing by using data read from the memory and the data of the data signal.

14. A method for driving an input/output device comprising an input/output unit performing data input/output and a data processor carrying out processing according to input data, the input/output unit comprising:
a first light unit that includes V first light-emitting diodes emitting light of wavelengths in a infrared region and is put in a lighted condition when the first light-emitting diodes emit light, wherein V is a natural number;
a second light unit that includes W second light-emitting diodes emitting light of wavelengths in a visible region and is put in a lighted condition when the second light-emitting diodes emit light, wherein W is a natural number;
X display circuits overlapping with the first light unit and the second light unit, receiving a display selection signal, receiving a display data signal in accordance with the display selection signal, and going into a display state according to data of the display data signal, wherein X is a natural number; and
Y photodetector circuits overlapping with the first light unit and the second light unit and generating data according to an intensity of light entering the Y photodetector circuits, wherein Y is a natural number, comprising the steps of:
generating Y pieces of first data according to an intensity of light entering the Y photodetector circuits by putting the first light unit in the lighted condition and the second light unit in the lighted condition;
generating Y pieces of second data according to an intensity of light entering the Y photodetector circuits by putting the first light unit in the lighted condition and the second light unit in an unlighted condition;
generating Y pieces of third data according to an intensity of light entering the Y photodetector circuits by putting the first light unit in the unlighted condition and the second light unit in the lighted condition;
generating Y pieces of fourth data according to an intensity of light entering the Y photodetector circuits by putting the first light unit in the unlighted condition and the second light unit in the unlighted condition;
generating difference data between the first data and the second data or between the third data and the fourth data by using the data processor; and
generating image data to be data of the display data signal by using the data processor from the difference data between the first data and the second data or between the third data and the fourth data.

15. The method for driving an input/output device according to claim 14, wherein the photodetector circuits comprise a plurality of photodiodes or a plurality of phototransistors.

16. The method for driving an input/output device according to claim 14,
wherein the input/output device further comprises a plurality of memories,
wherein the first data the second data, the third data, and the fourth data are stored in the plurality of memories, and
wherein the difference data is generated by deference between the first data and the second data or between the third data and the fourth data which are stored in the plurality of memories.

17. The method for driving an input/output device according to claim 14, further comprising the step of detecting a coordinate of an object to be detected in accordance with the difference data.

18. The method for driving an input/output device according to claim 17, wherein the light of wavelengths in the infrared region and the light of wavelengths in the visible region are reflected from the object to be detected and enter the photodetector circuits.

19. The driving method of the input/output device according to claim 14, further comprising the steps of:
storing the first to fourth data sequentially by inputting a data signal generated from the first to fourth data to a memory included in the data processor;
reading any one of the first to fourth data stored in the memory in accordance with data of the data signal by inputting the data signal to a difference data generator included in the data processor; and
generating the difference data by carrying out arithmetic processing by using data read from the memory and the data of the data signal.

20. A method for driving an input/output device comprising:
a first light source which emits first light of wavelengths in a visible region;
a second light source which emits second light of wavelengths in an infrared region; and
a plurality of photodetector circuits;
the method comprising the steps of:
lighting the first light source and the second light source in a first period;

generating a first data in the first period by the plurality of photodetector circuits receiving the first light and the second light;

lighting the second light source in a second period while the first light source is turned off;

generating a second data in the second period by the plurality of photodetector circuits receiving the second light; and generating a third data which is a difference data between the first data and the second data.

* * * * *

UNITED STATES PATENT AND TRADEMARK OFFICE
CERTIFICATE OF CORRECTION

PATENT NO. : 8,502,772 B2  
APPLICATION NO. : 13/173631  
DATED : August 6, 2013  
INVENTOR(S) : Munehiro Kozuma and Yoshiyuki Kurokawa Page 1 of 1

It is certified that error appears in the above-identified patent and that said Letters Patent is hereby corrected as shown below:

In the Specification:

Column 18, line 51; Change "coining" to --coming--.  
Column 43, line 12; Change "of 550 mm." to --of 550 nm.--.

Signed and Sealed this  
Thirty-first Day of December, 2013

Margaret A. Focarino  
*Commissioner for Patents of the United States Patent and Trademark Office*